(12) United States Patent
Zhang et al.

(10) Patent No.: US 12,724,625 B2
(45) Date of Patent: Sep. 1, 2026

(54) ALWAYS ON DISPLAY METHOD AND ELECTRONIC DEVICE

(71) Applicant: Huawei Technologies Co., Ltd., Shenzhen (CN)

(72) Inventors: Yundie Zhang, Shenzhen (CN); Da Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 18/259,913

(22) PCT Filed: Dec. 21, 2021

(86) PCT No.: PCT/CN2021/140234
§ 371 (c)(1),
(2) Date: Jun. 29, 2023

(87) PCT Pub. No.: WO2022/143313
PCT Pub. Date: Jul. 7, 2022

(65) Prior Publication Data

US 2024/0069936 A1 Feb. 29, 2024

(30) Foreign Application Priority Data

Dec. 30, 2020 (CN) ......................... 202011624908.1

(51) Int. Cl.
*G06F 9/451* (2018.01)
*G06F 3/04817* (2022.01)
(Continued)

(52) U.S. Cl.
CPC .......... *G06F 9/451* (2018.02); *G06F 3/04817* (2013.01); *G06F 3/04845* (2013.01);
(Continued)

(58) Field of Classification Search
CPC .. G06F 9/451; G06F 3/04817; G06F 3/04845; G06F 2203/04806; G06F 3/0484;
(Continued)

(56) References Cited

U.S. PATENT DOCUMENTS

2010/0321403 A1* 12/2010 Inadome .................. G09G 5/00 345/619
2015/0334219 A1* 11/2015 Soundararajan .. H04M 1/72403 455/414.1
(Continued)

FOREIGN PATENT DOCUMENTS

CN 110417986 A 11/2019
WO 2017215156 A1 12/2017
WO WO-2019095392 A1 * 5/2019 ........... G06F 3/0481

*Primary Examiner* — Kieu D Vu
*Assistant Examiner* — Alvaro R Calderon, IV
(74) *Attorney, Agent, or Firm* — Conley Rose, P.C.

(57) ABSTRACT

An always on display (AOD) method includes: detecting, by an electronic device, a region of interest in a wallpaper set by a user, where the region of interest is located in a first position in the wallpaper; determining, by the electronic device, an AOD pattern based on the region of interest; when the electronic device is in a screen-off state, displaying the AOD pattern in a second position of a display, where the second position is preset; in response to an operation of lighting up the display by the user, moving the AOD pattern from the second position of the display to a third position of the display, where the third position is based on the first position of the region of interest in the wallpaper; and displaying, by the electronic device, the wallpaper.

22 Claims, 47 Drawing Sheets

(51) Int. Cl.

| | |
|---|---|
| ***G06F 3/04845*** | (2022.01) |
| ***G06T 7/11*** | (2017.01) |
| ***G06V 10/25*** | (2022.01) |
| ***G06V 10/26*** | (2022.01) |
| ***G06V 40/16*** | (2022.01) |

(52) U.S. Cl.
CPC ................ *G06T 7/11* (2017.01); *G06V 10/25* (2022.01); *G06V 10/26* (2022.01); *G06V 40/16* (2022.01); *G06F 2203/04806* (2013.01); *G06T 2200/24* (2013.01); *G06T 2207/20132* (2013.01); *G06T 2207/20192* (2013.01); *G06T 2207/30201* (2013.01)

(58) Field of Classification Search
CPC ..... G06F 9/4418; G06T 7/11; G06T 2200/24; G06T 2207/20132; G06T 2207/20192; G06T 2207/30201; G06V 10/25; G06V 10/26; G06V 40/16; G06V 10/34; G06V 10/267; G06V 40/161
See application file for complete search history.

(56) References Cited

U.S. PATENT DOCUMENTS

| | | | | |
|---|---|---|---|---|
| 2020/0089302 | A1* | 3/2020 | Kim | G06F 1/3265 |
| 2020/0310631 | A1* | 10/2020 | Jiang | G06F 3/04845 |
| 2021/0181923 | A1* | 6/2021 | Luo | G06F 3/04883 |
| 2022/0342514 | A1* | 10/2022 | Chao | G06F 3/0362 |

* cited by examiner

CONT. FROM FIG. 3A(b)

TO FIG. 3A(d)

ALWAYS ON DISPLAY METHOD AND ELECTRONIC DEVICE

CROSS-REFERENCE TO RELATED APPLICATIONS

This is a U.S. National Stage of International Patent Application No. PCT/CN2021/140234 filed on Dec. 21, 2021, which claims priority to Chinese Patent Application No. 202011624908.1 filed on Dec. 30, 2020. Both of the aforementioned applications are incorporated herein by reference in their entireties.

TECHNICAL FIELD

This application relates to the terminal field, and in particular, to an always on display method and an electronic device.

BACKGROUND

Always on display (always on display, AOD) means that when a screen of an electronic device is in a turned-off (screen-off) state, the screen is partially lit to display some information (for example, time, a battery level, and an SMS message reminder). AOD may also be referred to as screen-off display.

Display content of AOD is black and white at first, and forms of AOD are simple. With the development of technology, color AOD emerges and the forms of AOD are more abundant.

For example, currently, display content of AOD may be designed for a wallpaper preset in a system, and when a user lights up a mobile phone (through fingerprint unlocking, facial recognition, or a press on a power button), the display content of AOD may form an animation effect with the wallpaper preset in the system. This may bring novel experience to the user. However, it is difficult to achieve a similar effect for a wallpaper arbitrarily set by the user, and a personalized requirement of the user cannot be met.

SUMMARY

Embodiments of this application provide an always on display method and an electronic device. Display content of AOD may be determined based on any home screen wallpaper or lock screen wallpaper set by a user, to meet a personalized requirement of the user, and improve user experience.

According to a first aspect, an embodiment of this application provides an always on display method. The method includes: An electronic device detects a region of interest in a wallpaper set by a user, where the region of interest is located in a first position in the wallpaper. The electronic device determines an always on display AOD pattern based on the region of interest. When the electronic device is in a screen-off state, the AOD pattern is displayed in a second position of a display, where the second position is preset. In response to an operation of lighting up the display by the user, the AOD pattern is moved from the second position of the display to a third position of the display, where the third position is determined based on the first position of the region of interest in the wallpaper. The electronic device displays the wallpaper.

Based on the method provided in this embodiment of this application, the electronic device may detect the region of interest in the wallpaper set by the user, and determine the always on display AOD pattern based on the region of interest. When the electronic device is in the screen-off state, the electronic device may display the AOD pattern. In this way, display content of AOD may be determined based on any home screen wallpaper or lock screen wallpaper set by the user, to meet a personalized requirement of the user, and improve user experience. In addition, when the user lights up the display of the electronic device (entering an unlocking interface or a home screen from an always on interface), the electronic device may display the AOD pattern transferring from a preset position (the second position) to the third position (determined based on a position of the region of interest in the lock screen wallpaper or the home screen wallpaper), and then diffuse an animation that lights up the wallpaper. Such an animation effect formed by the AOD pattern and the wallpaper may provide a better user experience.

In a possible implementation, the method further includes: receiving an operation of setting the wallpaper by the user; and receiving an operation that the user determines to perform always on display. After the user sets the wallpaper and sets to perform always on display, the electronic device may determine the display content of AOD based on any home screen wallpaper or lock screen wallpaper set by the user, to meet the personalized requirement of the user, and improve user experience.

In a possible implementation, the wallpaper set by the user includes a home screen wallpaper or a lock screen wallpaper. Optionally, the user may also set a home screen picture or a lock screen picture, that is, switch different wallpapers according to a preset rule. For example, a picture may be pushed to the user every preset time as the home screen wallpaper or the lock screen wallpaper.

In a possible implementation, that the electronic device displays the wallpaper includes: The electronic device first displays the wallpaper, and then displays other information corresponding to the wallpaper. When the wallpaper is a lock screen wallpaper, the other information corresponding to the wallpaper includes an application icon and a control on a lock screen interface; or when the wallpaper is a home screen wallpaper, the other information corresponding to the wallpaper includes an application icon and a control on the home screen. Such a quick animation of lighting up the wallpaper and then displaying the other information corresponding to the wallpaper may provide a better user experience.

In a possible implementation, that an electronic device detects a region of interest in a wallpaper set by a user includes: The electronic device performs face detection on the wallpaper, where when a face exists in the wallpaper, the region of interest includes a region in which the face is located; or when no face exists in the wallpaper, the electronic device performs saliency detection on the wallpaper, where the region of interest includes a salient region in the wallpaper.

In a possible implementation, that the electronic device determines an always on display AOD pattern based on the region of interest includes: generating an organic shape if the face is detected, cutting out a face region from the wallpaper, and placing the face region into the organic shape, to obtain the AOD pattern; or if no face is detected, performing saliency detection on the wallpaper to obtain a first salient region; and if a size of the first salient region meets a first preset condition, cropping the first salient region, and performing special-shaped edge fitting on the cropped first salient region, to obtain the AOD pattern; or generating an organic shape if a size of the first salient region meets a second preset condition, and placing the first salient region into the organic shape, to obtain the AOD pattern.

In a possible implementation, the method further includes performing feathering processing on an edge of the AOD pattern. In this way, the edge of the AOD pattern may be smoother, and a display effect of the AOD pattern may be beautified, thereby improving viewing experience of the user.

In a possible implementation, the cropping the first salient region includes: directly cropping the first salient region to obtain the AOD pattern; or performing cropping and reducing or enlarging processing on the first salient region to obtain the AOD pattern. In this way, a size of the AOD pattern may be controlled within a reasonable range, and the display effect of the AOD pattern may be beautified, thereby improving viewing experience of the user.

In a possible implementation, the performing saliency detection on the wallpaper to obtain a first salient region includes: when the wallpaper includes a plurality of salient regions, using a salient region selected by the user as the first salient region; or determining the first salient region according to a preset rule. The preset rule includes determining the first salient region based on a saliency level of each of the plurality of salient regions. For example, a salient region having the highest saliency may be used as the first salient region.

In a possible implementation, the performing special-shaped edge fitting on the cropped first salient region includes: fitting an edge of the cropped first salient region based on a Bezier curve. The Bezier curve is a smooth curve. Fitting the edge of the cropped first salient region based on the Bezier curve can make the edge of the first salient region smoother, so that the edge of the AOD pattern is smoother, the display effect of the AOD pattern is beautified, and viewing experience of the user is improved.

In a possible implementation, the generating an organic shape if a face is detected includes: determining the organic shape based on a feature of the face, wherein the feature of the face comprises an orientation of the face. The generating an organic shape if a size of the first salient region meets a second preset condition includes: determining the organic shape based on a feature of the first salient region, where the feature of the first salient region includes a direction of a gravity center, a mass center, or a symmetry center of the first salient region. In this way, the AOD pattern including the organic shape can be made more in line with aesthetic composition, and viewing experience can be improved.

In a possible implementation, the organic shape is formed by the Bezier curve. The Bezier curve is a smooth curve, the organic shape is also a soft shape, and the AOD pattern obtained based on the organic shape will also make viewing experience of the user better.

In a possible implementation, the cutting out a face region from the wallpaper, and placing the face region into the organic shape includes: A preset distance is between a top of the face and a top of the organic shape, and the face is located at a golden ratio dividing line of the organic shape; or the face is placed in a center of the organic shape. In this way, a display region and the organic shape that include the face can be more in line with the aesthetic composition and can improve viewing experience.

In a possible implementation, when the electronic device is in the screen-off state, the electronic device further displays at least one type of information of time, an SMS message reminder, a missed call reminder, a message reminder of an application, weather, or a battery level. In this way, display content obtained when a screen is turned off can be richer, more information can be prompted for the user, so that the user does not miss important information, and user experience can be improved.

In a possible implementation, if the electronic device is in the screen-off state, the electronic device further displays time. A color of the time is determined based on a color of the AOD pattern, and the time is located in a direction opposite to a mass center, a gravity center, or a symmetry center of the AOD pattern. In this way, a visual balance can be achieved.

In a possible implementation, that the AOD pattern is moved from the second position of the display to a third position of the display includes: The time is moved simultaneously with the AOD pattern. The time gradually disappears in the moving process, or the time disappears after the AOD pattern moves to the third position. Such a design makes a product become diversified, increases interest, makes an AOD effect more vivid, and can improve user experience.

In a possible implementation, a source of the wallpaper set by the user includes at least one of a picture shot by the electronic device, a picture downloaded by the electronic device, or a screenshot of the electronic device. In this way, the display content of AOD may be determined based on any home screen wallpaper or lock screen wallpaper set by the user, to meet the personalized requirement of the user, and improve user experience.

According to a second aspect, an embodiment of this application provides an electronic device. The electronic device has a function of implementing the method according to the first aspect and any one of the possible implementations of the first aspect. The function may be implemented by hardware, or may be implemented by hardware executing corresponding software. The hardware or software includes one or more modules corresponding to the foregoing function.

According to a third aspect, this application provides a computer-readable storage medium. The computer-readable storage medium includes computer instructions. When the computer instructions are run on an electronic device, the electronic device is enabled to perform the method according to the first aspect and any one of the possible implementations of the first aspect.

According to a fourth aspect, this application provides a computer program product. When the computer program product runs on a computer, the computer is enabled to perform the method according to the first aspect and any one of the possible implementations of the first aspect.

According to a fifth aspect, an embodiment of this application provides a chip system. The chip system includes one or more interface circuits and one or more processors. The interface circuit and the processor are connected to each other through a line. The chip system may be used in an electronic device including a communication module and a memory. The interface circuit is configured to receive a signal from the memory in the electronic device, and send the received signal to the processor, and the signal includes computer instructions stored in the memory. When the processor executes the computer instructions, the electronic device may perform the method according to the first aspect and any one of the possible implementations of the first aspect.

DESCRIPTION OF EMBODIMENTS

The following describes the technical solutions in embodiments of this application with reference to the accompanying drawings in embodiments of this application. In descriptions of this application, unless otherwise specified, "at least one" means one or more, and "a plurality of" means two or more. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

To make descriptions of the following embodiments clear and concise, related concepts or technologies are first briefly described.

Saliency detection (saliency detection): Generally, when facing an image (a scene), a human eye automatically focuses on some regions that attract interest and selectively ignores regions that do not attract interest. These regions that attract interest are called salient regions. In the field of computational vision, a process of simulating this characteristic by image processing means is called saliency detection. Popularly speaking, saliency detection is to extract the most interesting part of an image.

Currently, saliency detection may be implemented in two categories: The first category is through a conventional image processing method, and the second category is through deep learning. A saliency map (saliency map) may be obtained through saliency detection. The saliency map may be a grayscale map, and a higher grayscale value indicates a higher saliency.

Figure 1:
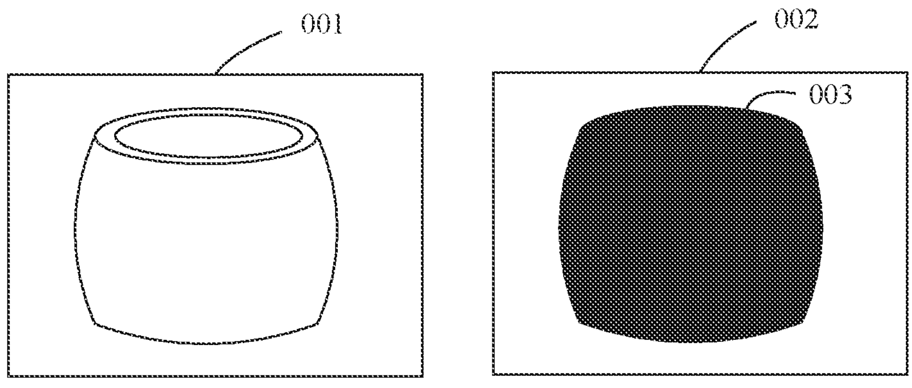
FIG. 1 is a schematic diagram of a salient region according to an embodiment of this application.

For example, as shown in FIG. 1, an image 002 may be obtained after saliency detection is performed on an image 001 (where the image 001 may be a picture that is taken by a user and that includes a sound box and has no other sundries). A region 003 in the image 002 has a high grayscale value, and may be considered as a salient region.

In this embodiment of this application, for a piece of wallpaper, when a face exists in the wallpaper, a region of interest includes a region in which the face is located. When there is no face in the wallpaper, a region of interest includes a salient region in the wallpaper. The region in which the face is located may be obtained based on a face detection algorithm (referring to the following related description), and the salient region may be obtained based on saliency detection.

Organic shape (also known as an organic form, or an organic graph): Usually, the organic shape refers to a shape that is different from an angular shape, and is mainly formed by a curve. For example, the organic shape may be formed by a Bezier curve.

Bezier curve: The definition of the Bezier curve includes a start point, an end point (also called anchor point), and a middle point. The Bezier curve includes a first order Bezier curve, a second order Bezier curve, a third order Bezier curve and so on. The third-order Bezier curve includes two middle points that are separated from each other. When the two middle points are slipped, a shape of the third-order Bezier curve changes.

Feathering processing. The principle of feathering processing is to blur a connecting part inside and outside a selected area (namely, a selected region) to play a role of morphing, to achieve a natural connection effect. A larger feathering value indicates a wider blurring range and a more natural connection effect.

Currently, display content of AOD may be designed for a wallpaper preset in a system (for example, the display content of AOD may be artificially designed based on the wallpaper, and the artificially designed display content of AOD is marked as final to-be-displayed content). However, it is difficult to achieve a similar effect for a wallpaper arbitrarily set by the user, and a personalized requirement of the user cannot be met.

An embodiment of this application provides an always on display method. An electronic device may detect a region of interest in a wallpaper set by a user, where the region of interest is located in a first position in the wallpaper. The electronic device determines an always on display AOD pattern based on the region of interest. When the electronic device is in a screen-off state, the electronic device displays the AOD pattern in a second position on a display. In this way, display content of AOD may be determined based on any home screen wallpaper or lock screen wallpaper set by the user, to meet a personalized requirement of the user, and improve user experience. In addition, when the user lights up the display of the electronic device (entering an unlocking interface or a home screen from an always on interface), the electronic device may display the AOD pattern transferring from a preset position (the second position) to a third position (determined based on a position of the region of interest in the lock screen wallpaper or the home screen wallpaper), and then diffuse an animation that lights up the wallpaper. Such an animation effect formed by the AOD pattern and the wallpaper may provide a better user experience.

Figure 2:
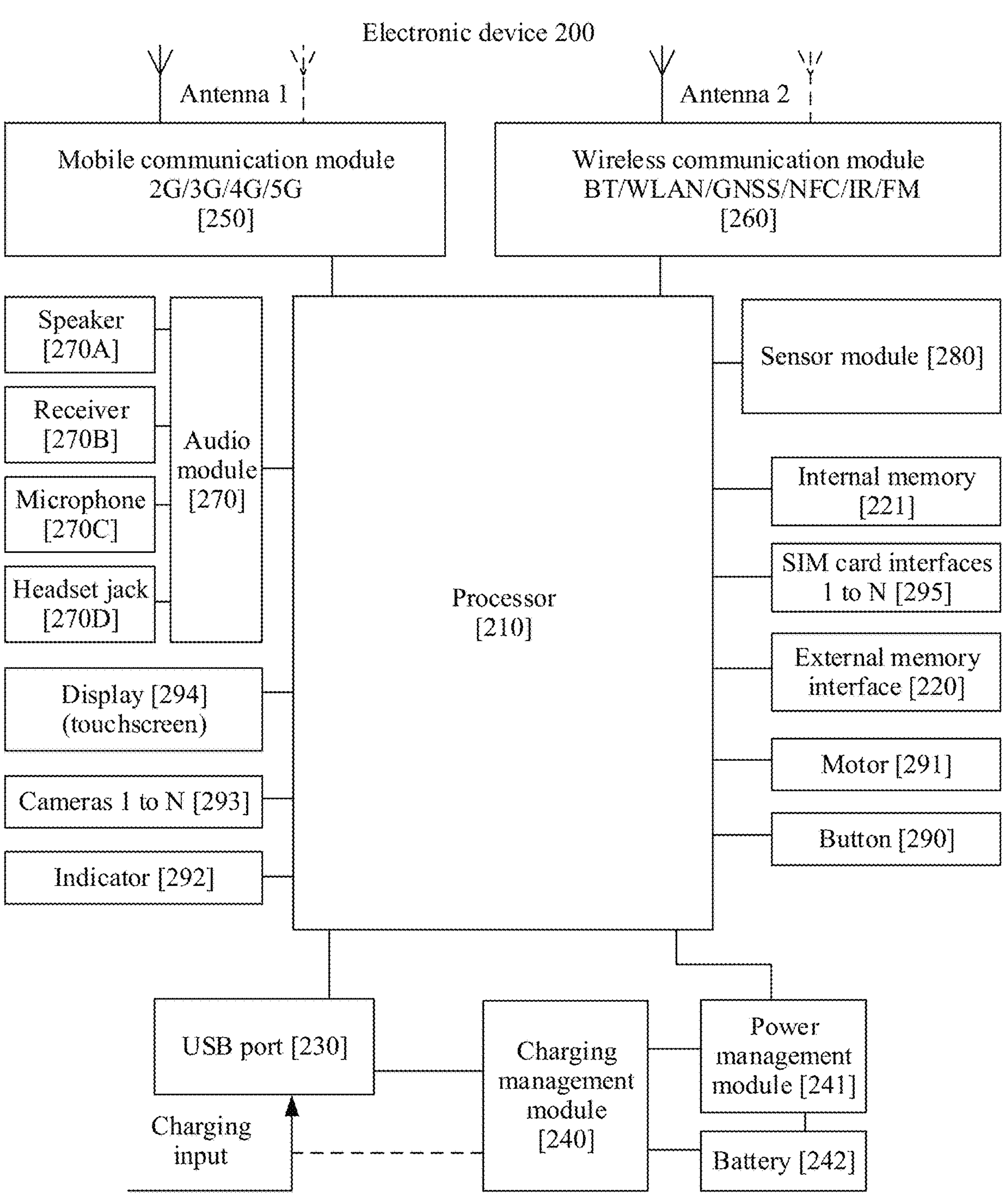
FIG. 2 is a schematic diagram of a structure of an electronic device according to an embodiment of this application.

As shown in FIG. 2, a structure of the electronic device (for example, a mobile phone) provided in this embodiment of this application is described by using an example. The electronic device 200 may include a processor 210, an external memory interface 220, an internal memory 221, a universal serial bus (universal serial bus, USB) port 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identity module, SIM) card interface 295, and the like.

The sensor module 280 may include sensors, such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment constitutes no specific limitation on the electronic device 200. In some other embodiments, the electronic device 200 may include more or fewer components than those shown in the figure, or some components may be combined, or some components may be split, or different component arrangements may be used. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache memory. The memory may store instructions or data just used or cyclically used by the processor 210. If the processor 210 needs to use the instructions or the data again, the processor may directly invoke the instructions or the data from the memory. This avoids repeated access, reduces waiting time of the processor 210, and improves system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface. MIPI), a general-purpose input/output (general-purpose input/output, GPIO) interface, a subscriber identity module (subscriber identity module, SIM) interface, a universal serial bus (universal serial bus, USB) port, and/or the like.

It may be understood that an interface connection relationship between the modules shown in this embodiment is merely an example for description, and does not constitute a limitation on the structure of the electronic device 200. In some other embodiments, the electronic device 200 may alternatively use an interface connection manner different from that in the foregoing embodiment, or a combination of a plurality of interface connection manners.

The charging management module 240 is configured to receive a charging input from a charger. The charger may be a wireless charger or a wired charger. The charging management module 240 supplies power to the electronic device through the power management module 241 while charging the battery 242.

The power management module 241 is configured to connect to the battery 242, the charging management module 240, and the processor 210. The power management module 241 receives an input from the battery 242 and/or the charging management module 240, and supplies power to the processor 210, the internal memory 221, an external memory, the display 294, the camera 293, the wireless communication module 260, and the like. In some embodiments, the power management module 241 and the charging management module 240 may alternatively be disposed in a same component.

A wireless communication function of the electronic device 200 may be implemented through the antenna 1, the antenna 2, the mobile communication module 250, the wireless communication module 260, the modem processor, the baseband processor, and the like. In some embodiments, the antenna 1 and the mobile communication module 250 in the electronic device 200 are coupled, and the antenna 2 and the wireless communication module 260 in the electronic device 200 are coupled, so that the electronic device 200 can communicate with a network and another device by using a wireless communication technology.

The antenna 1 and the antenna 2 are configured to transmit and receive an electromagnetic wave signal. Each antenna in the electronic device 200 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 250 may provide a wireless communication solution that includes 2G/3G/4G/5G or the like and that is applied to the electronic device 200. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering or amplification on the received electromagnetic wave, and transmit the electromagnetic wave to the modem processor for demodulation.

The mobile communication module 250 may further amplify a signal modulated by the modem processor, and convert the signal into an electromagnetic wave for radiation through the antenna 1. In some embodiments, at least some function modules in the mobile communication module 250 may be disposed in the processor 210. In some embodiments, at least some function modules of the mobile communication module 250 may be disposed in a same device as at least some modules of the processor 210.

The wireless communication module 260 may provide a wireless communication solution that is applied to the electronic device 200 and that includes a WLAN (for example, (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

The wireless communication module 260 may be one or more components integrating at least one communication processor module. The wireless communication module 260 receives an electromagnetic wave through the antenna 2, performs frequency modulation and filtering processing on the electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

The electronic device 200 may implement a display function through the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs, which execute program instructions to generate or change display information.

The display 294 is configured to display an image, a video, and the like. The display 294 includes a display panel.

The electronic device 200 may implement an image shooting function through the ISP, the camera 293, the video codec, the GPU, the display 294, the application processor, and the like. The ISP is configured to process data fed back by the camera 293. The camera 293 is configured to capture a static image or a video. In some embodiments, the electronic device 200 may include one or N cameras 293, where N is a positive integer greater than 1.

The external memory interface 220 may be used to connect to an external storage card, for example, a micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store computer-executable program code. The executable program code includes instructions. The processor 210 runs the instructions stored in the internal memory 221, to perform various function applications of the electronic device 200 and data processing. For example, in this embodiment of this application, the processor 210 may execute the instructions stored in the internal memory 221, and the internal memory 221 may include a program storage region and a data storage region.

The program storage region may store an operating system, an application required by at least one function (for example, a voice playing function or an image playing function), and the like. The data storage region may store data (such as audio data and an address book) created during use of the electronic device 200, and the like. In addition, the internal memory 221 may include a high-speed random access memory, or may include a nonvolatile memory, for example, at least one magnetic disk storage device, a flash memory device, or a universal flash storage (universal flash storage, UFS).

The electronic device 200 can implement an audio function such as music playing or recording through the audio module 270, the speaker 270A, the receiver 270B, the microphone 270C, the headset jack 270D, the application processor, and the like.

The button 290 includes a power button, a volume button, and the like. The button 290 may be a mechanical button, or may be a touch button. The motor 291 may generate a vibration prompt. The motor 291 may be configured to provide an incoming call vibration prompt and a touch vibration feedback. The indicator 292 may be an indicator light, and may be configured to indicate a charging status and a power change, or may be configured to indicate a message, a missed call, a notification, and the like. The SIM card interface 295 is used to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like.

For ease of understanding, the always on display method provided in the embodiment of this application is specifically described by using an example in which the electronic device is a mobile phone with reference to the accompanying drawings.

Figure 3A:
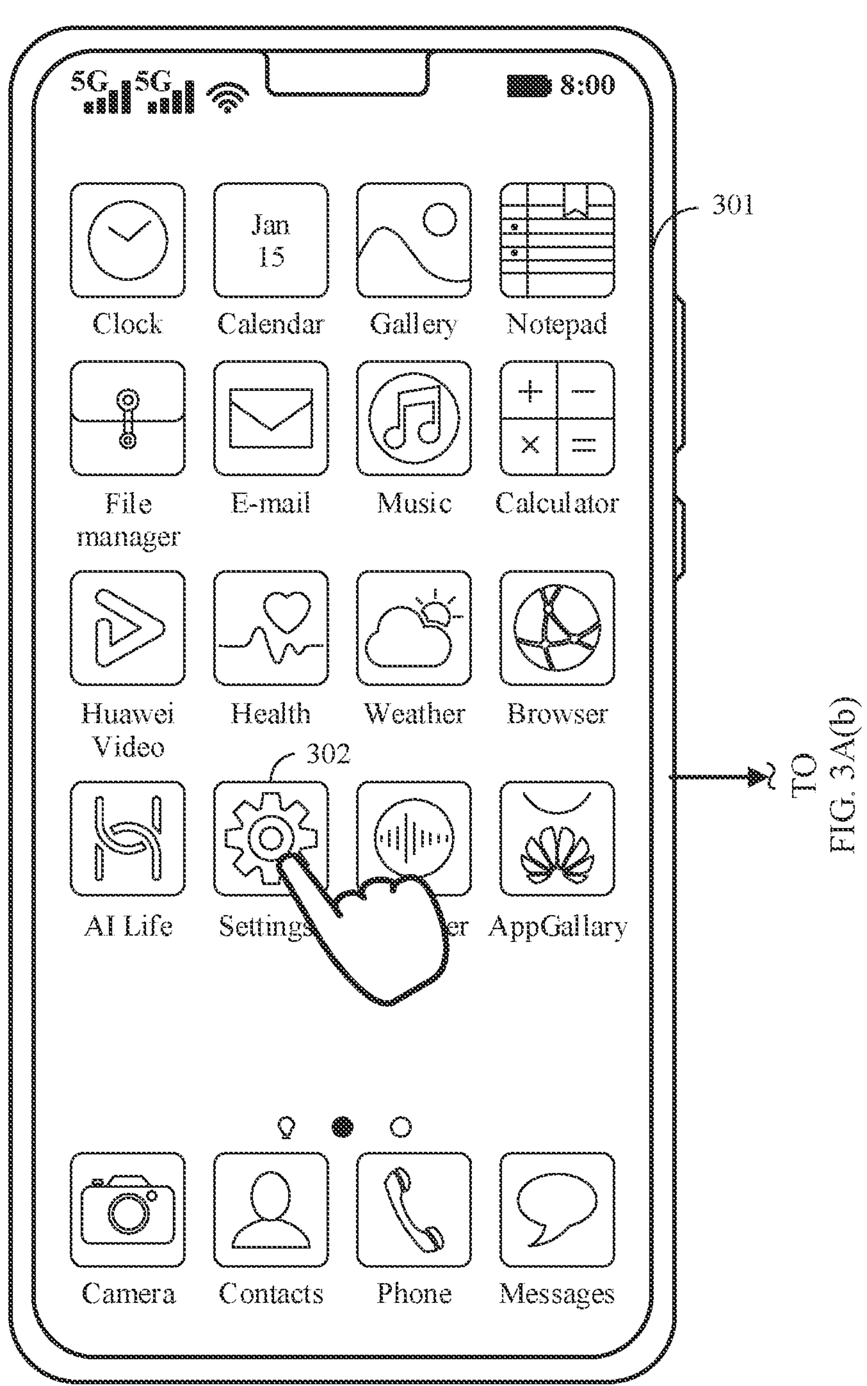
FIG. 3A(a) to FIG. 3A(e) are a schematic display diagram according to an embodiment of this application.
Figure 3A:
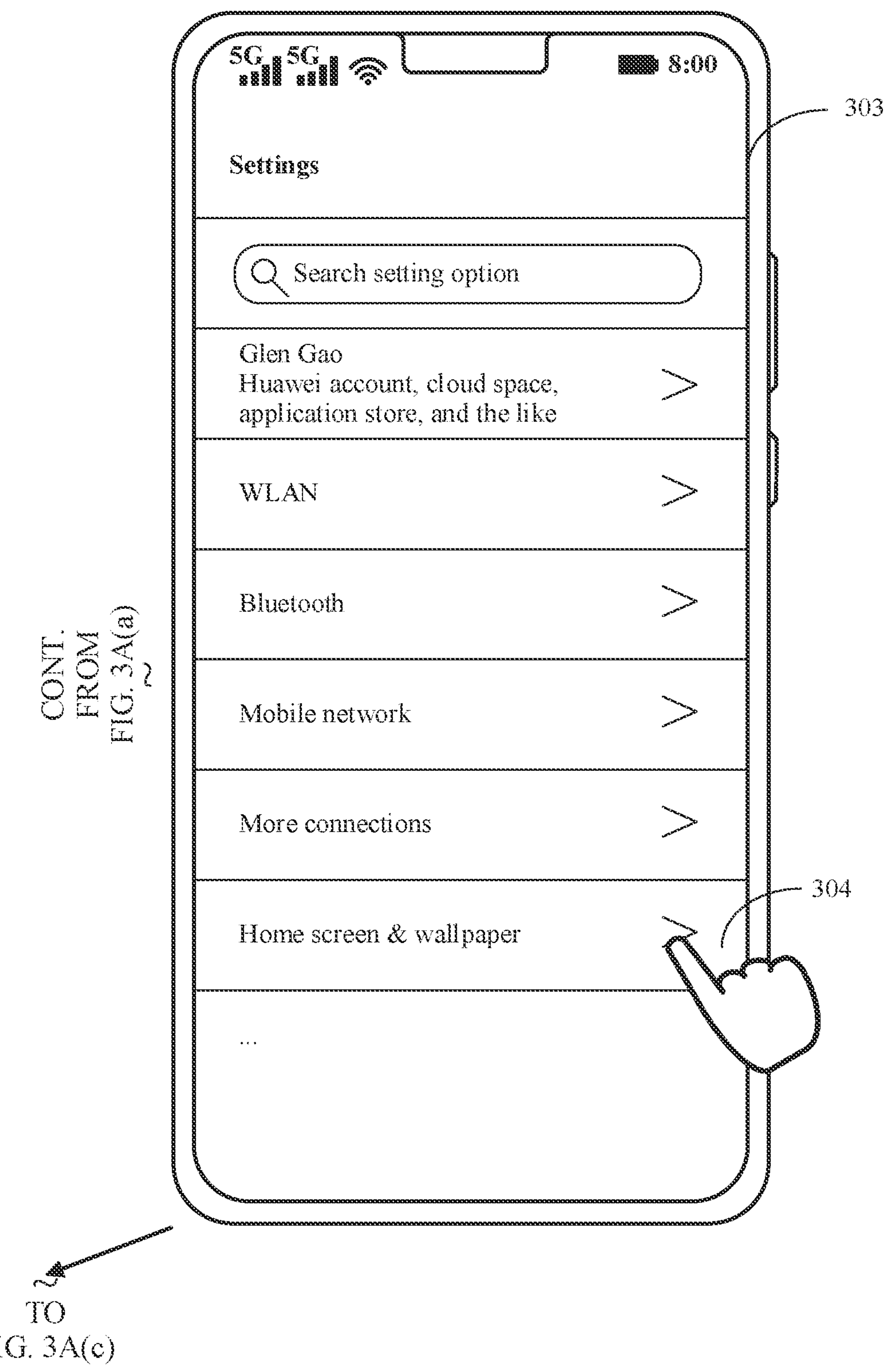
Figure 3A:
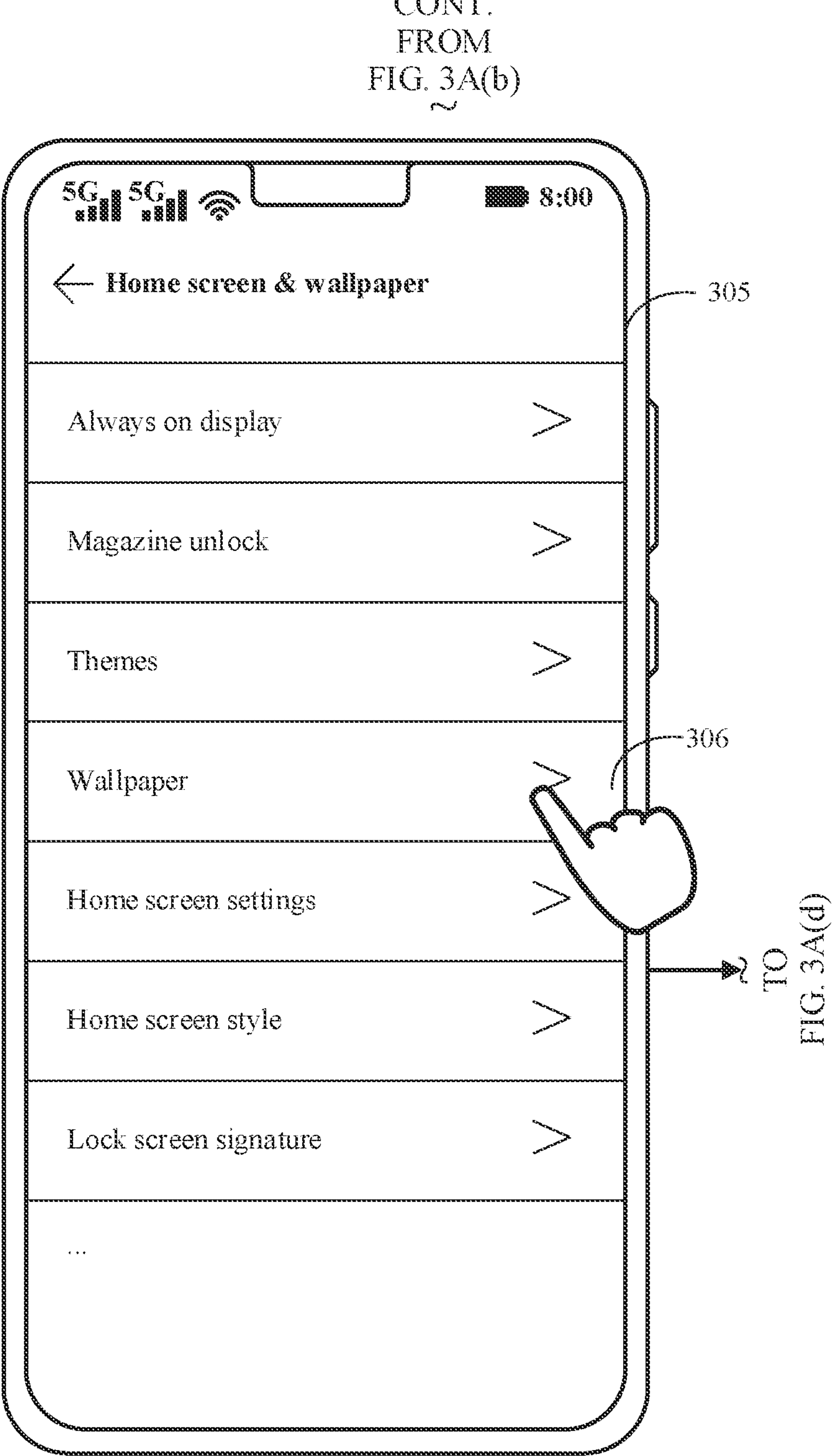
Figure 3A:
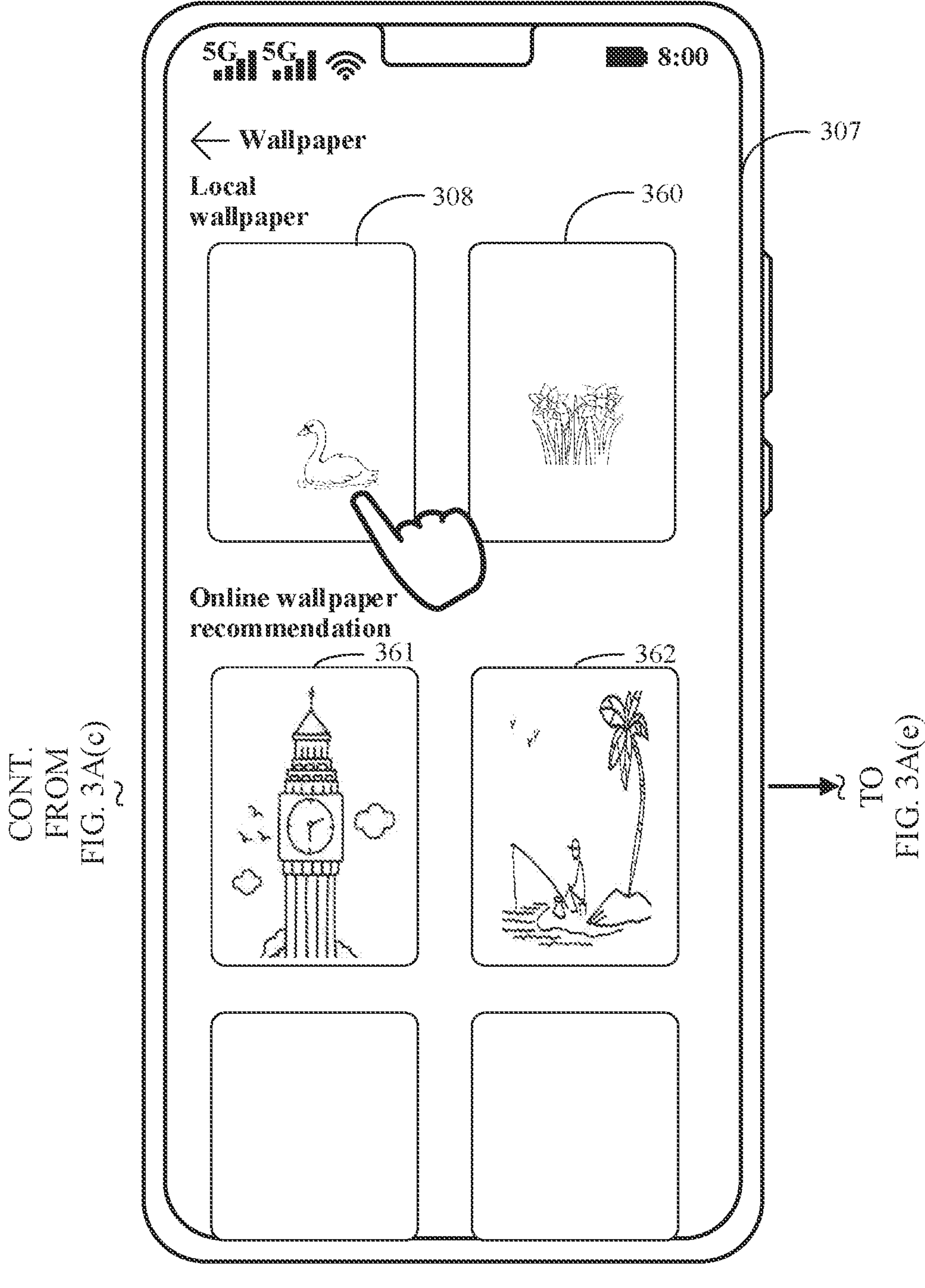
Figure 3A:
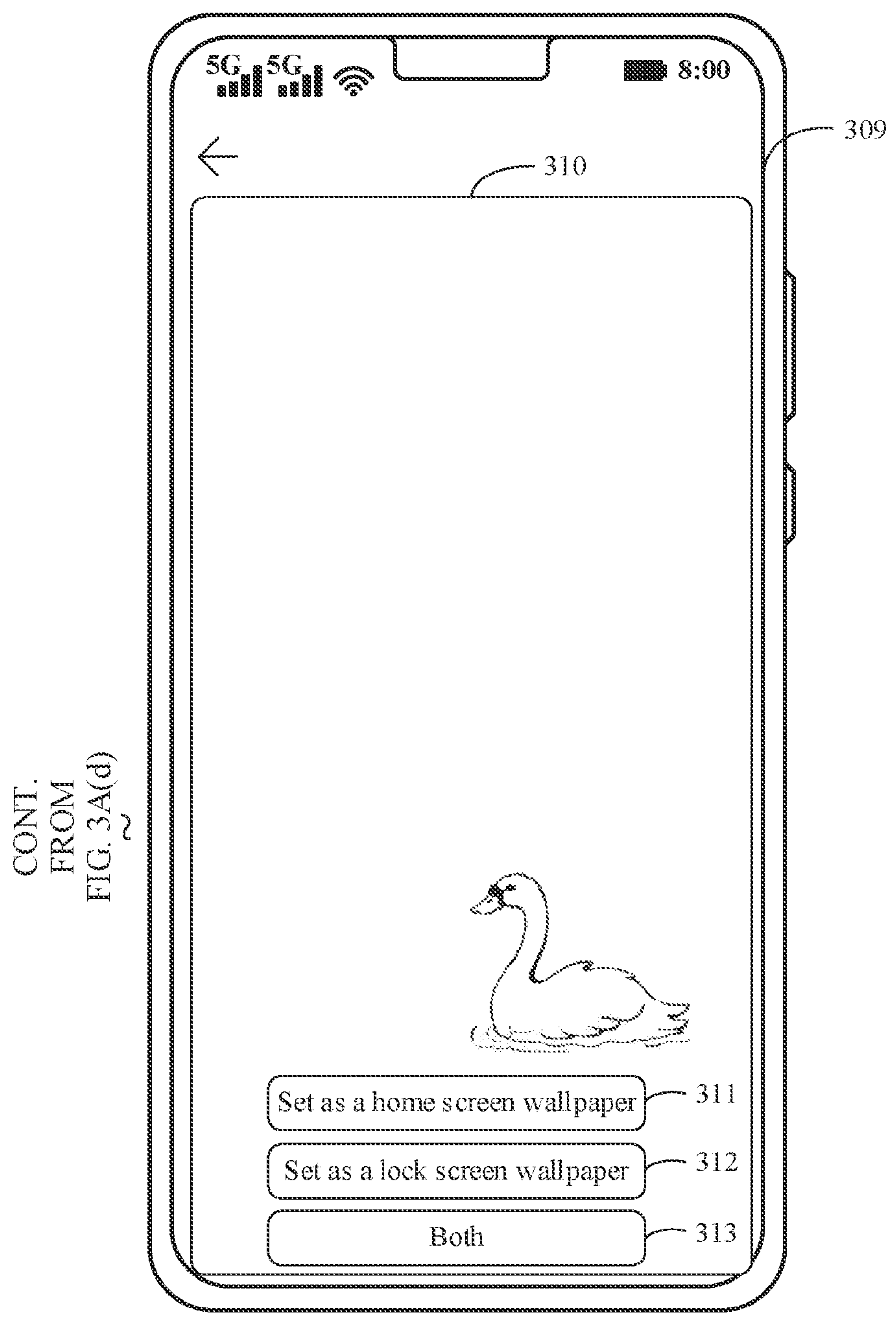

As shown in FIG. 3A(a), after detecting an operation of tapping a setting application 302 by a user on a home screen 301 of a mobile phone A, the mobile phone may display a setting interface 303 shown in FIG. 3A(b). The setting interface 303 may include a plurality of setting options, for example, may include a personal account setting item (for example, Glen Gao), a WLAN setting item, a Bluetooth setting item, a mobile network setting item, a more connection setting item, a home screen and wallpaper setting item, and the like. In response to the user tapping a region 304 corresponding to the home screen and wallpaper setting item, as shown in FIG. 3A(c), the mobile phone may display a home screen and wallpaper interface 305. The home screen and wallpaper interface 305 may include a plurality of setting options, for example, may include an always on display (which may also be referred to as screen-off display) option, a magazine unlock option, a theme option, a wallpaper option, a home screen setting option, a home screen style option, and a lock screen signature option. In response to an operation of tapping a region 306 corresponding to the wallpaper option by the user, as shown in FIG. 3A(d), the mobile phone may display a wallpaper interface 307, and the wallpaper interface 307 may include a local wallpaper and an online wallpaper. In response to an operation of tapping a wallpaper 308 by the user, as shown in FIG. 3A(e), the mobile phone may display an interface 309. The interface

309 may include an original image 310 of the wallpaper 308 and three operation options, which are respectively an option 311 for setting as a home screen wallpaper, an option 312 for setting as a lock screen wallpaper, and a both option (namely, an option for setting as both the lock screen wallpaper and the lock screen wallpaper) 313. If the user selects the both option 313, in response to the operation of the user, the mobile phone may set the wallpaper 310 as both the home screen wallpaper and the lock screen wallpaper, that is, the home screen wallpaper and the lock screen wallpaper are the same. Certainly, the user may separately set the home screen wallpaper and the lock screen wallpaper. (That is, the home screen wallpaper and the lock screen wallpaper may be different). This is not limited in this application.

Figure 3B:
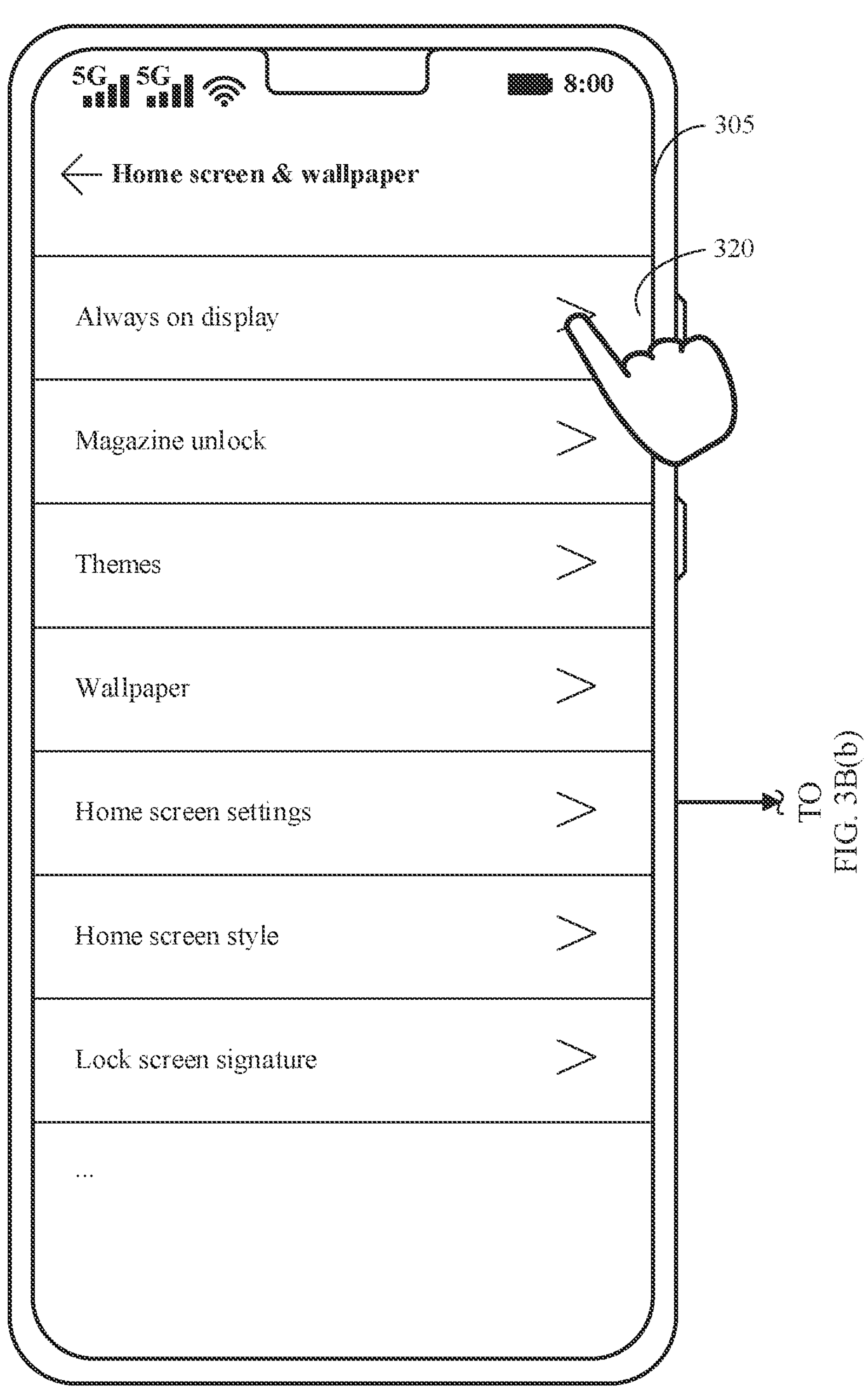
FIG. 3B(a) and FIG. 3B(b) are another schematic display diagram according to an embodiment of this application.
Figure 3B:
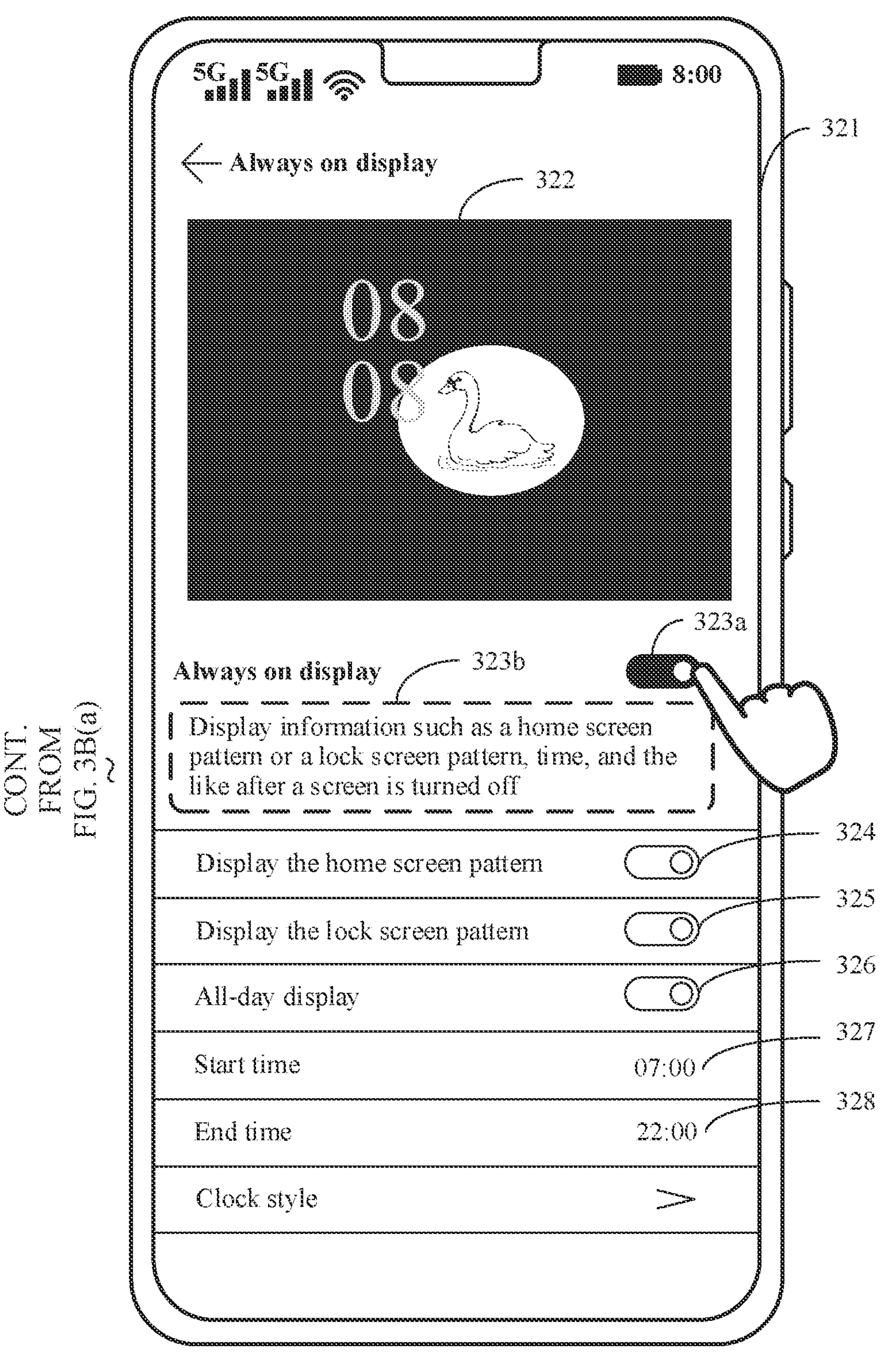

After the user completes setting the wallpaper, as shown in FIG. 3B(a), the user may return to the interface 305. In response to an operation of tapping a region 320 corresponding to always on display by the user, as shown in FIG. 3B(b), the mobile phone may display an always on display interface 321. A prompt animation/prompt picture 322 may be used to demonstrate an always on display effect to the user. A button 323*a* corresponding to always on display is used for the user to select whether to enable an always on display function. After reading a prompt text 323*b*, the user may know the always on display function, and determine whether to turn on the switch 323*a*. If the user turns on the switch 323*a*, it indicates that the user agrees to enable the always on display function. In this way, the mobile phone A may display information such as a home screen pattern or a lock screen pattern, time, and the like after the display is turned off. Optionally, the mobile phone may further display information such as an SMS message reminder, a message reminder of an application, or a battery level.

Further, the user may voluntarily choose whether to display the home screen pattern when the screen is turned off (that is, determine an AOD pattern based on the home screen wallpaper, and finally display the AOD pattern when the screen is turned off) or the lock screen pattern when the screen is turned off (that is, determine an AOD pattern based on the lock screen wallpaper, and finally display the AOD pattern when the screen is turned off). For the AOD pattern, refer to the following related description. The user may tap a button 324 to select to display the home screen pattern, or the user may tap a button 325 to select to display the lock screen pattern. When the lock screen wallpaper is the same as the home screen wallpaper, an effect of selecting, by the user, to display the home screen pattern or the lock screen pattern is the same. When the lock screen wallpaper is different from the home screen wallpaper, an effect of selecting, by the user, to display the home screen pattern or the lock screen pattern is different. Generally, the user cannot select to display the home screen pattern and the lock screen pattern at the same time. When the user selects one display mode, a button corresponding to another display mode may be grayed out (namely, unavailable). The user may also set duration of always on display. For example, the user may select all-day display by using a button 326 (that is, always on display is performed when the screen is turned off in any time period of a day), or the user may voluntarily determine a start time and an end time of always on display. The user may adjust the start time (for example, to start at 7:00) and the end time (for example, to end at 22:00) of always on display by using a time control 327 and a time control 328. The user may also voluntarily select a clock style when the screen is turned off.

Figure 3C:
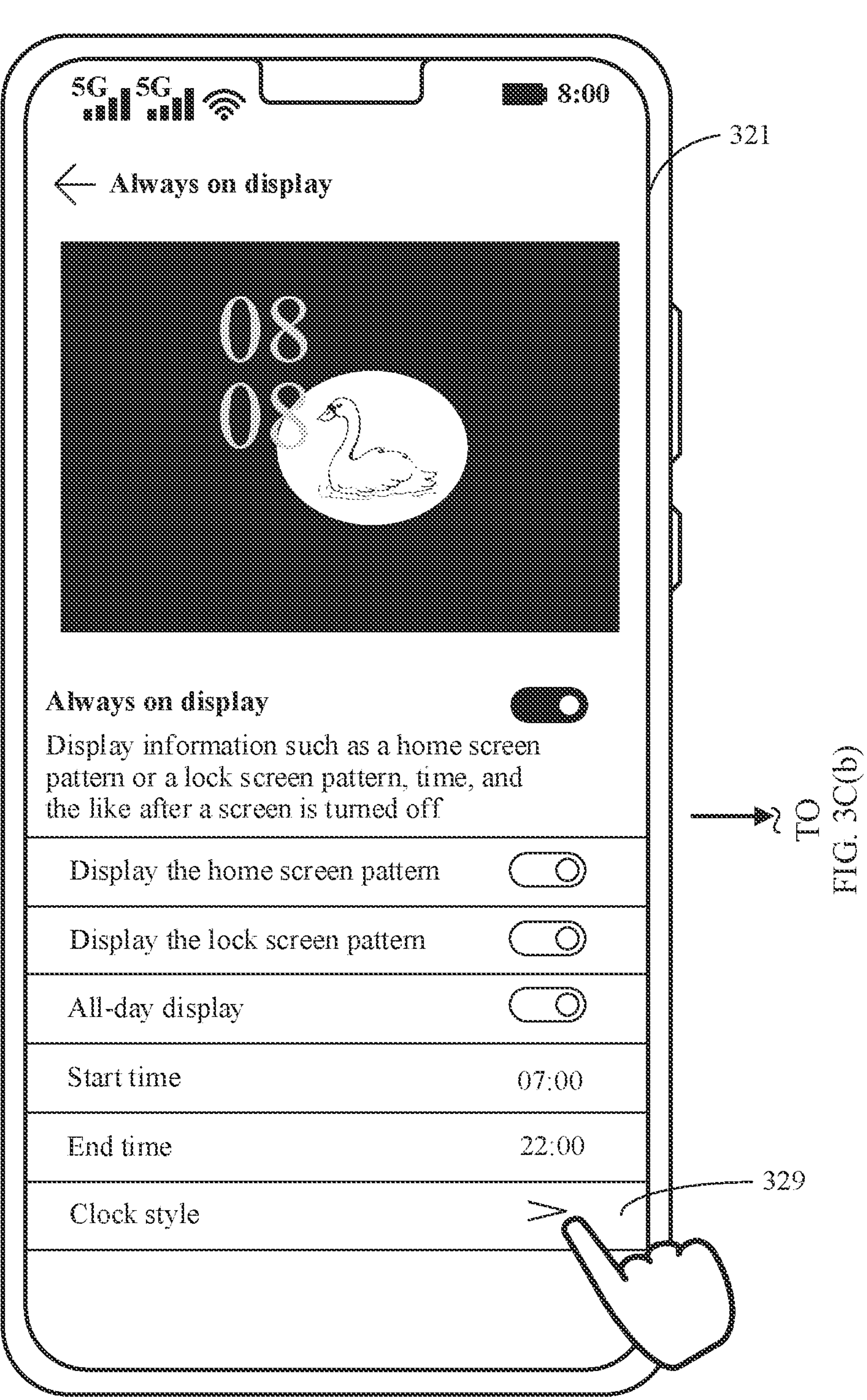
FIG. 3C(a) and FIG. 3C(b) are another schematic display diagram according to an embodiment of this application.
Figure 3C:
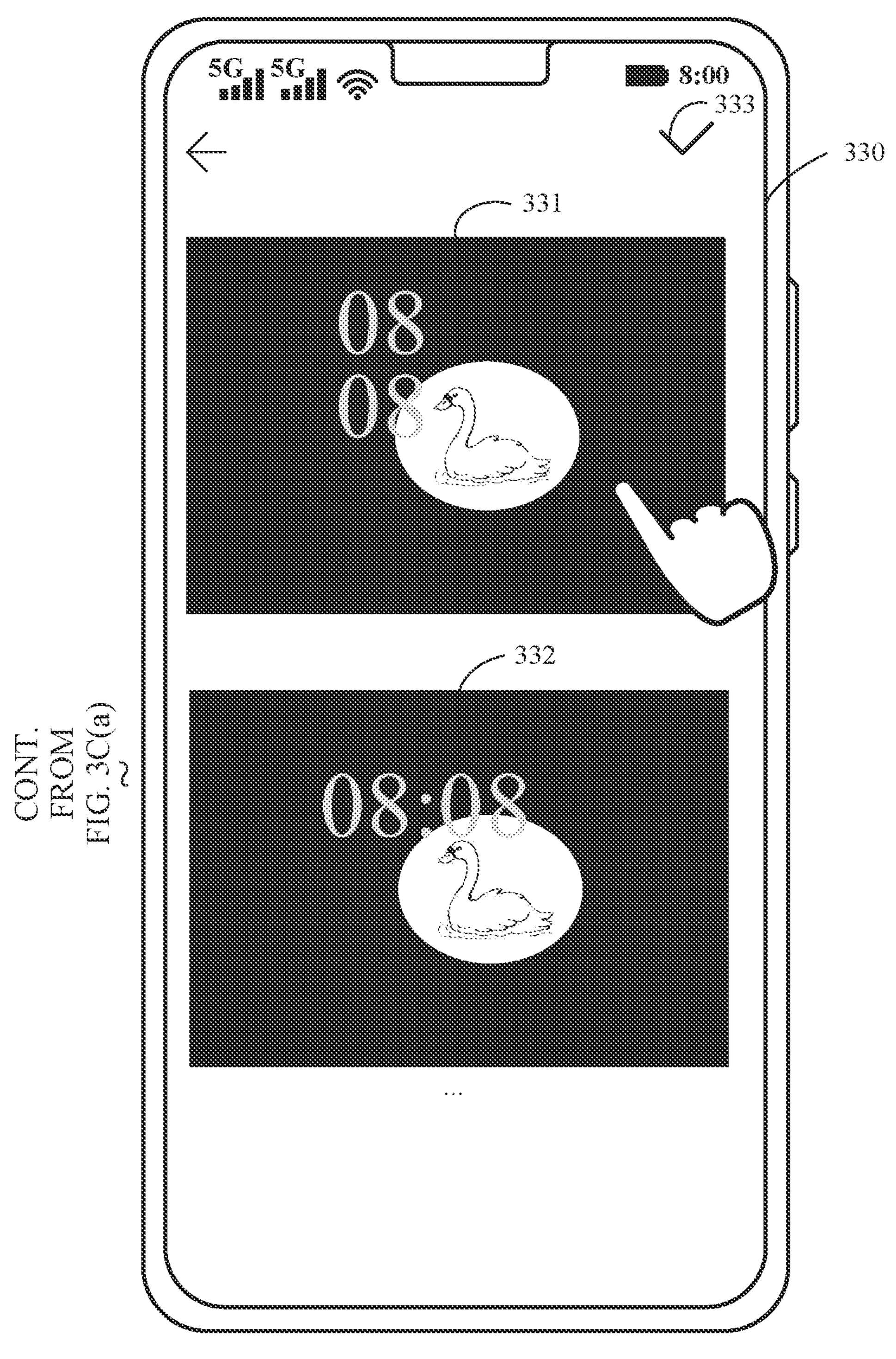

As shown in FIG. 3C(a), in response to an operation of tapping, by the user on the interface 321, a region 329 corresponding to the clock style, as shown in FIG. 3C(b), the mobile phone may display an interface 330. The interface 330 may include a clock display style 331 and a clock display style 332. The clock display style 331 uses a manner of displaying time in a single row (where the time is displayed in one row), and the clock display style 332 uses a manner of displaying the time in two rows (where the time is displayed in two rows). For example, the mobile phone may display a clock (the time) in a clock display style selected by the user in response to an operation of selecting the clock display style 331 and clicking a finish button 333 by the user. Optionally, the clock display style 331 may be a default display style of the mobile phone. Certainly, the mobile phone may provide more other clock display styles. This is not limited in this application.

In some embodiments, when the lock screen wallpaper is different from the home screen wallpaper, if the user chooses to display the home screen pattern when the screen is turned off, the AOD pattern displayed when the screen of the mobile phone is turned off may be determined based on a region of interest of the home screen wallpaper. It should be noted that, in this embodiment of this application, the AOD pattern displayed by the mobile phone is determined based on a region of interest in a wallpaper set by the user, but is not designed in advance (for example, manually set by a designer). For any wallpaper set by the user, the AOD pattern may be intelligently displayed, to better meet the personalized requirement of the user.

The following describes different cases in which the user chooses to display the home screen pattern when the screen is turned off.

(1) When the user enters a home screen from a screen-off state, the AOD pattern and the home screen wallpaper may present a continuous animation effect.

Figure 4A:
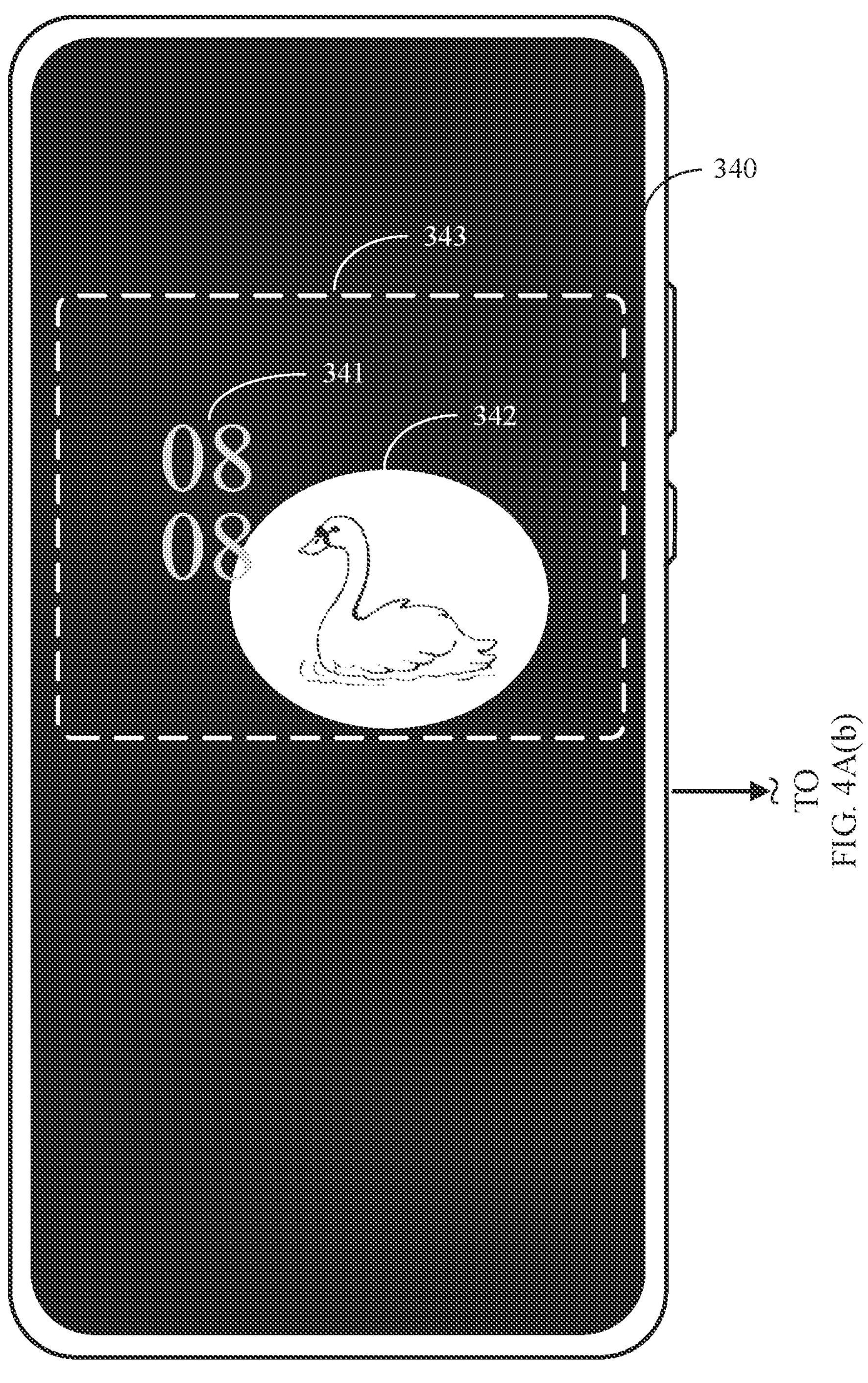
FIG. 4A(a) to FIG. 4A(e) are another schematic display diagram according to an embodiment of this application.
Figure 4A:
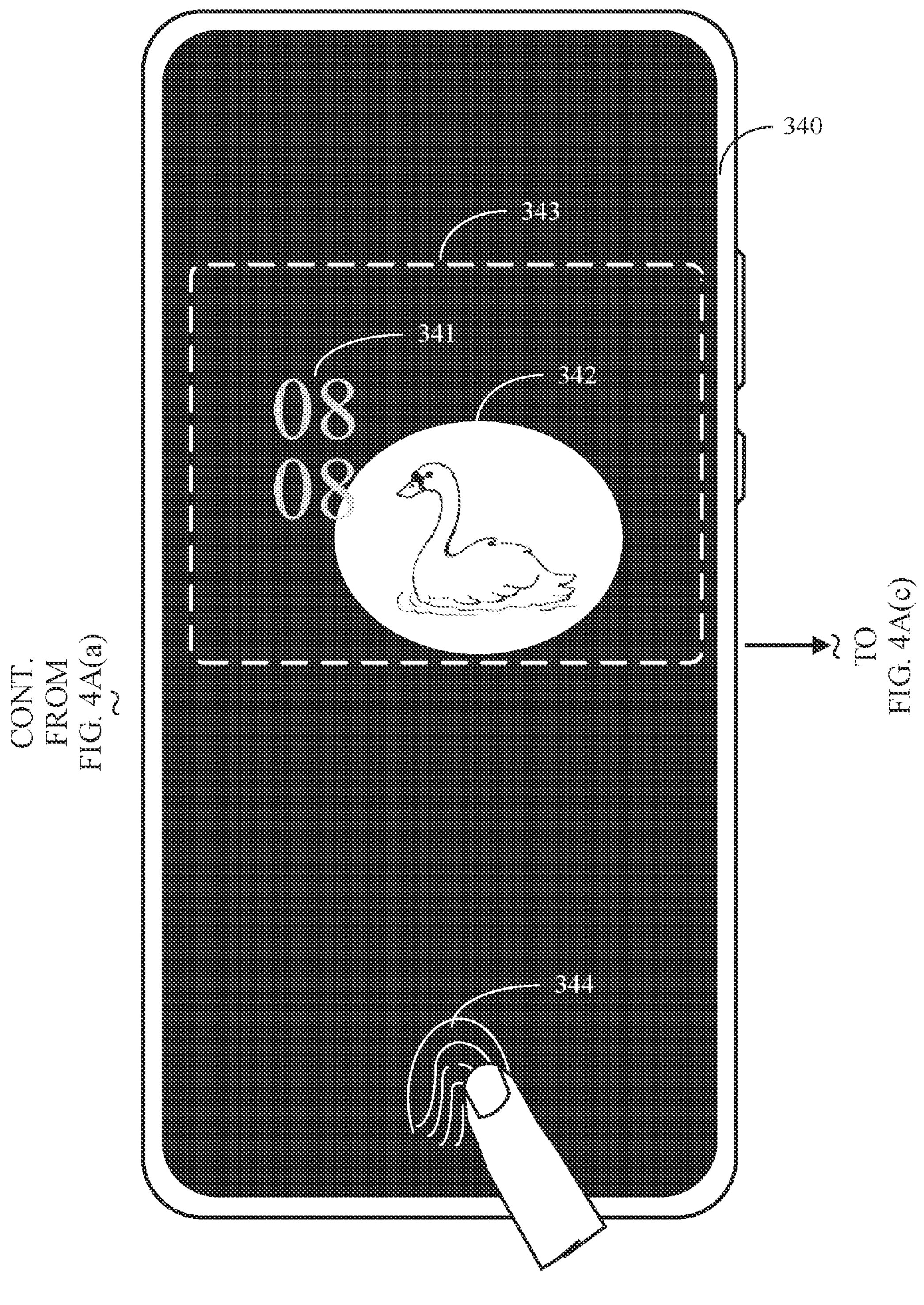
Figure 4A:
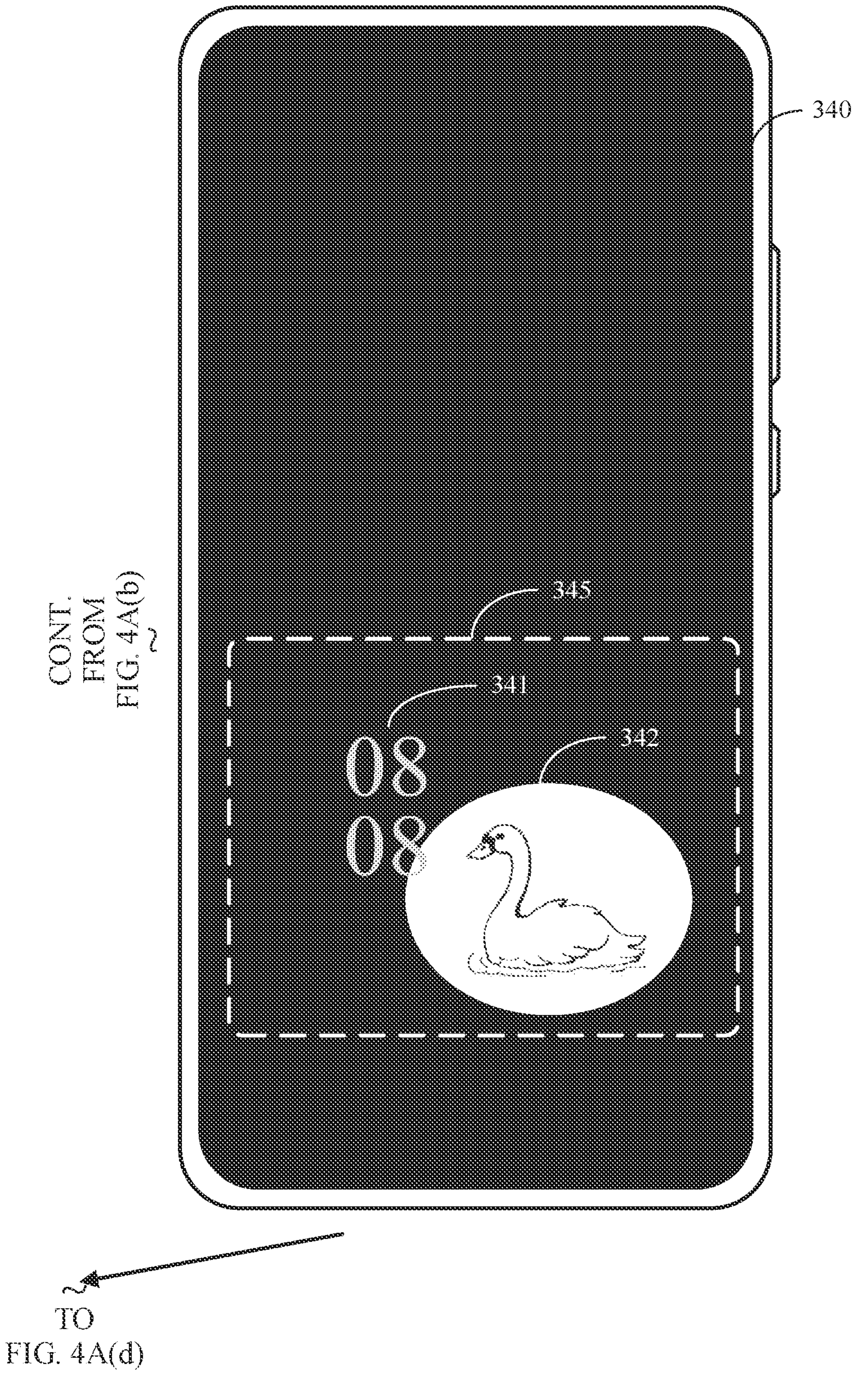
Figure 4A:
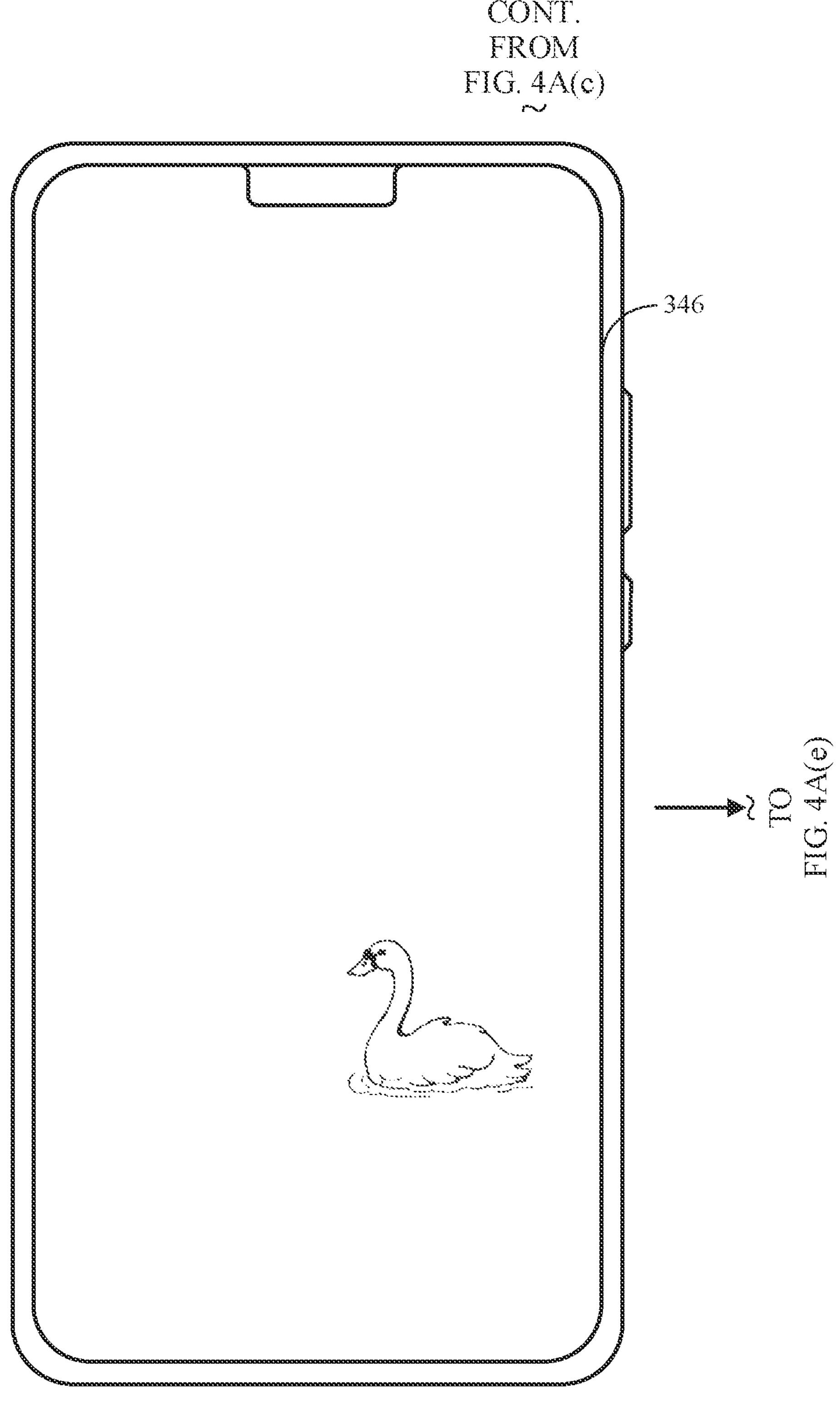
Figure 4A:
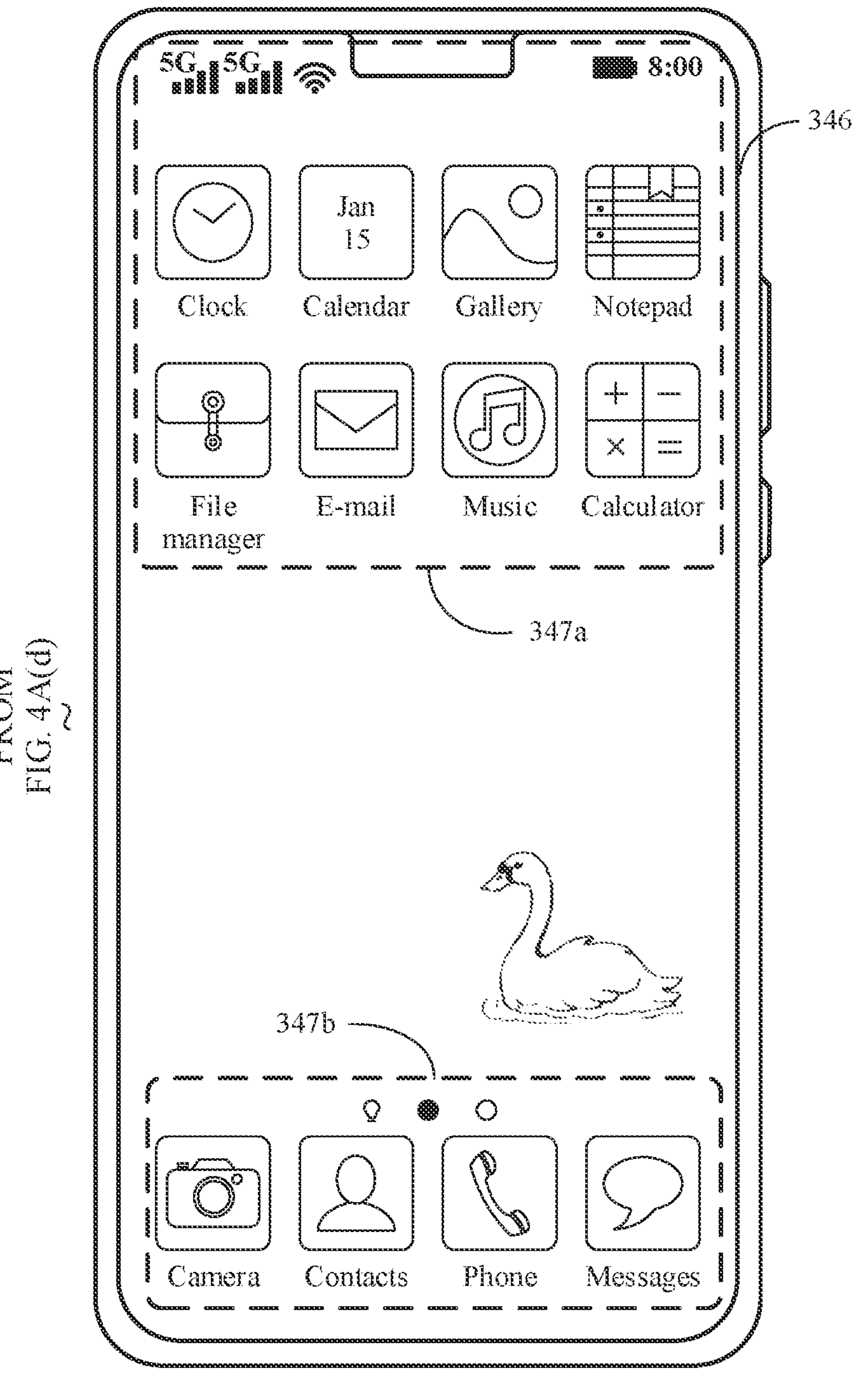

For example, as shown in FIG. 4A(a), when the mobile phone is in a screen-off state (the screen is turned off) and is placed still (for example, placed on a desk), the mobile phone may perform AOD, that is, display an always on interface 340. Display content of AOD may be displayed in a display region 343 of the always on interface 340. The display content of AOD may include a time control (hereinafter, referred to as time) 341 and a pattern (hereinafter, referred to as an AOD pattern) 342 extracted from the home screen wallpaper. The AOD pattern 342 may be cut from the home screen wallpaper after saliency detection (for a saliency detection process, refer to related descriptions below), and an edge of the AOD pattern 342 is an organic shape (for a calculation process of the organic shape, refer to related descriptions below). If fingerprint recognition is set on the mobile phone, when a sensor of the mobile phone detects that the user picks up the mobile phone, touches the mobile phone, or approaches the mobile phone, as shown in FIG. 4A(b), the mobile phone may display a fingerprint pattern 344 on the always on interface 340. In response to an operation of entering a fingerprint by the user, as shown in FIG. 4A(c), the time 341 and the AOD pattern 342 may be transferred from the display region 343 (a middle position of the display) to a specific position in a display region 345 (a lower right corner of the display). Optionally, the time 341 may gradually fade (that is, a color gradually fades/becomes transparent) in a moving process. The specific position in the display region 345 may be an original position of the AOD pattern 342 in the home screen wallpaper. Then, as shown in FIG. 4A(d), the mobile phone may light up a wallpaper on a home screen 346 in a diffused manner. Then, as shown in FIG. 4A(e), the mobile phone may display another application icon (briefly referred to as an icon below) and/or a control (for example, a time control) on the home screen 346, and the like, including icons and/or controls in a display region 347*a* and a display region 347*b*. In this way, when the user unlocks the mobile phone, the mobile phone may display the AOD pattern returning back to the original position (a position of the AOD pattern in the home screen wallpaper) from the middle position, light up the home screen wallpaper in the diffused manner, and then display a quick animation of another icon and/or control on the home screen. Such an animation effect formed by the AOD pattern and content of the home screen may provide a better user experience. In addition, because the AOD pattern is extracted from the wallpaper voluntarily set by the user, the personalized requirement of the user can be met.

Optionally, as shown in FIG. 4A(a) or FIG. 4A(b), when always on display is performed, the time 341 and the AOD pattern 342 in the display region 343 may be dim, to avoid eye discomfort of the user due to excessive glare. When the user enters a fingerprint for unlocking, as shown in FIG. 4A(c) and FIG. 4A(d), the AOD pattern 342 may gradually become brighter, and gradually increase brightness that is the same as that of the home screen, so that eye comfort of the user can be improved, and user experience can be improved.

Figure 4B:
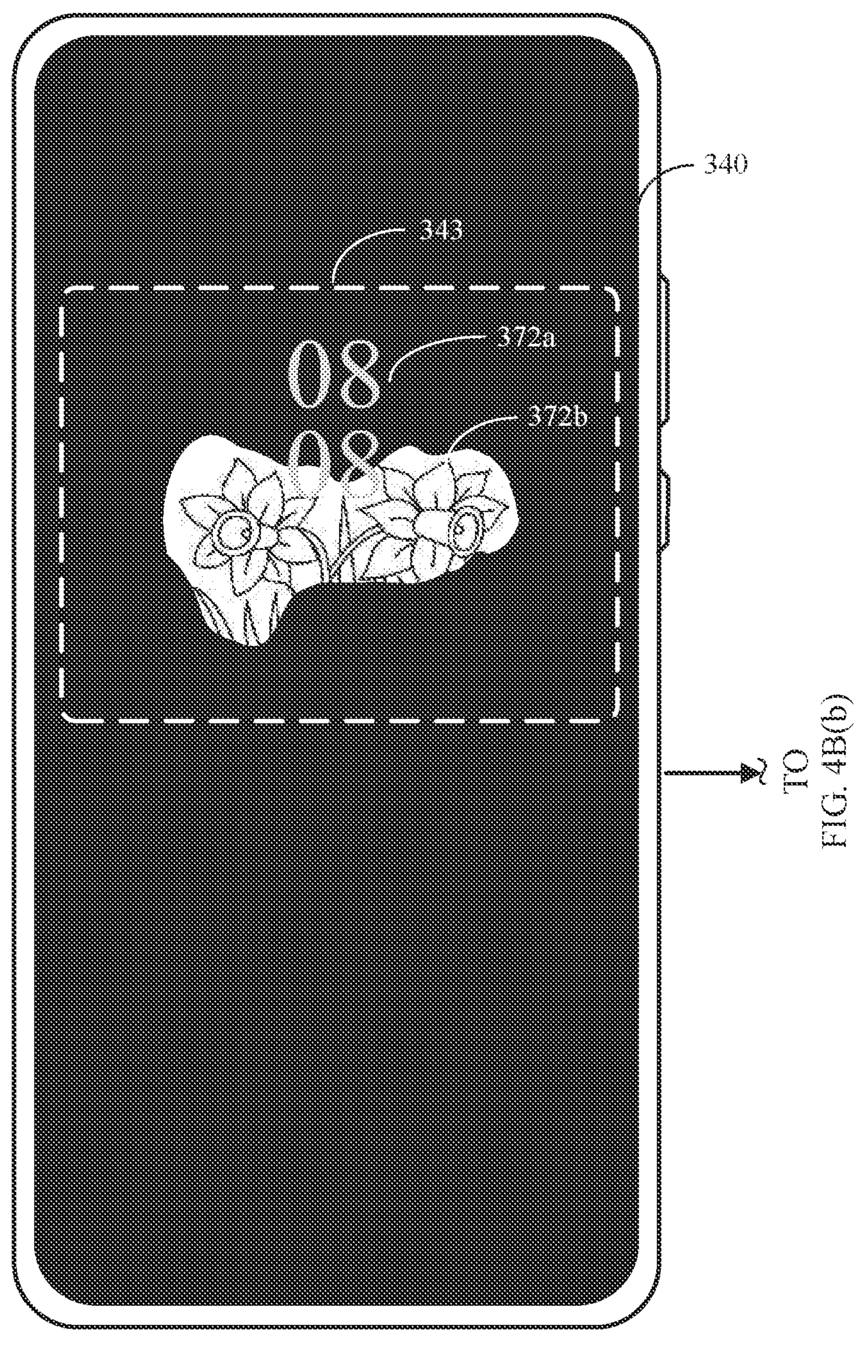
FIG. 4B(a) to FIG. 4B(e) are another schematic display diagram according to an embodiment of this application.
Figure 4B:
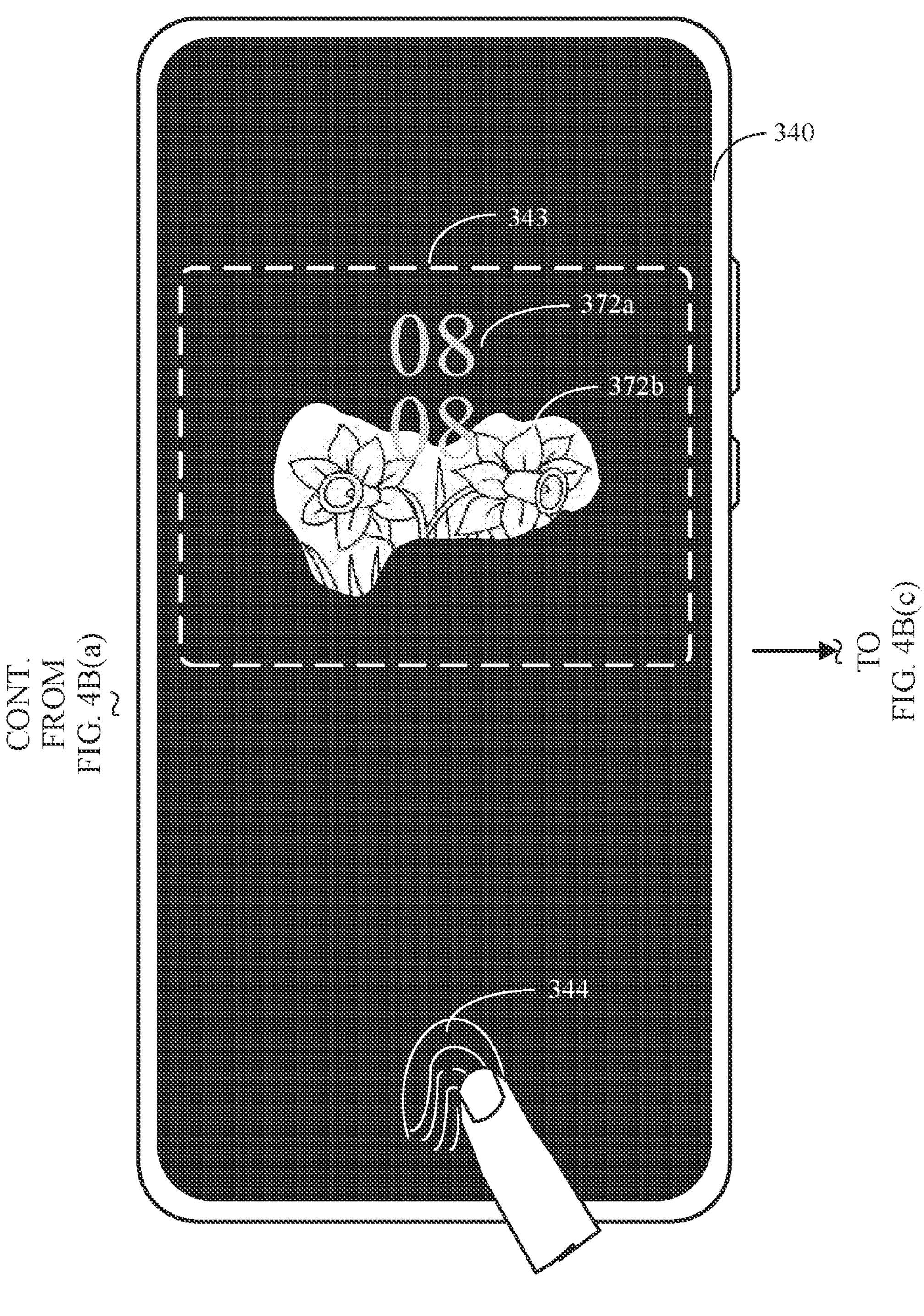
Figure 4B:
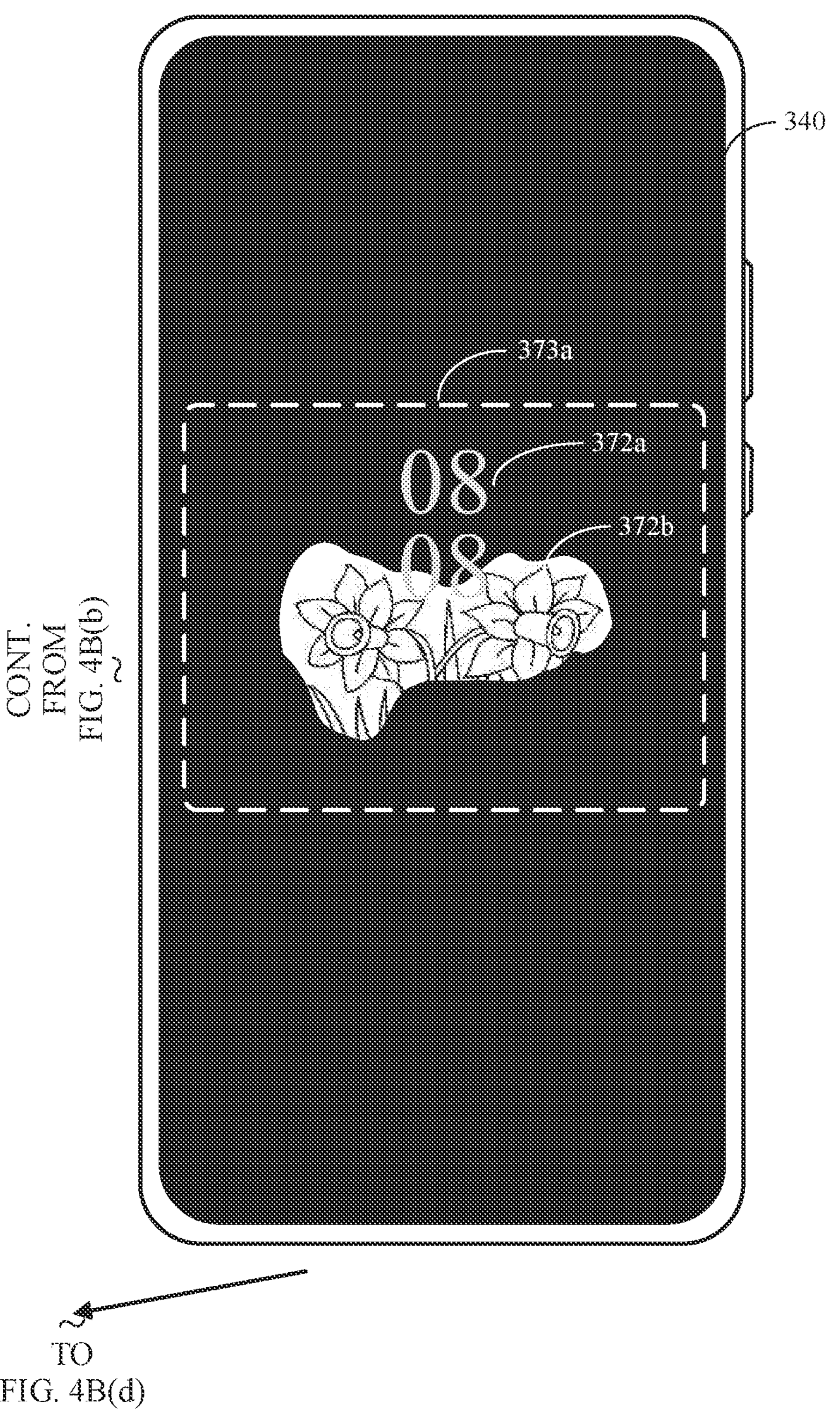
Figure 4B:
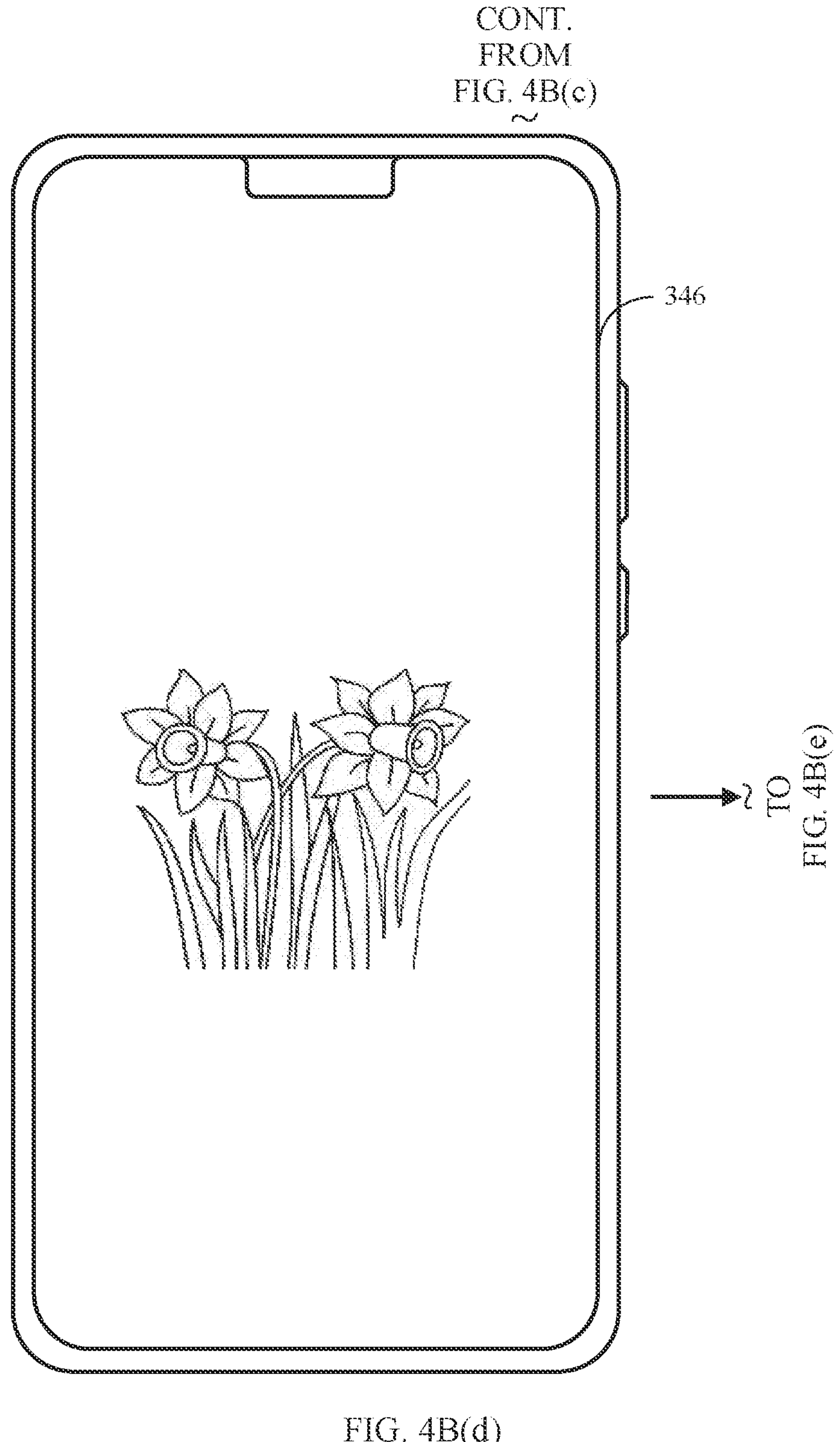
Figure 4B:
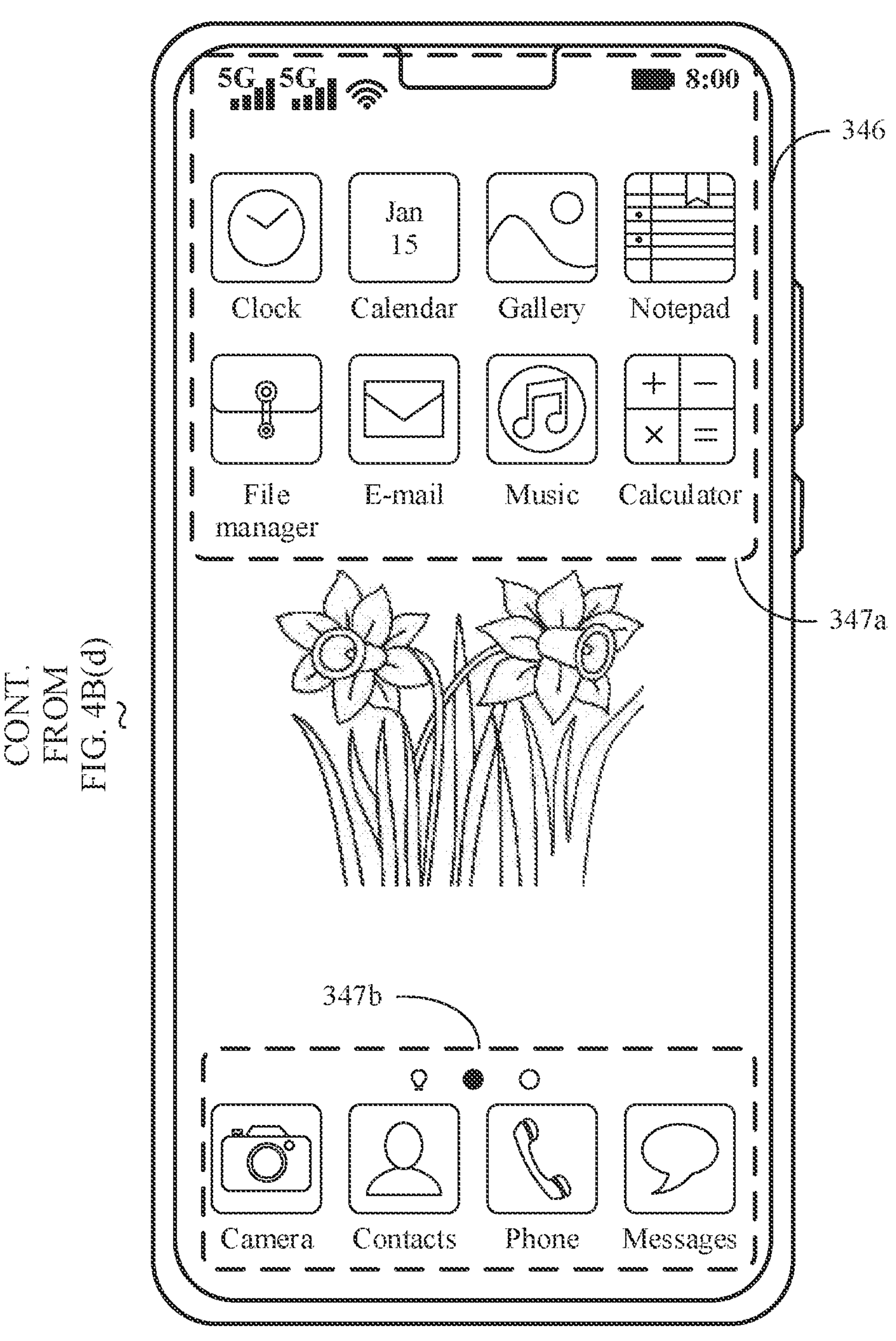

In a possible design, because salient regions of different home screen wallpapers have different content and different positions, display content of AOD and animation effects during unlocking may also be different. For example, as shown in FIG. 3A(d), if the user sets a wallpaper 360 as the home screen wallpaper, as shown in FIG. 4B(a), the display content of AOD may include a time control 372*a* and an AOD pattern 372*b* extracted from the home screen wallpaper (a wallpaper corresponding to the wallpaper 360). The AOD pattern 372*b* may be cut from the home screen wallpaper (the wallpaper corresponding to the wallpaper 360) after saliency detection, and an edge of the AOD pattern 372*b* may be obtained through special-shaped edge fitting (for a calculation process of special-shaped edge fitting, refer to related descriptions below). When the sensor of the mobile phone detects that the user picks up the mobile phone, touches the mobile phone, or approaches the mobile phone, as shown in FIG. 4B(b), the mobile phone may display a fingerprint pattern 344 on the always on interface 340, and in response to the operation of entering the fingerprint by the user, as shown in FIG. 4B(c), the time 372*a* and the AOD pattern 372*b* may be transferred from the display region 343 (the middle position of the display) to a specific position in a display region 373*a* (below the display). The specific position in the display region 373*a* may be an original position of the AOD pattern 372*b* in the home screen wallpaper. Then, as shown in FIG. 4B(d), the mobile phone may light up a wallpaper on a home screen 346 in the diffused manner. Then, as shown in FIG. 4B(e), the mobile phone may display another icon and/or control on the home screen 346, including icons and/or controls in the display region 347*a* and the display region 347*b*.

Optionally, as shown in FIG. 4B(a) or FIG. 4B(b), when always on display is performed, the time 372*a* and the AOD pattern 372*b* in the display region 343 may be dim, to avoid the eye discomfort of the user due to the excessive glare. When the user enters the fingerprint for unlocking, as shown in FIG. 4B(c) and FIG. 4B(d), the AOD pattern 372*b* may gradually become brighter, and gradually increase brightness that is the same as that of the home screen, so that the eye comfort of the user can be improved, and user experience can be improved.

Figure 4C:
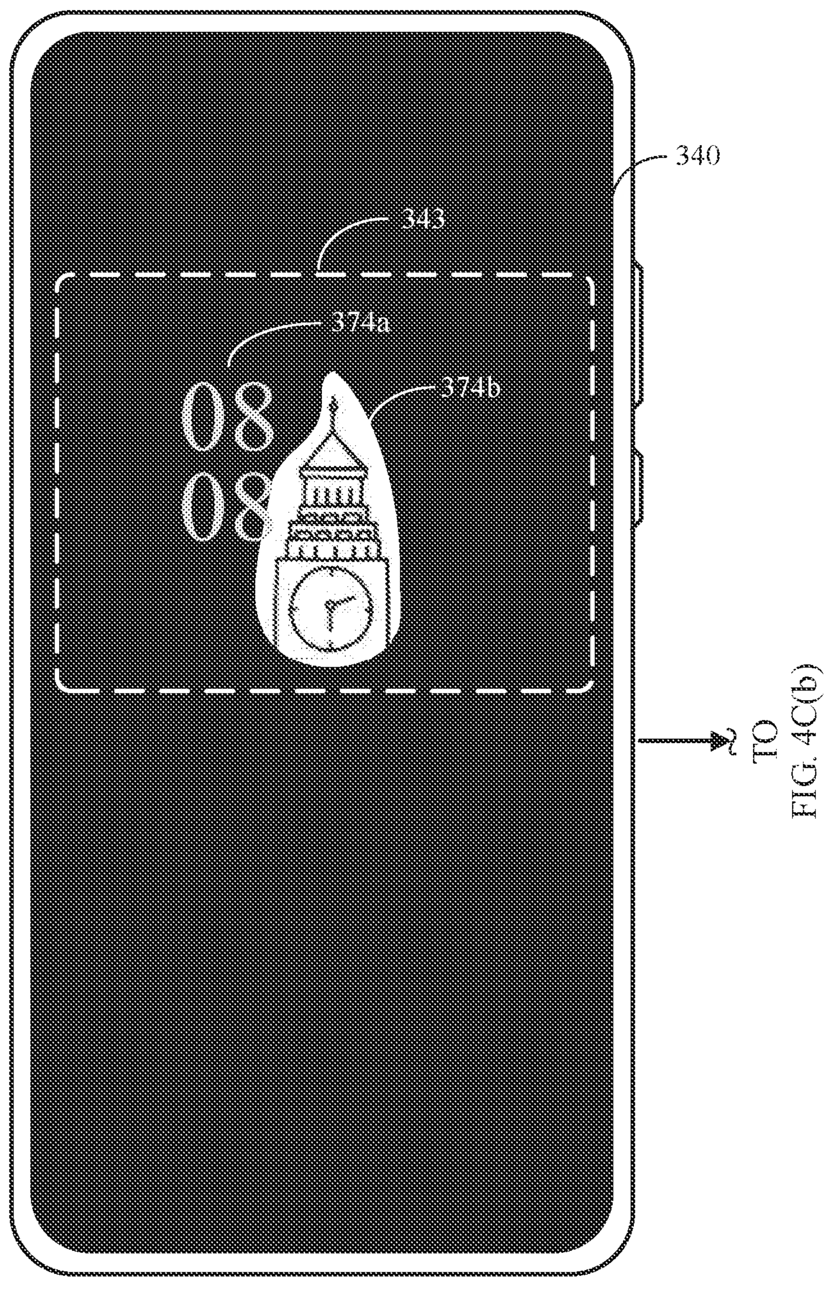
FIG. 4C(a) to FIG. 4C(e) are another schematic display diagram according to an embodiment of this application.
Figure 4C:
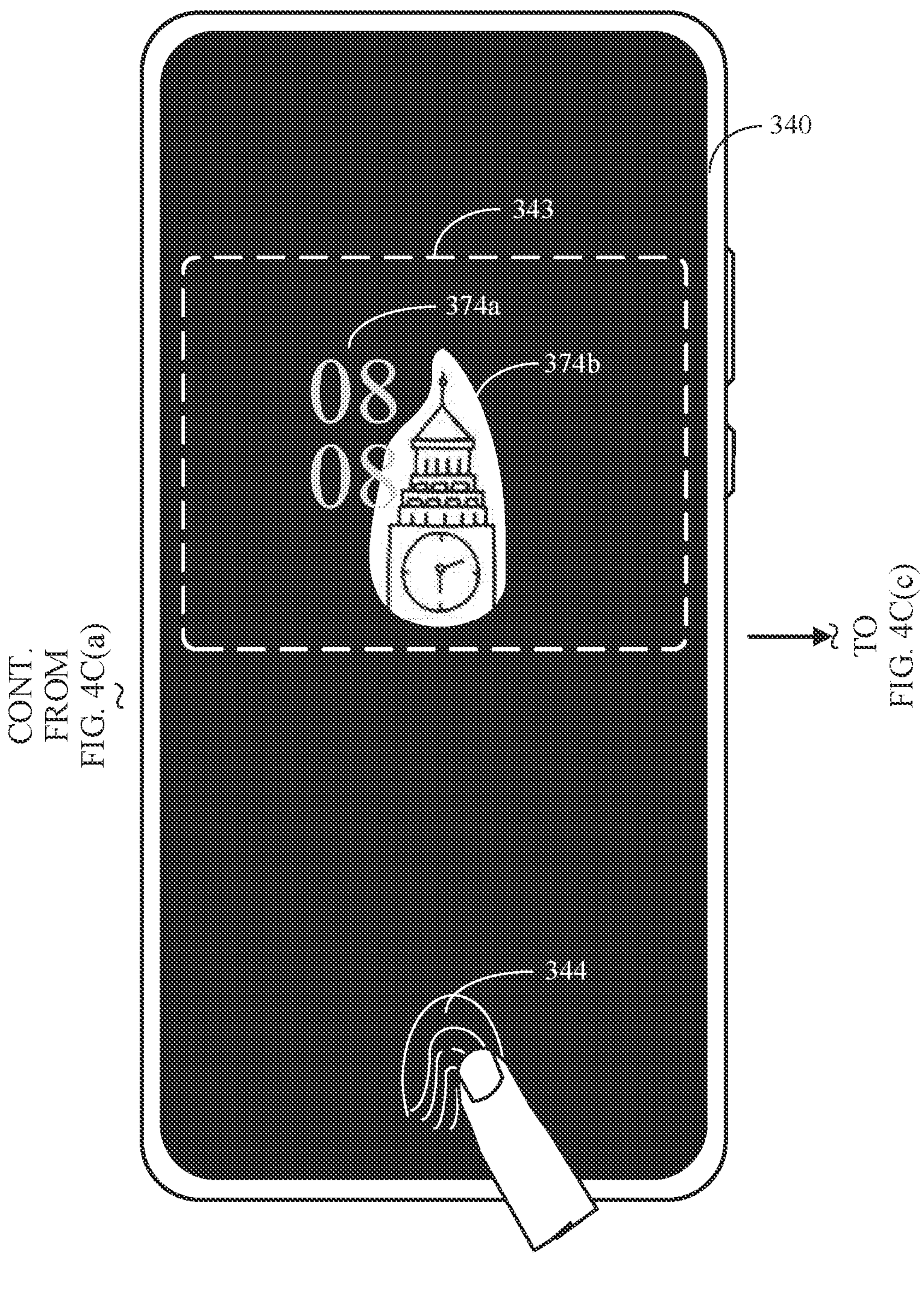
Figure 4C:
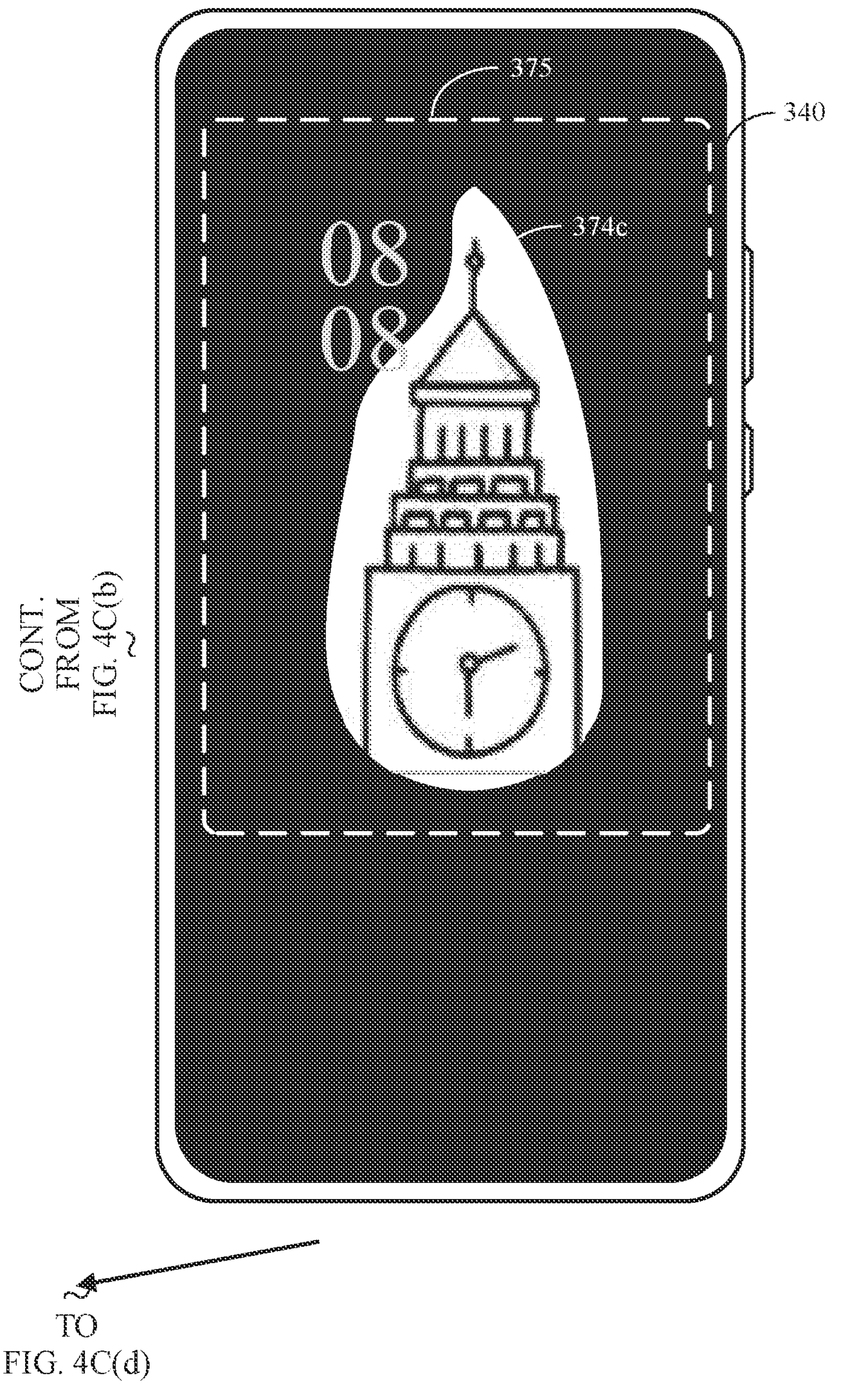
Figure 4C:
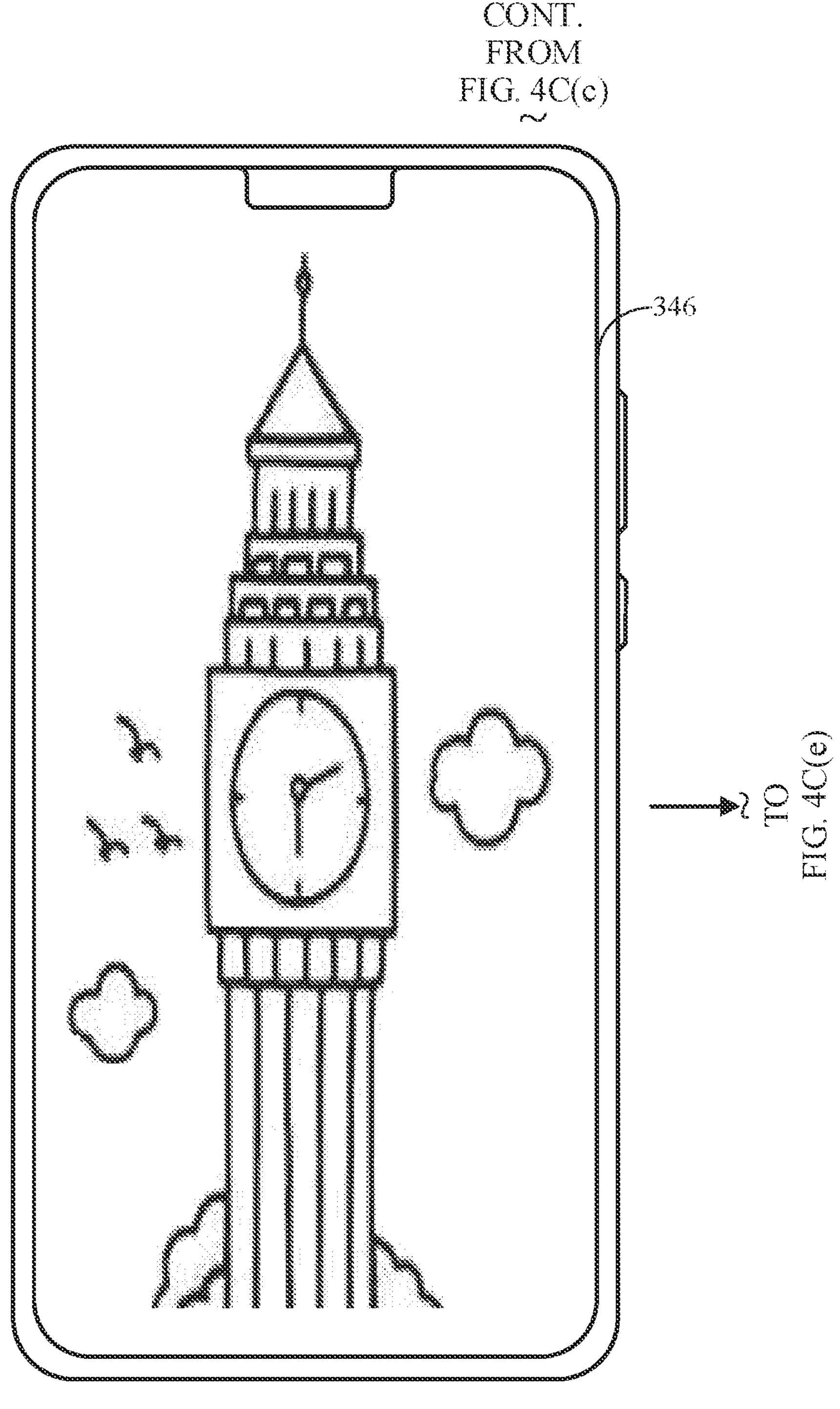
Figure 4C:
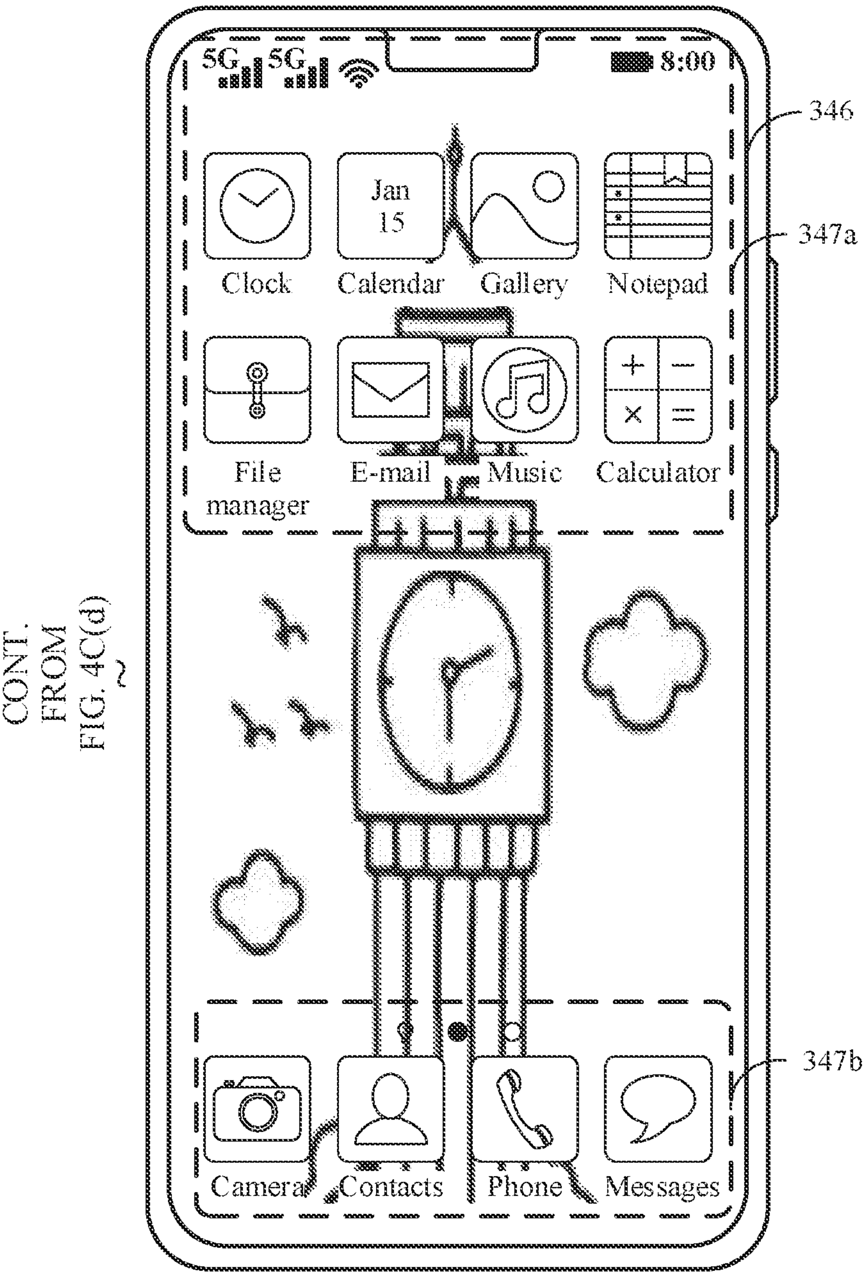

In a possible design, if a salient region of the home screen wallpaper is large, the salient region of the home screen wallpaper may be reduced as a whole to generate an AOD pattern. For example, as shown in FIG. 3A(d), if the user sets a wallpaper 361 as the home screen wallpaper, as shown in FIG. 4C(a), the display content of AOD may include a time control 374*a* and an AOD pattern 374*b* extracted from the home screen wallpaper (a wallpaper corresponding to the wallpaper 361). The AOD pattern 374*b* may be a pattern that is cut from the home screen wallpaper (the wallpaper corresponding to the wallpaper 361) after saliency detection and that includes a screenshot of the salient region and on which reduction processing is performed. When the sensor of the mobile phone detects that the user picks up the mobile phone, touches the mobile phone, or approaches the mobile phone, as shown in FIG. 4C(b), the mobile phone may display the fingerprint pattern 344 on the always on interface 340, and in response to an operation of entering the fingerprint by the user, as shown in FIG. 4C(c), the AOD pattern 374*b* may be expanded (enlarged) to an original size in a display region 375, to obtain an AOD pattern 374*c*. Then, an enlarged AOD pattern 374*c* is moved to an original position in the home screen wallpaper. Then, as shown in FIG. 4C(d), the mobile phone may light up the wallpaper on the home screen 346 in the diffused manner. Then, as shown in FIG. 4C(e), the mobile phone may display another icon and/or control on the home screen 346, including the icons and/or controls in the display region 347*a* and the display region 347*b*.

Optionally, as shown in FIG. 4C(a) or FIG. 4C(b), when always on display is performed, the time 374*a* and the AOD pattern 374*b* in the display region 343 may be dim, to avoid the eye discomfort of the user due to the excessive glare. When the user enters the fingerprint for unlocking, as shown in FIG. 4C(c) and FIG. 4C(d), the AOD pattern 374*c* may gradually become brighter, and gradually increase brightness that is the same as that of the home screen, so that the eye comfort of the user can be improved, and user experience can be improved.

Optionally, in response to the operation of entering the fingerprint by the user, the AOD pattern 374*b* may first be moved to a vicinity of an original position in the home screen wallpaper, and then the AOD pattern 374*c* is obtained through enlarging. Alternatively, in response to the operation of entering the fingerprint by the user, in a process of moving the AOD pattern 374*b*, the AOD pattern 374*b* may be gradually enlarged to an original size (namely, a size in the home screen wallpaper). This is not limited in this application.

Figure 4D:
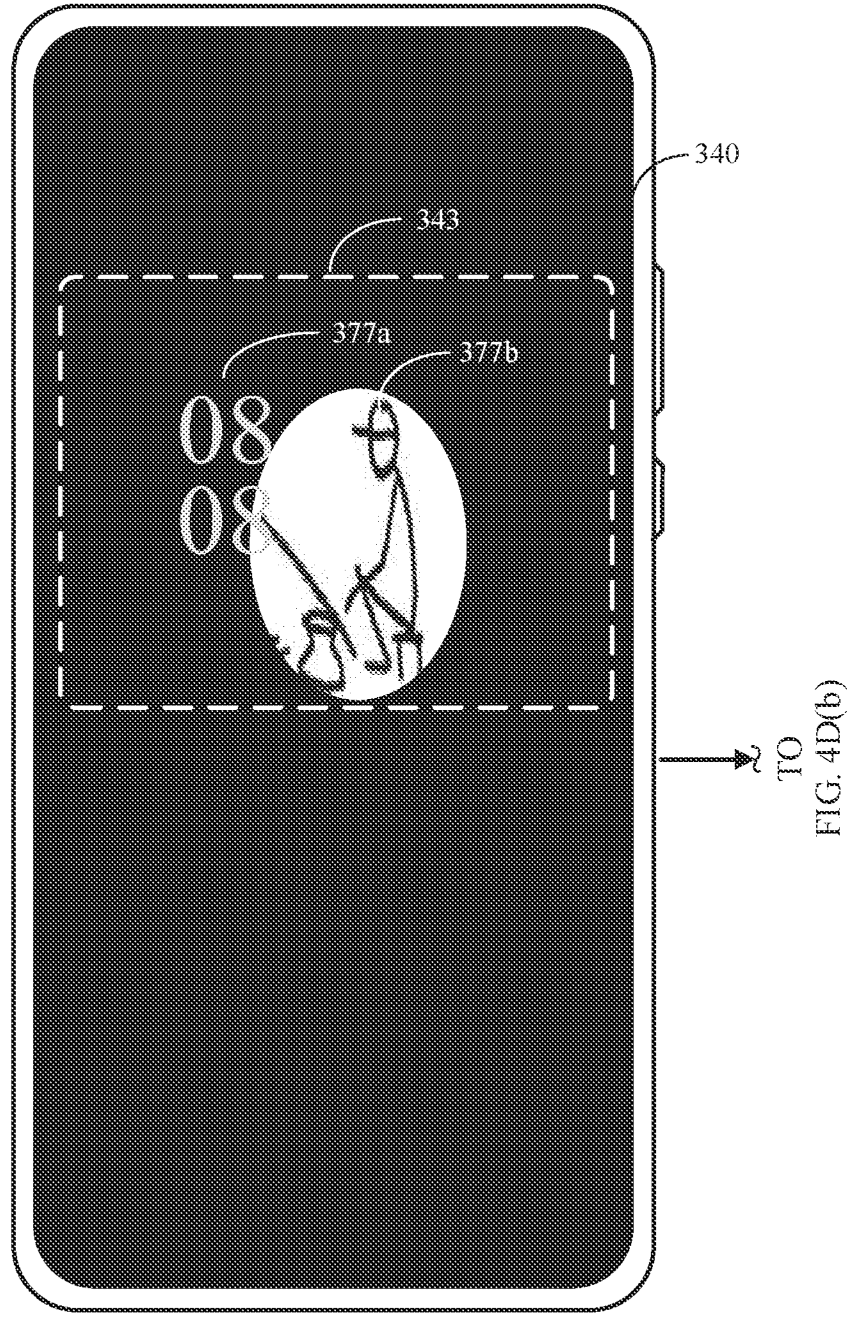
FIG. 4D(a) to FIG. 4D(e) are another schematic display diagram according to an embodiment of this application.
Figure 4D:
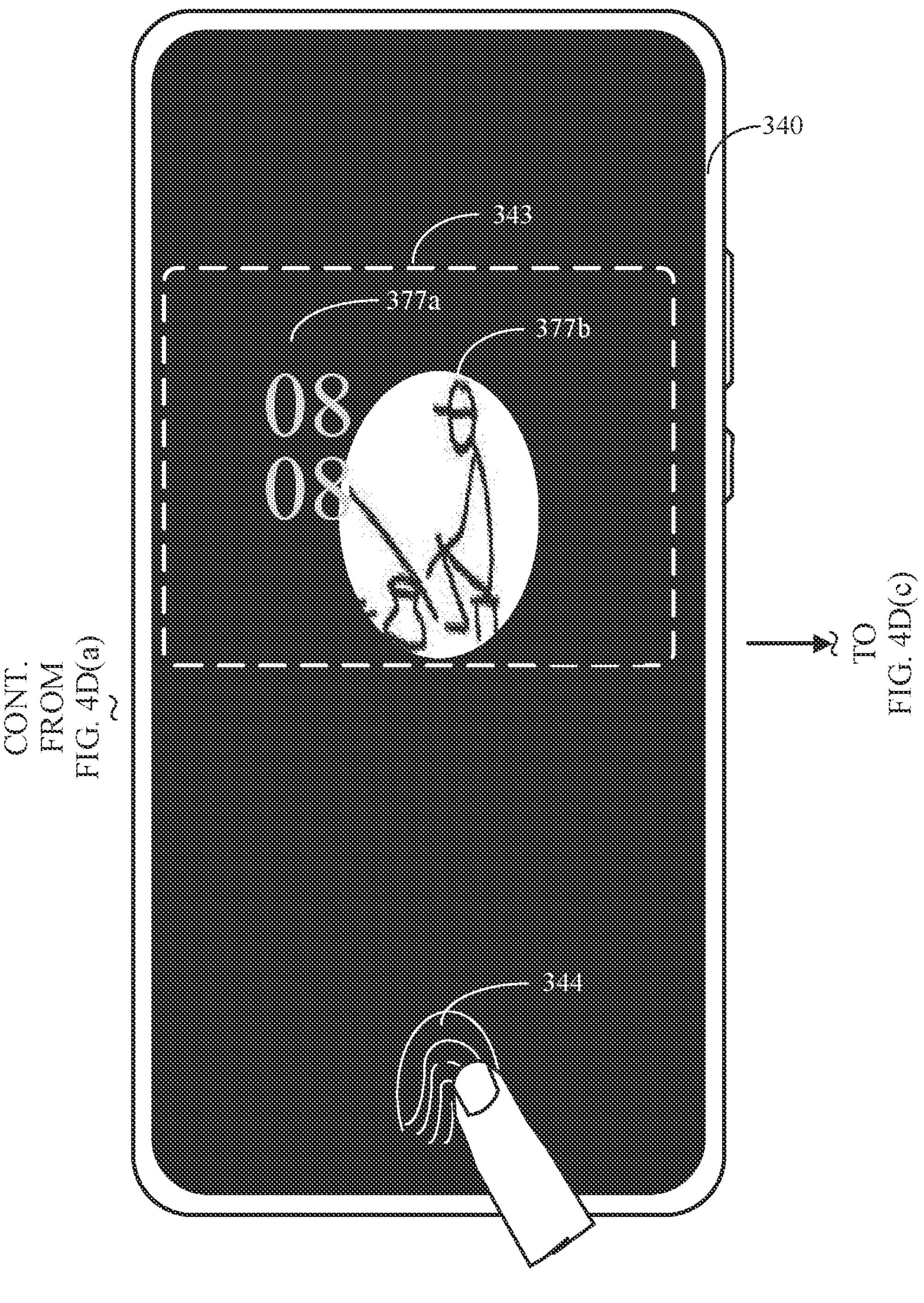
Figure 4D:
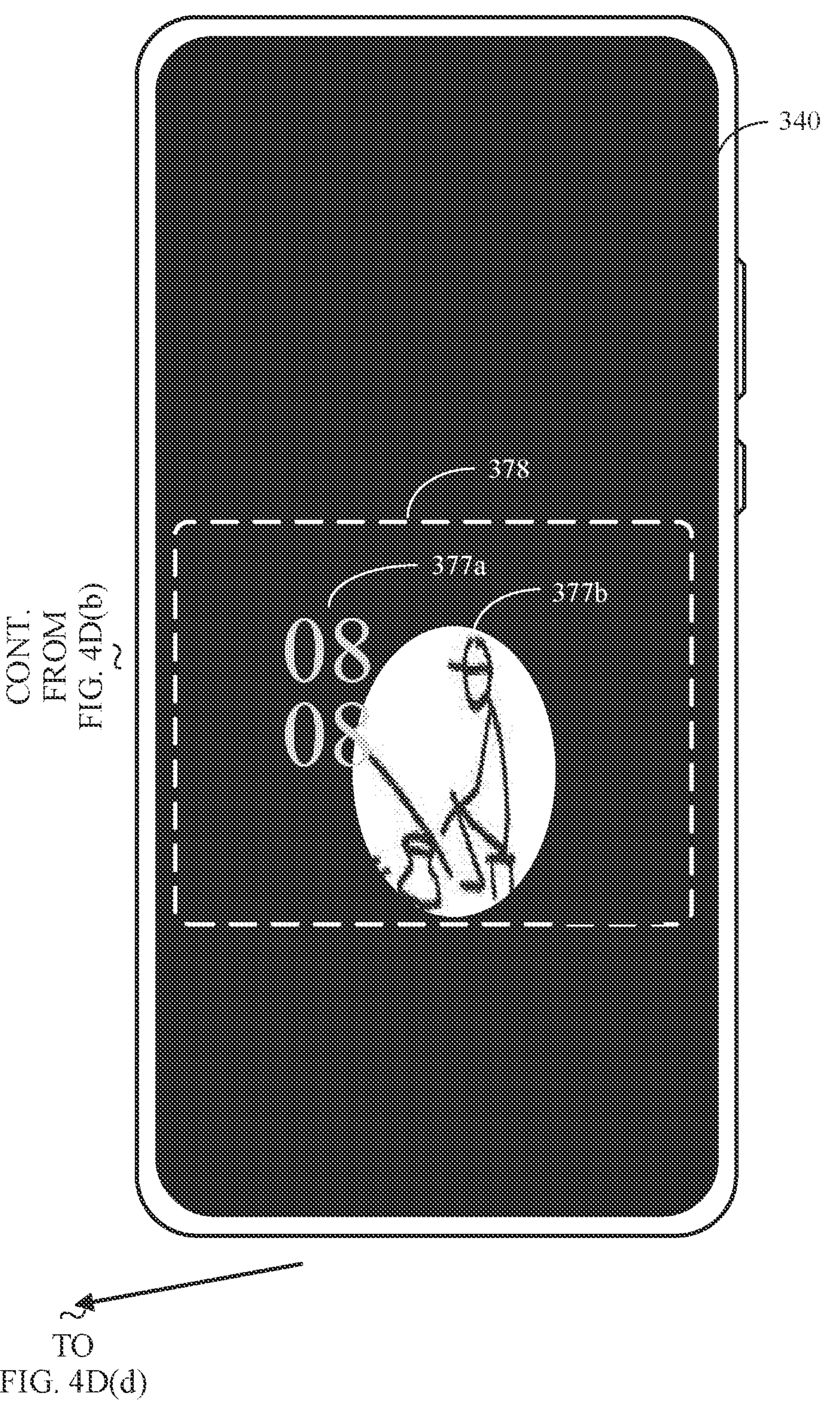
Figure 4D:
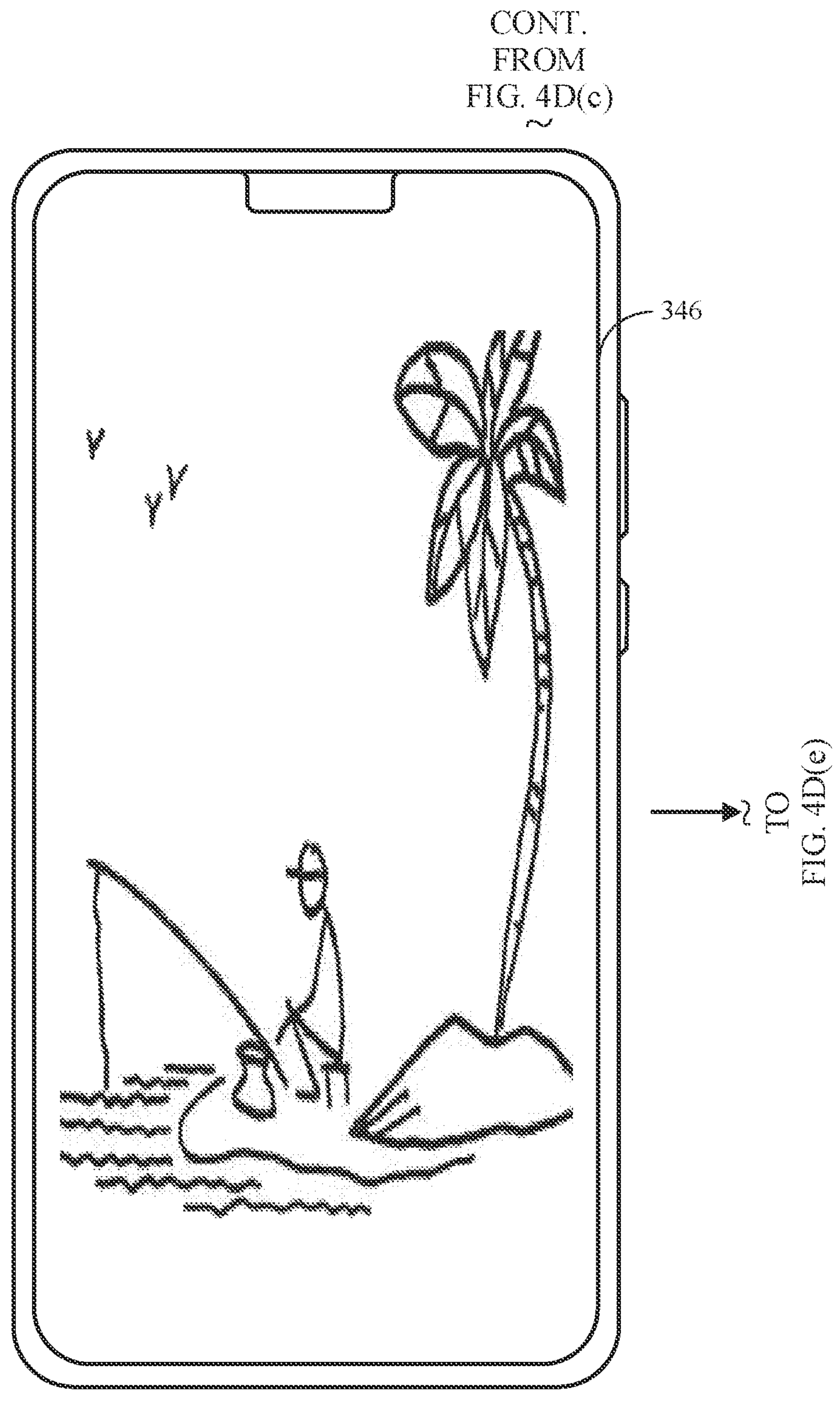
Figure 4D:
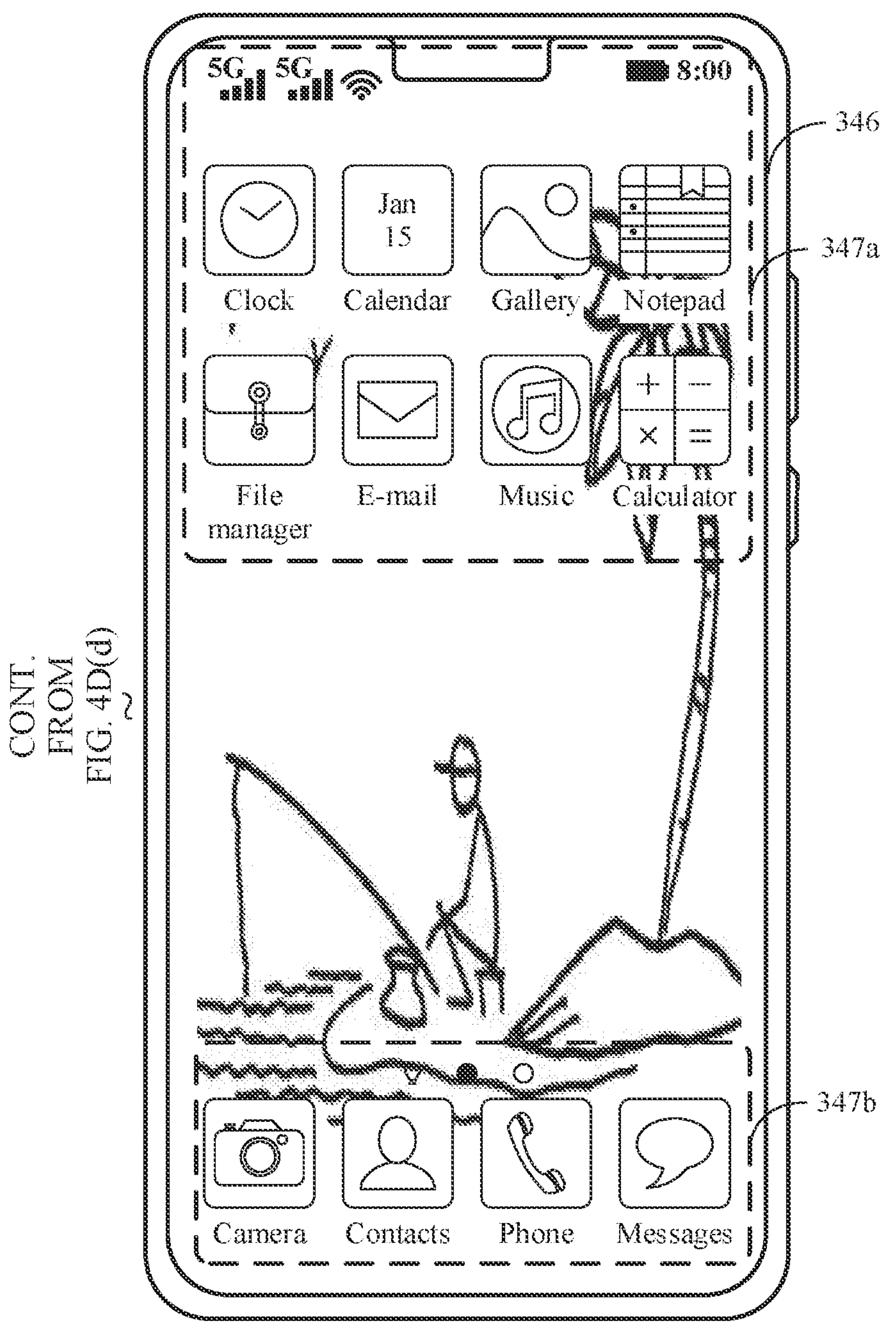
Figure 5A:
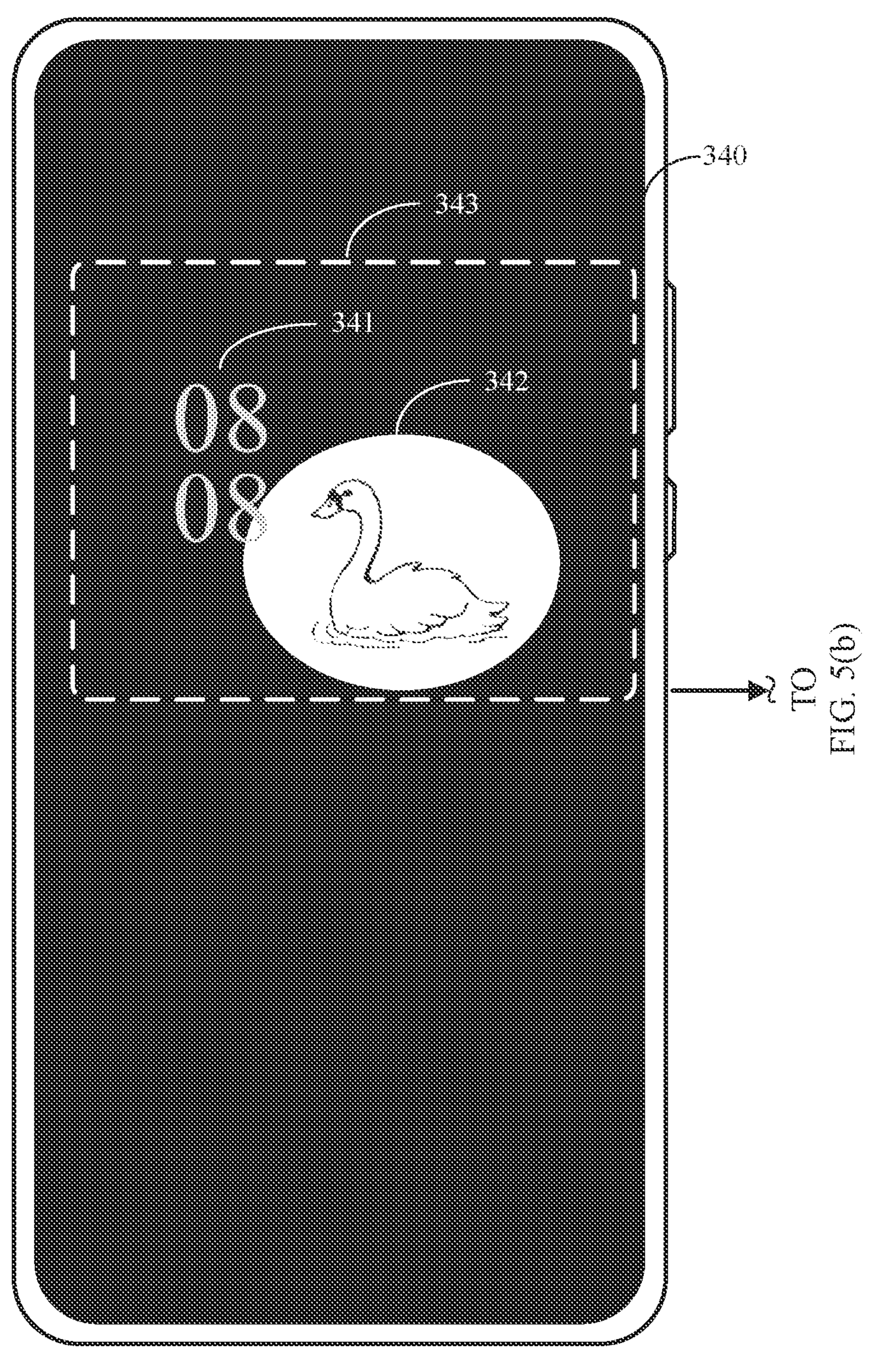
FIG. 5(*a*) to FIG. 5(*e*) are another schematic display diagram according to an embodiment of this application.
Figure 5B:
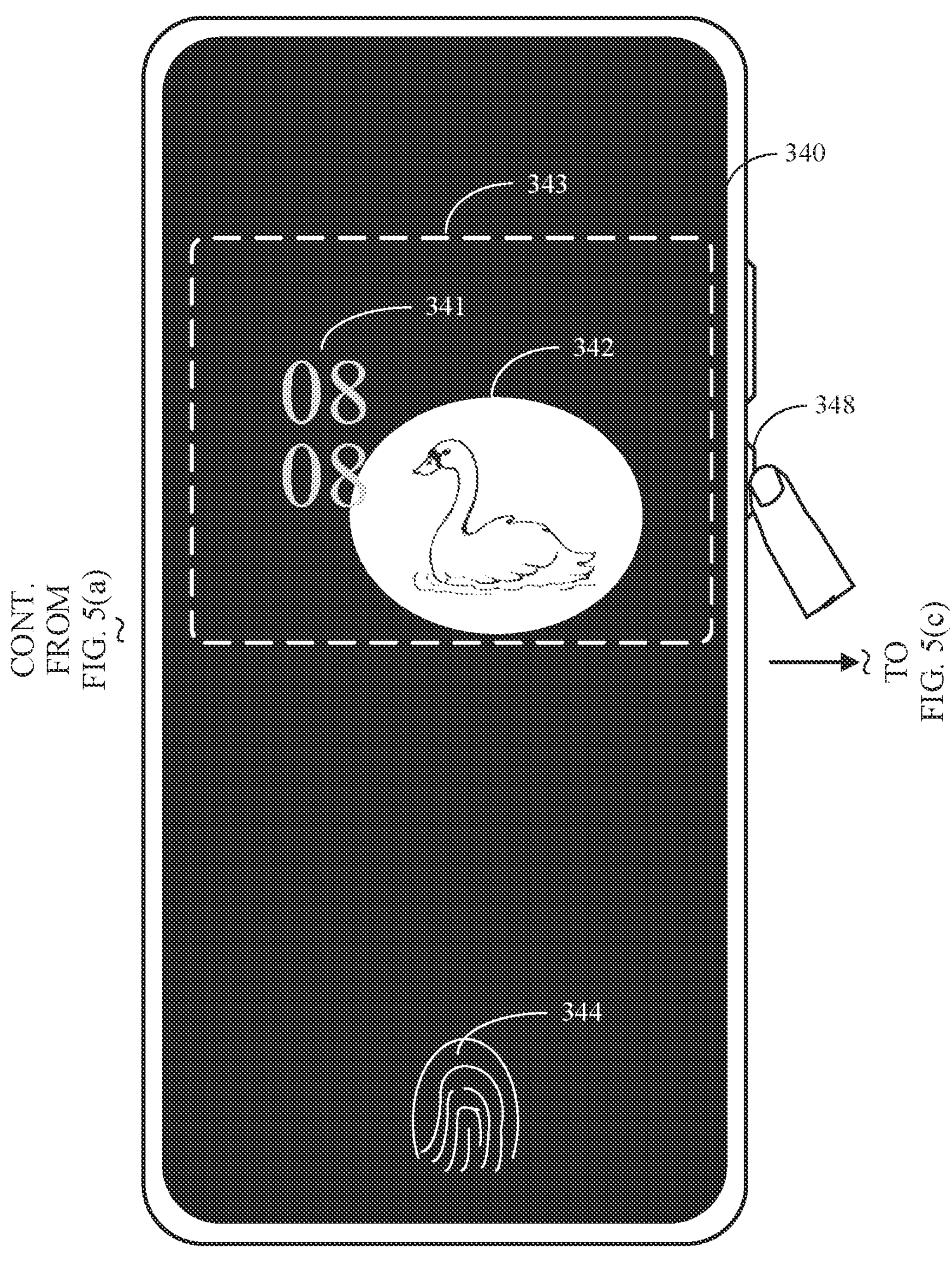
Figure 5C:
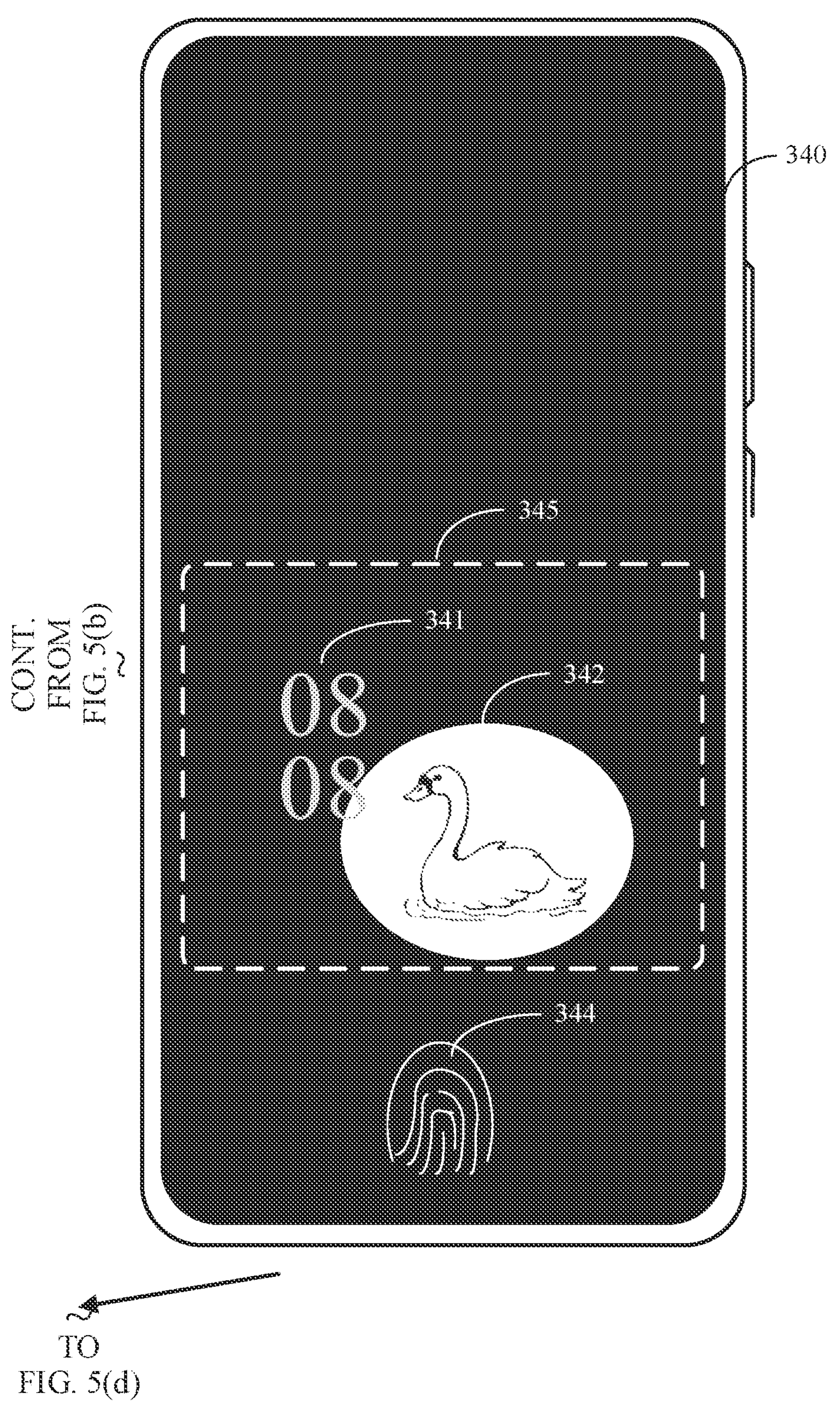
Figure 5D:
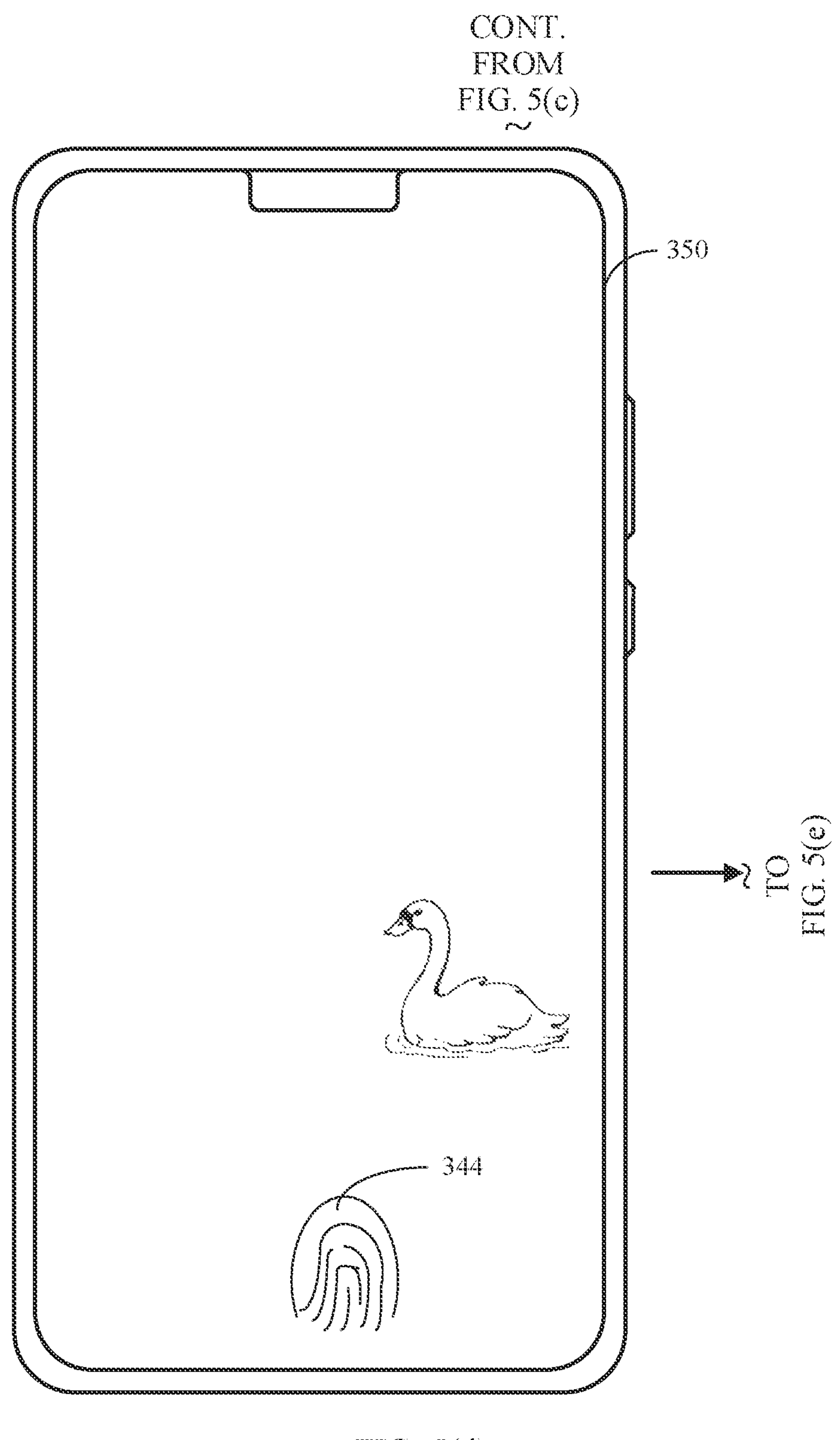
Figure 5E:
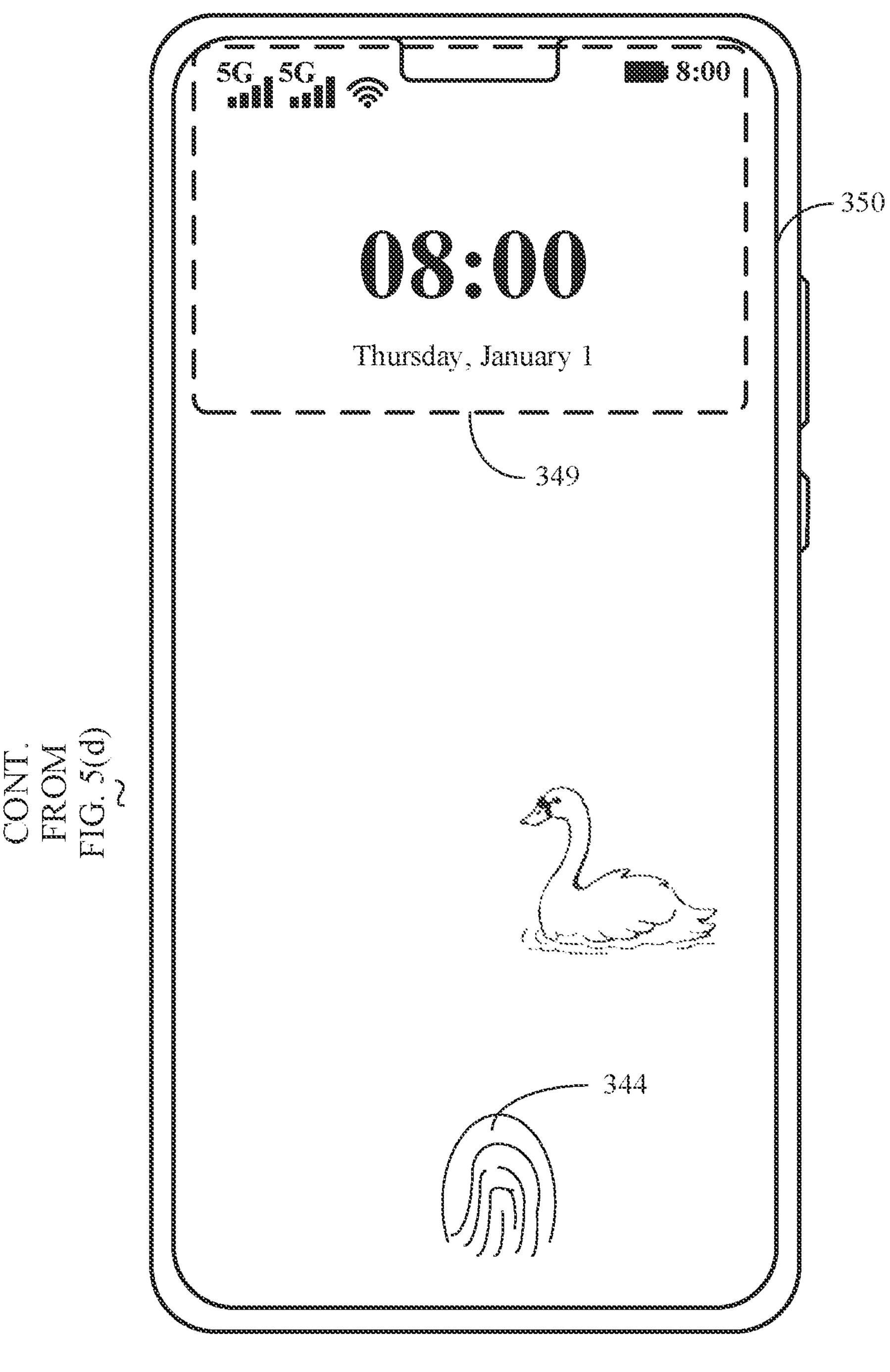

For another example, as shown in FIG. 3A(d), if the user sets a wallpaper 362 as the home screen wallpaper, as shown in FIG. 4D(a), the display content of AOD may include a time control 377*a* and an AOD pattern 377*b* extracted from the home screen wallpaper (the wallpaper corresponding to the wallpaper 360). The AOD pattern 377*b* may be a screenshot that includes a face and that is cut from the home screen wallpaper after face detection, and an edge of the AOD pattern 377*b* may be an organic shape. When the sensor of the mobile phone detects that the user picks up the mobile phone, touches the mobile phone, or approaches the mobile phone, as shown in FIG. 4D(b), the mobile phone may display the fingerprint pattern 344 on the always on interface 340, and in response to the operation of entering the fingerprint by the user, as shown in FIG. 4D(c), the time

377*a* and the AOD pattern 377*b* may be transferred from the display region 343 (the middle position of the display) to a specific position in a display region 378 (below the display). The specific position in the display region 378 may be an original position of the AOD pattern 377*b* in the home screen wallpaper. Then, as shown in FIG. 4D(d), the mobile phone may light up the wallpaper on the home screen 346 in the diffused manner. Then, as shown in FIG. 4D(e), the mobile phone may display another icon and/or control on the home screen 346, including the icons and/or controls in the display region 347*a* and the display region 347*b*.

Optionally, as shown in FIG. 4D(a) or FIG. 4D(b), when always on display is performed, the time 377*a* and the AOD pattern 377*b* in the display region 343 may be dim, to avoid the eye discomfort of the user due to the excessive glare. When the user enters the fingerprint for unlocking, as shown in FIG. 4D(c) and FIG. 4D(d), the AOD pattern 377*b* may gradually become brighter, and gradually increase brightness that is the same as that of the home screen, so that the eye comfort of the user can be improved, and user experience can be improved.

In some embodiments, an unlocking manner of the mobile phone (namely, a manner of entering the home screen or an application interface from the screen-off state) may also be facial recognition unlocking, sliding unlocking, or unlocking by entering a password. This is not limited in this application. Whichever unlocking manner is used, after the mobile phone is unlocked, the mobile phone may display the AOD pattern returning back to the original position (a position of the AOD pattern in the home screen wallpaper) from the middle position, light up the home screen wallpaper in the diffused manner, and then display a quick animation of another icon and/or control on the home screen. Such an animation effect formed by the AOD pattern and content of the home screen may provide a better user experience. In addition, because the AOD pattern is extracted from the wallpaper voluntarily set by the user, the personalized requirement of the user can be met.

Optionally, the another icon and/or control on the home screen may enter the home screen in a fly-in manner, or may be displayed in a manner in which the another icon and/or control change from light to deep and finally are displayed normally, or may be displayed in another animation effect. This is not limited in this application. In this way, richer visual experience can be presented to the user.

In some embodiments, the mobile phone may display a corresponding AOD pattern returning back to an original position from a middle position, and the home screen wallpaper and another icon and control on the home screen may be simultaneously displayed. In this way, a waiting time period of the user can be reduced, and user experience can be improved.

In some embodiments, the AOD pattern may disappear immediately, and then the lock screen wallpaper is quickly lit up, and other information of a lock screen interface is displayed. This can save a waiting time period of the user and improve user experience.

(2) When the user enters the lock screen interface from the screen-off state, refer to a presentation manner in the conventional technology between the AOD pattern and the lock screen wallpaper, that is, when the user taps a power button to enter the lock screen interface, the AOD pattern may immediately disappear, and then the mobile phone displays information such as the lock screen wallpaper and an icon and/or a control on the lock screen interface.

Optionally, the AOD pattern may gradually fade away; or may be gradually reduced to a point and then disappear; or may be enlarged and then disappear. For example, the AOD pattern may be enlarged and then decomposed into a snowflake shape, a meteor shape, or a heart shape and then disappear, or disappear with another animation effect. This is not limited in this application. In this way, richer visual experience can be presented to the user.

(3) When the user enters the lock screen interface from the screen-off state and then enters the home screen, for interaction between the AOD pattern and the lock screen interface, refer to related descriptions in the foregoing case (2). For interaction between the lock screen interface and the home screen (namely, a display effect obtained when the user enters the home screen from the lock screen interface), refer to a presentation manner in the conventional technology. For example, after the user enters the fingerprint on the lock screen interface, information such as a lock screen wallpaper and an icon and a time on the lock screen interface may disappear immediately. Then, the mobile phone displays a home screen wallpaper and an icon, a control, and the like on the home screen.

Optionally, when the home screen is entered from the lock screen interface, information such as the lock screen wallpaper and the icon of the lock screen interface may gradually fade away; or may be gradually reduced to a point and then disappear; or may be enlarged and then disappear. Alternatively, the information such as the lock screen wallpaper and the icon of the lock screen interface may be decomposed into a snowflake shape, a meteor shape, or a heart shape and then disappear, or disappear with another animation effect. This is not limited in this application. In this way, richer visual experience can be presented to the user.

In some embodiments, when the lock screen wallpaper is different from the home screen wallpaper, if the user chooses to display the lock screen pattern when the screen is turned off, the AOD pattern displayed when the screen of the mobile phone is turned off may be determined based on a region of interest of the lock screen wallpaper. The following describes different cases in which the user chooses to display the lock screen pattern when the screen is turned off.

(1) When the user enters the home screen from the screen-off state, refer to a presentation manner in the conventional technology between the AOD pattern and the home screen wallpaper. For example, when the user taps the power button to enter the lock screen interface, the AOD pattern may immediately disappear, and then the mobile phone displays the home screen wallpaper, the icon and the control on the lock screen interface, and the like.

Optionally, the AOD pattern may gradually fade away; or may be gradually reduced to a point and then disappear; or may be enlarged and then disappear. For example, the AOD pattern may be enlarged and then decomposed into a snowflake shape, a meteor shape, or a heart shape and then disappear, or disappear with another animation effect. This is not limited in this application. In this way, richer visual experience can be presented to the user.

(2) When the user enters the lock screen interface from the screen-off state, the AOD pattern and the lock screen wallpaper may present a continuous animation effect.

For example, as shown in FIG. 5(*a*) to FIG. 5(*e*), when the mobile phone is in the screen-off state (the screen is turned off) and is placed still (for example, placed on a desk), the mobile phone may perform AOD, that is, display the always on interface 340. The display content of AOD may be displayed in the display region 343 of the always on interface 340. The display content of AOD may include the time 341 and the AOD pattern 342 extracted from the lock screen wallpaper. If fingerprint recognition is set on the mobile phone, when the sensor of the mobile phone detects that the user picks up the mobile phone, touches the mobile phone, or approaches the mobile phone, as shown in FIG. 5(*b*), the mobile phone may display the fingerprint pattern 344 on the always on interface 340, and in response to an operation of pressing a power button (unlock button) 348 by the user, as shown in FIG. 5(*c*), the time 341 and the AOD pattern 342 may be transferred from the display region 343 (the middle position of the display) to the specific position in the display region 345. The specific position in the display region 345 may be the original position of the AOD pattern 342 in the lock screen wallpaper. Then, as shown in FIG. 5(*d*), the mobile phone may light up a wallpaper on a lock screen interface 350 in the diffused manner. Then, as shown in FIG. 5(*e*), the mobile phone may display other information on the lock screen interface 350, for example, information (including information such as time, a signal, and a battery level) in a display region 349. In this way, when the user lights up the mobile phone (enters the unlocking interface from the screen-off interface), the mobile phone may display the AOD pattern returning back to the original position (a position of the AOD pattern in the lock screen wallpaper) from the middle position, light up the lock screen wallpaper in the diffused manner, and then display a quick animation of other information on the lock screen interface. Such an animation effect formed by the AOD pattern and the content of the lock screen may provide a better user experience.

Optionally, a manner of entering the lock screen interface may be approaching the mobile phone, touching the mobile phone (for example, double-clicking the mobile phone), or the like. This is not limited in this application. Whichever manner is used to enter the lock screen interface, the mobile phone may display the AOD pattern returning back to the original position (the position of the AOD pattern in the lock screen wallpaper) from the middle position, light up the lock screen wallpaper in the diffused manner, and then display a quick animation of other information on the lock screen interface. Such an animation effect formed by the AOD pattern and the content of the lock screen may provide a better user experience.

It may be understood that, when the lock screen wallpaper is the wallpaper 360, the wallpaper 361, the wallpaper 362, or another wallpaper described above, the AOD pattern may be determined based on a corresponding wallpaper, that is, different wallpapers correspond to different AOD patterns. For a specific AOD pattern, refer to the foregoing related description. Details are not described herein again. When the user lights up the mobile phone (enters the unlocking interface from the screen-off interface), the mobile phone may display the corresponding AOD pattern returning back to the original position (the position of the AOD pattern in the lock screen wallpaper) from the middle position, light up the lock screen wallpaper in the diffused manner, and then display a quick animation of other information on the lock screen interface. Such an animation effect formed by the AOD pattern and the content of the lock screen may provide a better user experience.

Optionally, another icon and/or control on the lock screen interface may enter the lock screen interface in a fly-in manner, or may be displayed in a manner in which the another icon and/or control change from light to deep and finally are displayed normally, or may be displayed in another animation effect. This is not limited in this application. In this way, richer visual experience can be presented to the user.

In some embodiments, the mobile phone may display the corresponding AOD pattern returning back to the original position from the middle position, and then, the lock screen wallpaper and the another icon and control on the lock screen interface may be simultaneously displayed. In this way, a waiting time period of the user can be reduced, and user experience can be improved.

In some embodiments, the AOD pattern may disappear immediately, and then the lock screen wallpaper is quickly lit up, and the other information of the lock screen interface is displayed. This can save the waiting time period of the user and improve user experience.

(3) When the user enters the lock screen interface from the screen-off state and then enters the home screen, for interaction between the AOD pattern and the lock screen interface, refer to related descriptions in the foregoing case (2). For interaction between the lock screen interface and the home screen (namely, a display effect obtained when the user enters the home screen from the lock screen interface), refer to a presentation manner in the conventional technology. For example, after the user enters the fingerprint on the lock screen interface, the lock screen wallpaper, the icon and the control on the lock screen interface, and the like may disappear immediately. Then, the mobile phone displays the home screen wallpaper and an icon, a control, and the like on the home screen.

Optionally, when the home screen is entered from the lock screen interface, information such as the lock screen wallpaper and the icon of the lock screen interface gradually fades away; or may be gradually reduced to a point and then disappear; or may be enlarged and then disappear. Alternatively, the information such as the lock screen wallpaper and the icon of the lock screen interface may be decomposed into a snowflake shape, a meteor shape, or a heart shape and then disappear, or disappear with another animation effect. This is not limited in this application. In this way, richer visual experience can be presented to the user.

In some embodiments, when the lock screen wallpaper is the same as the home screen wallpaper, an always on display effect in which the user selects to display the home screen pattern or the lock screen pattern is similar. That is, regardless of whether the user chooses to display the home screen pattern when the screen is turned off or the user chooses to display the lock screen pattern when the screen is turned off, the AOD pattern is determined based on a region of interest of a same picture (the picture may be used as both the home screen wallpaper and the lock screen wallpaper).

When the lock screen wallpaper is the same as the home screen wallpaper, for an animation effect obtained when the user enters the lock screen interface from the screen-off state, refer to the foregoing related description. For an animation effect obtained when the user enters the home screen from the screen-off state, refer to the foregoing related description. Details are not described herein again.

It should be noted that, compared with a case in which the lock screen wallpaper is different from the home screen wallpaper, the lock screen wallpaper is the same as the home screen wallpaper, and an animation effect in which the user enters the lock screen interface from the screen-off state and then enters the home screen may be more continuous.

For example, when the home screen is entered from the lock screen interface, because the lock screen wallpaper is the same as the home screen wallpaper, that is, a display background part may remain unchanged, information such as the icon on the lock screen interface may gradually disappear, and information such as the icon on the home screen may gradually enter a display region. For example, the information such as the icon on the home screen may be displayed from light to deep, or be displayed with an animation effect. This is not limited in this application. In this way, after the user enters the lock screen interface from the screen-off state, an animation effect of entering the home screen again is more continuous, and user experience is better.

The following describes a specific implementation of the always on display method provided in this embodiment of this application.

Figure 6:
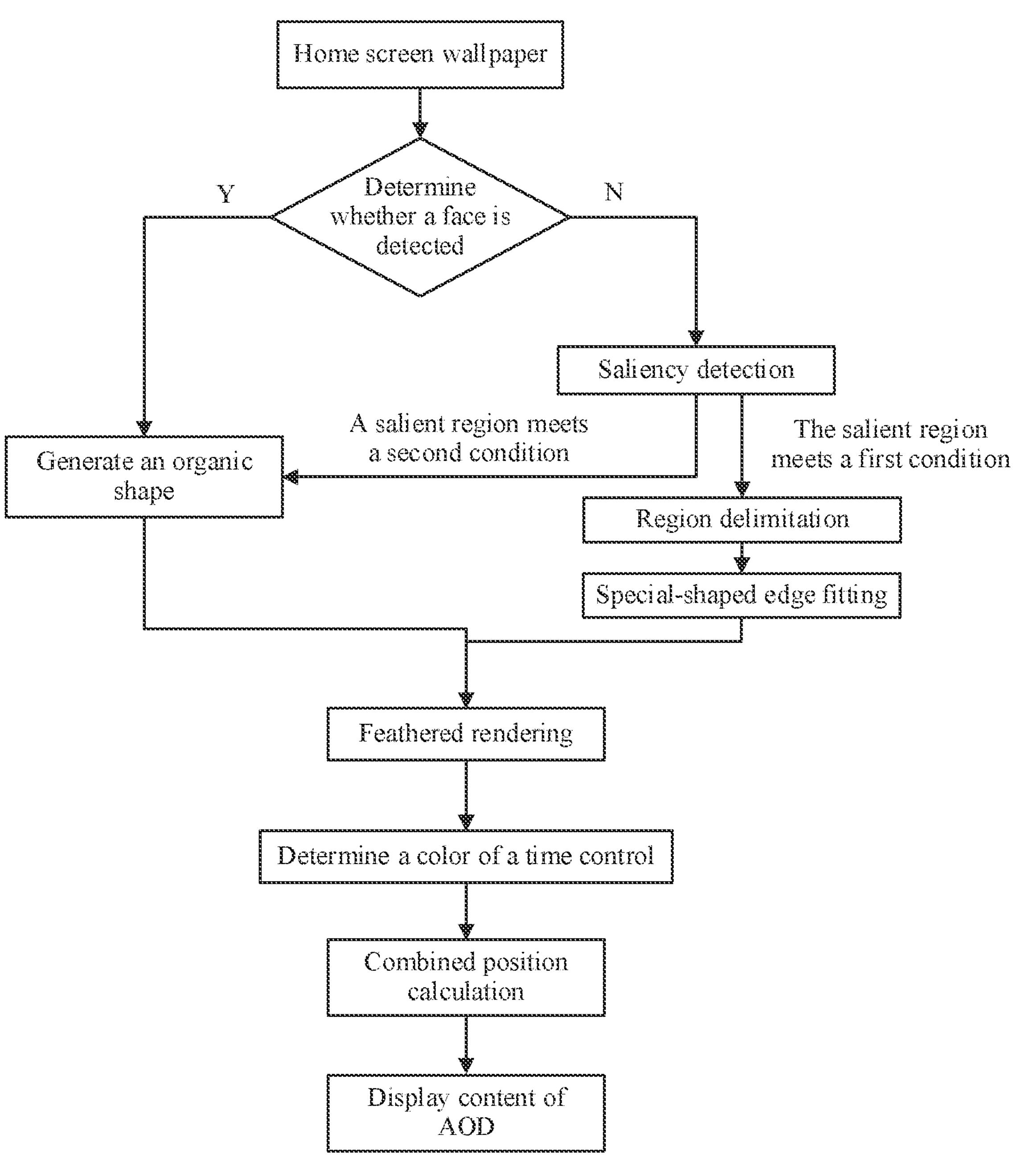
FIG. 6 is a schematic flowchart of a method according to an embodiment of this application.

When the user enables an always on display function, in response to an operation of the user, as shown in FIG. 6, the mobile phone may perform face detection on a wallpaper (a home screen wallpaper or a lock screen wallpaper). If a face is detected, an organic shape may be generated, and the face extracted from the wallpaper may be placed into the organic shape. If no face is detected, saliency detection may be performed on the wallpaper. If a salient region meets a first condition, region delimitation (cropping) and special-shaped edge fitting may be performed, to obtain an AOD pattern. If a size of the salient region meets a second condition, the organic shape may be generated, and the salient region extracted from the wallpaper may be placed into the organic shape to obtain an AOD pattern. For an image in the organic shape or an image fitted with a special-shaped edge, feathering processing may be performed to obtain the AOD pattern. Optionally, rendering processing may be further performed on the AOD pattern.

Further, if time needs to be displayed when AOD is performed, a color of a time control may be further determined, and then a combination position of the time control and the AOD pattern is calculated to obtain complete display content of AOD. In this case, the display content of AOD may include the time control (hereinafter, referred to as time) and a pattern extracted from the wallpaper (hereinafter, referred to as the AOD pattern for short).

When detecting whether a face exists in the wallpaper, a face detection algorithm (a face recognition algorithm), for example, VJ (Viola-Jones), a multi-task convolutional neural network (multi-task convolutional neural network, MTCNN), FaceBoxes, RetinaFace, and CenterFace may be used. This is not limited in this application.

When no face exists in the wallpaper (a face detection result is no), if the size of the salient region meets the first condition, in a possible design, region delimitation may be performed on the salient region. For example, the salient region (which may also be referred to as a foreground content region) of the wallpaper may be cropped based on a result of saliency detection to obtain the AOD pattern. It is assumed that a height of the salient region is H, a width is W, and a screen width of the mobile phone is w. For example, the first condition may be that H is greater than 40% w and/or W is greater than 30% w.

Figure 7A:
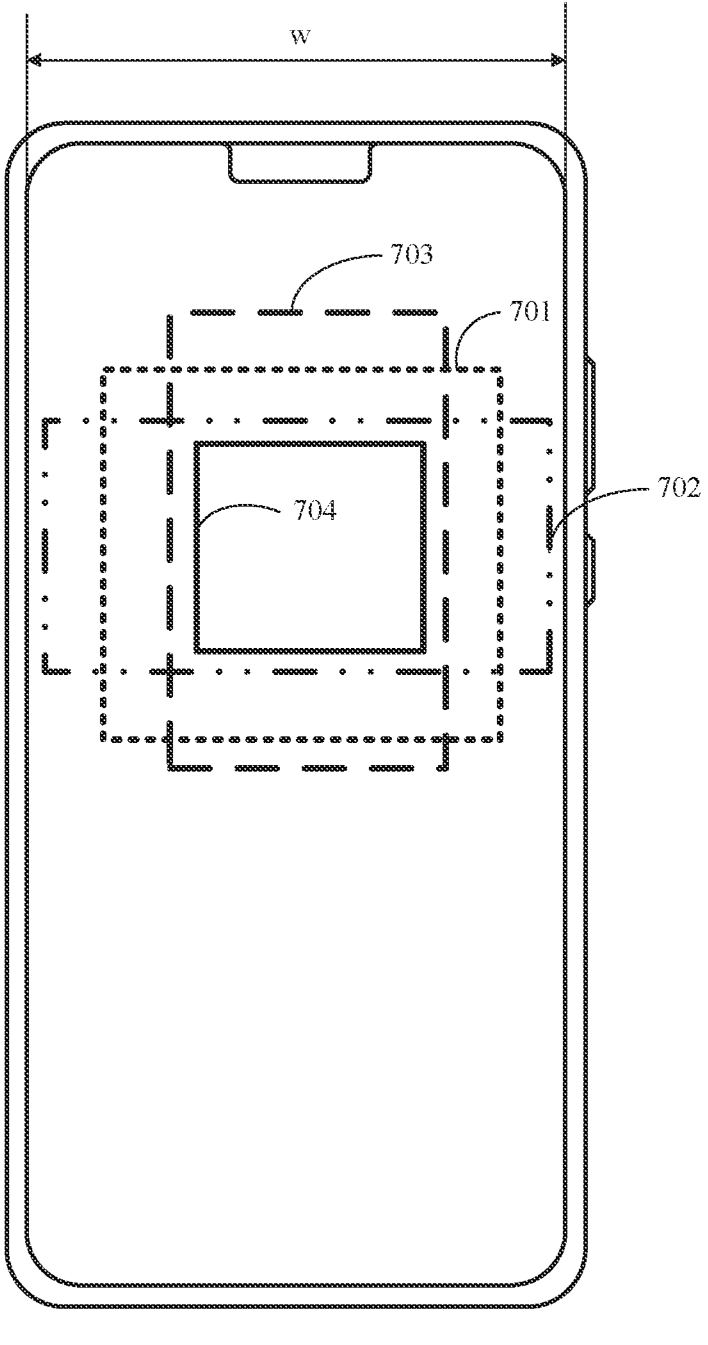
FIG. 7A is a schematic diagram of rectangular frames of different sizes according to an embodiment of this application.

For example, as shown in FIG. 7A, salient regions of different sizes may be cropped based on different rectangular frames. A size of a rectangular frame 701 is 80% w×60% w (width-height). A size of a rectangular frame 702 is 90% w×40% w. A size of a rectangular frame 703 is 50% w×80% w. A size of a rectangular frame 704 is 40% w×30% w.

It is assumed that the height of the salient region is H, the width is W, and the screen width of the mobile phone is w. In a case in which W is greater than 90% w, when H is greater than 60% w, the rectangular frame 701 may be used to crop the salient region, and a size of the cropped salient region is 80% w×60% w; when H is less than 60% w and greater than 40% w, the rectangular frame 701 may be used to crop the salient region, and a size of the cropped salient region may be 80% w×H; when H is less than 40% w and greater than 30% w, the rectangular frame 702 may be used to crop the salient region, and a size of the cropped salient region may be 90% w×H; and when H is less than 30% w, the rectangular frame 704 may be used to crop the salient region, and the cropped salient region may be placed in the organic shape (for the organic shape, refer to the following description).

In a case in which W is greater than 80% w and less than 90% w, when H is greater than 60% w, the rectangular frame 701 may be used to crop the salient region, and a size of the cropped salient region is 80% w×60% w; when H is less than 60% w and greater than 40% w, the rectangular frame 701 may be used to crop the salient region, and a size of the cropped salient region may be 80% w×H; when H is less than 40% w and greater than 30% w, cropping may not be performed on the salient region, that is, a size of the salient region is still W×H; and when H is less than 30% w, the rectangular frame 704 may be used to crop the salient region, and the cropped salient region may be placed in the organic shape.

In a case in which W is greater than 50% w and less than 80% w, when H is greater than 60% w, the rectangular frame 701 may be used to crop the salient region, and a size of the cropped salient region is W×60% w; and when H is less than 60% w and greater than 40% w, cropping may not be performed on the salient region, that is, a size of the salient region is still W×H.

In a case in which W is less than 50% w and greater than 30% w, when H is greater than 80% w, the rectangular frame 701 may be used to crop the salient region, and a size of the cropped salient region is W×80% w; and when H is less than 80% w and greater than 40% w, cropping may not be performed on the salient region, that is, a size of the salient region is still W×H.

In a case in which W is less than 30% w, the rectangular frame 704 or the rectangular frame 703 may be used to crop the salient region, and the cropped salient region may be placed into the organic shape.

In another possible design, when no face exists in the wallpaper and the size of the salient region meets the first condition, that is, when the salient region is large, cropping may alternatively not be performed on the salient region, but the salient region may be reduced as a whole, to obtain the AOD pattern. Alternatively, the salient region may be cropped and then reduced as a whole, to obtain the AOD pattern.

When no face exists in the wallpaper and the size of the salient region meets the second condition, the organic shape may be generated, and the salient region may be placed into the organic shape to obtain the AOD pattern. For example, it is assumed that the height of the salient region is H, the width is W, and the screen width of the mobile phone is w. The second condition may be that H is less than 40% w and W is less than 30% w.

Figure 7B:
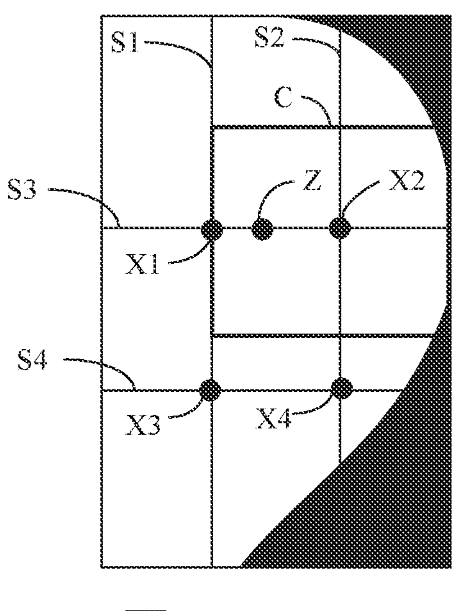
FIG. 7B is a schematic diagram of cropping a salient region according to an embodiment of this application.

As shown in FIG. 7B, when cropping is performed on the salient region, two trisection lines S1 and S2 may be made longitudinally, and two trisection lines S3 and S4 may be made transversely, to obtain four intersection points X1, X2, X3, and X4 between the four trisection lines. A direction opposite to a gravity center Z of the salient region (a white part) (for example, a direction away from the gravity center) is selected transversely (left and right), and a direction the same as the gravity center of the salient region (for example, a direction close to the gravity center) is selected longitudinally (up and down), thereby selecting the trisection point X2. The AOD pattern may be obtained by cropping a corresponding region based on a rectangular frame C (a rectangular frame determined based on the foregoing description) by using the selected trisection point X2 as a center.

In addition, if two salient regions are detected in the wallpaper, the user may voluntarily choose which salient region is used as the AOD pattern, or a system of the mobile phone may determine, according to a preset rule, a salient region (namely, a first salient region) that is finally used as the AOD pattern. Then, the salient region (namely, the first salient region) is processed to obtain the AOD pattern. For a specific process, refer to the foregoing related description. Details are not described herein again. The preset rule may be determining a salient region based on saliency values (the saliency values are used to represent saliency levels of salient regions) of a plurality of salient regions. For example, a salient region having the highest saliency is determined as the first salient region.

After the AOD pattern is determined, to make an edge of the AOD pattern smoother and rounder, special-shaped edge fitting may be performed on an edge pixel block of the AOD pattern, and a curve obtained by fitting is used as an edge of a finally displayed AOD pattern.

Figure 8:
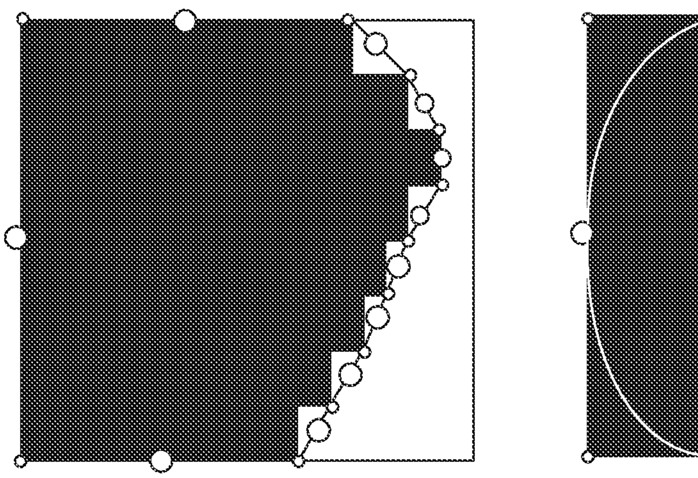
FIG. 8 is a schematic diagram of special-shaped edge fitting according to an embodiment of this application.
Figure 8:
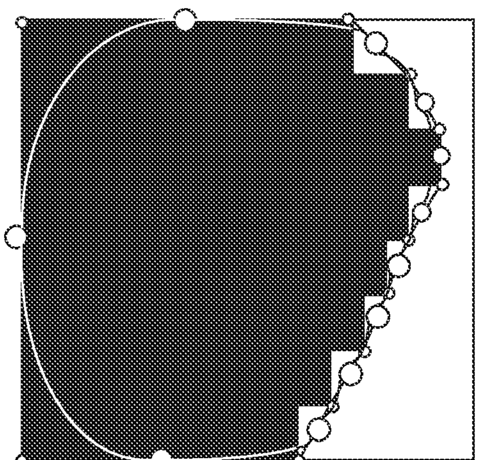

For example, as shown in FIG. 8, a midpoint of a connection line between every two convex vertices in a pixel block of the AOD pattern may be set as a start point and an end point of a cubic Bezier curve, and a midpoint of a connection line between each convex vertex and the middle point of the connection line between every two convex vertices (namely, a quarter point of the connection line between every two convex vertices) is used as a control point of the cubic Bezier curve, thereby forming a closed Bezier curve.

When the face exists in the wallpaper (that is, a face detection result is yes), a region in which the face is located can be used as the AOD pattern. When there are a plurality of faces, a region in which a larger face is located may be selected as the AOD pattern. In addition, the organic shape may be calculated based on a feature (for example, a face orientation) of the region in which the face is located, and the organic shape is used as a display edge of the AOD pattern, to avoid a risk of strange viewing experience of the user that exists when the face is directly used as the display edge of the AOD.

Alternatively, when no face exists in the wallpaper and the size of the salient region meets the second condition, the organic shape may be calculated based on a feature of the salient region (for example, the gravity center of the salient region), and the salient region is placed into the organic shape as the AOD pattern, to avoid a problem that the user has a poor viewing experience because the salient region is directly used as the AOD pattern.

Figure 9:
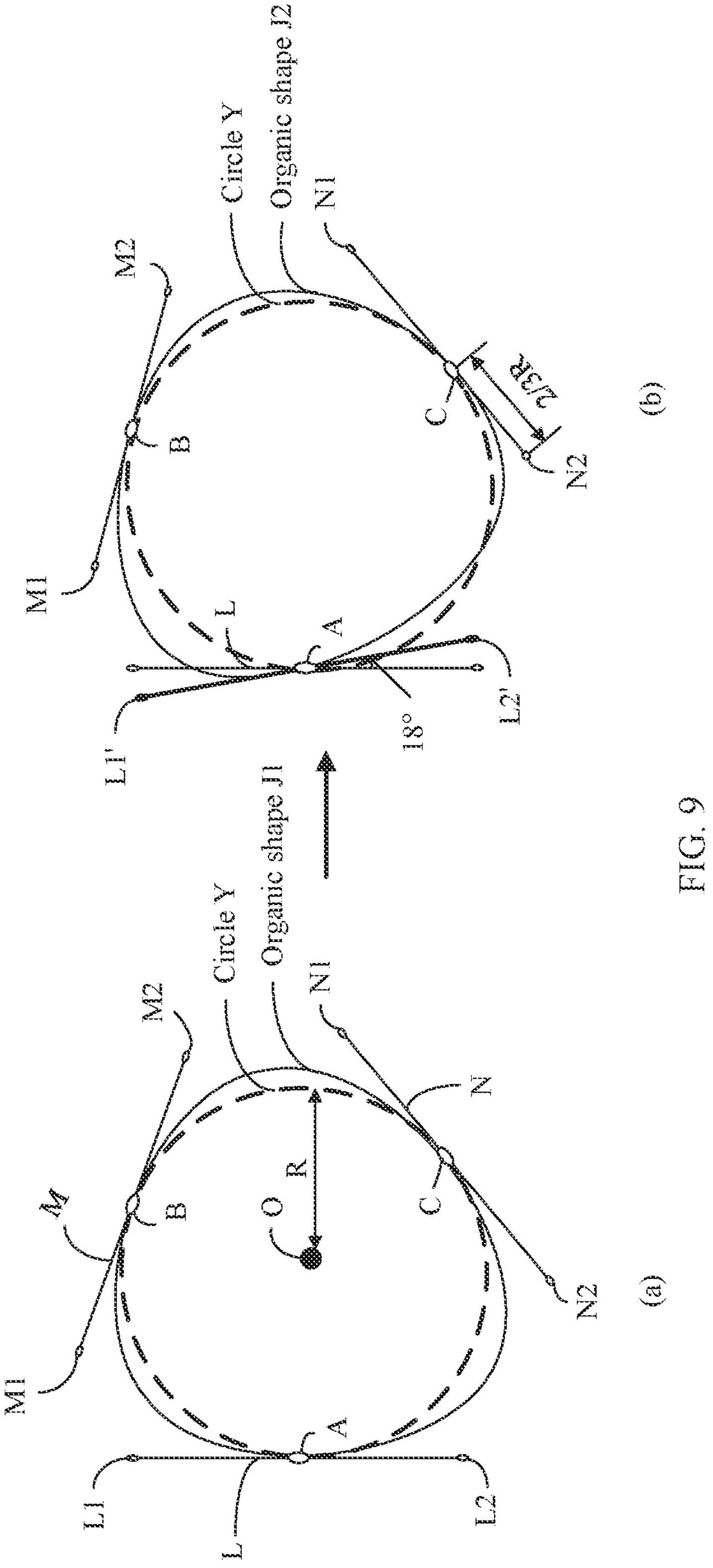
FIG. 9 is a schematic diagram of an organic shape according to an embodiment of this application.

As shown in FIG. 9(*a*), a circle Y with R as a radius is made by using a point O as a center of the circle. A value of R may range from 25% w to 30% w, and w is the screen width of the mobile phone. A point A, a point B, and a point C are determined on an edge of the circle Y. A vertical coordinate (a y-axis coordinate) of the point A and a vertical coordinate of the point O at the center of the circle are the same. An included angle formed by a line between the point A and the point O at the center of the circle and a line between the point B and the point O at the center of the circle is 120°. An included angle formed by the line between the point B and the point O at the center of the circle and a line between the point C and the point O at the center of the circle is 120°. The point A and the point B are respectively used as a start point and an end point, and an endpoint L1 of a tangent line L and an endpoint M1 of a tangent line M are used as intermediate points, to make a Bezier curve. The point B and the point C are respectively used as a start point and an end point, and an endpoint M2 of the tangent line M and an endpoint N1 of a tangent line N are used as intermediate points, to make a Bezier curve. The point C and the point A are respectively used as a start point and an end point, and an endpoint N2 of the tangent line N and an endpoint L2 of the tangent line L are used as intermediate points, to make a Bezier curve. In this way, a closed organic shape J1 is formed by the three third-order Bezier curves. The tangent line L is a tangent line that passes through the point A and that is tangent to the circle Y, a midpoint of the tangent line L is the point A, a length from the point A to the point L1 is R, and a length from the point A to the point L2 is R, that is, a length of the tangent line L is 2R. The tangent line M is a tangent line that passes through the point B and that is tangent to the circle Y, a midpoint of the tangent line M is the point A, a length from the point B to the point M1 is R, and a length from the point B to the point M2 is R, that is, a length of the tangent line M is 2R. The tangent line N is a tangent line that passes through the point C and that is tangent to the circle Y, a midpoint of the tangent line N is the point A, a length from the point C to the point N1 is R. and a length from the point C to the point N2 is R, that is, a length of the tangent line N is 2R.

Further, as shown in FIG. 9(*b*), the tangent line L may be randomly tilted counterclockwise at a specific angle (a tilt angle is less than 20 degrees, for example, the tilt angle may be 18 degrees) to obtain a tangent line L', and a length of a line segment between the point C and the point N2 may be shortened to a range from 2/3R to 3/4R, for example, may be shortened to 2/3R. Then, the point A and the point B are respectively used as a start point and an end point, and an endpoint L1' of the tangent line L' and the endpoint M1 of the tangent line M are used as intermediate points, to make a Bezier curve. The point B and the point C are respectively used as a start point and an end point, and the endpoint M2 of the tangent line M and the endpoint N1 of the tangent line N are used as intermediate points, to make a Bezier curve. The point C and the point A are respectively used as a start point and an end point, and the endpoint N2 of the tangent line N and an endpoint L2' of the tangent line L' are used as intermediate points, to make a Bezier curve. At this time, an organic shape J2 may be obtained, and the organic shape J2 may be used as an organic shape template.

Figure 10:
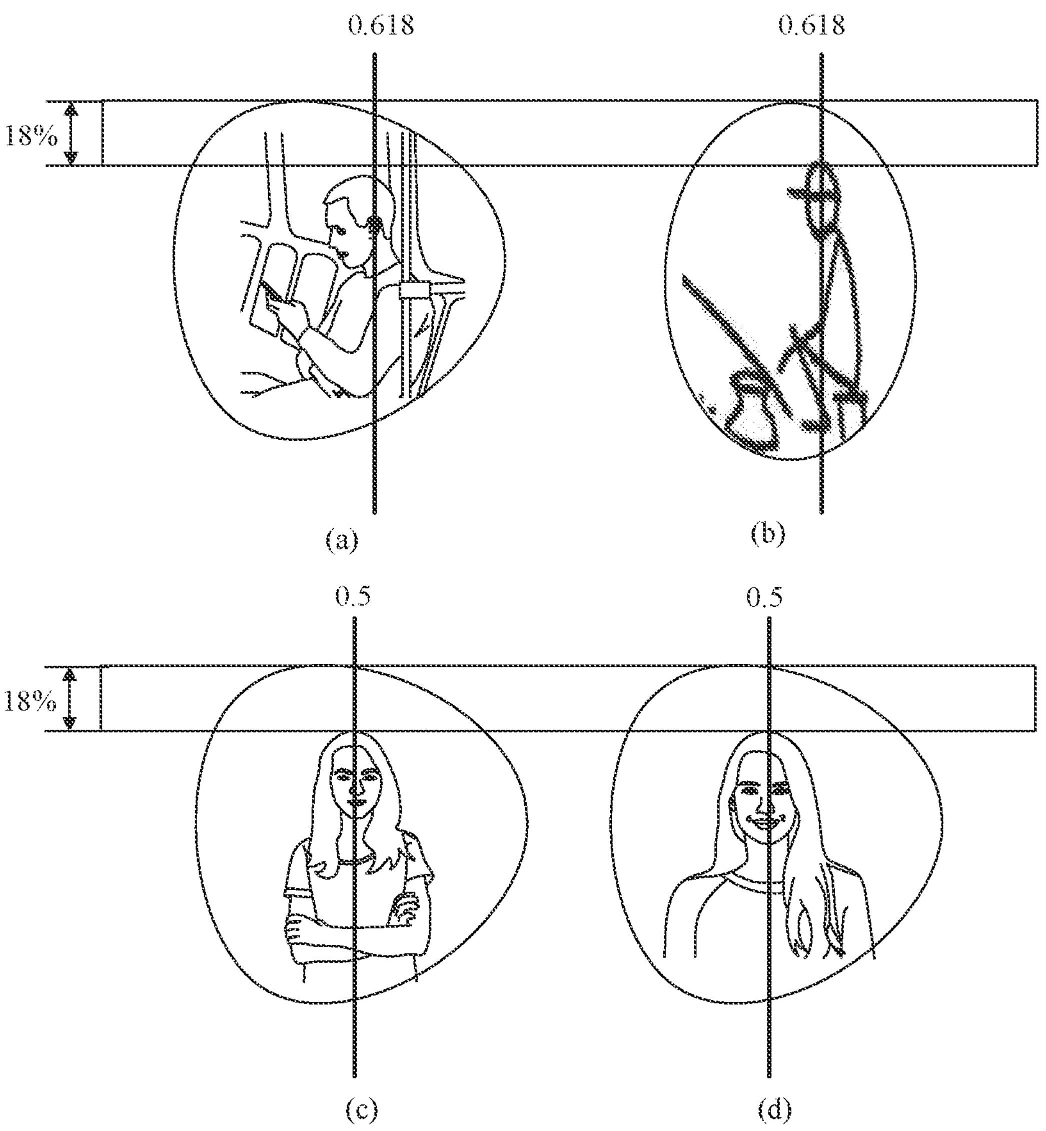
FIG. 10 is a schematic diagram of a layout of a face in an organic shape according to an embodiment of this application.

After the organic shape template is determined, a screenshot including the face may be placed into the organic shape in the following manner. The screenshot including the face is cut from the wallpaper, and a layout of the screenshot is consistent with a layout of the cut part in the wallpaper. As shown in (a) to (d) in FIG. 10, in an up-and-down (longitudinal) layout, a distance between the head top of the person and a top edge of the organic shape is about 20% A, for example, may be 18% A, where A represents the height of the organic shape. As shown in (a) and (b) in FIG. 10, for a face whose face orientation is left (front left), in a left-to-right (horizontal) layout, the face is located at a golden ratio dividing line on a right side of the organic shape. It may be understood that, for a face whose face orientation is right (front right), in the left-to-right (horizontal) layout, the face is located at a golden ratio dividing line on a left side of the organic shape. As shown in (c) and (d) in FIG. 10, for a face facing the front, in the left-right (horizontal) layout, the face is located in the middle of the organic shape (that is, placed in the center). In this way, a display region and the organic shape that include the face can be more in line with aesthetic composition and can improve viewing experience.

In addition, when an area of the person (the face) is excessively small compared to the organic shape (for example, the height of the person is less than 15% A, for example, 1/10A or 1/15A), the person may be placed in the center, and a distance between the head top of the person and the top edge of the organic shape is not limited to about 20% A. In addition, for an excessively small picture without a person (namely, a case in which the salient region is excessively small), the salient region may be placed in the center of the organic shape.

It should be noted that, for wallpapers (pictures) with different patterns, organic shapes of AOD patterns may be different. For a same wallpaper (picture), an organic shape of an AOD pattern displayed each time the screen is turned off may also be different. In this way, such a design not only makes a product diversified, but also increases interest, so that an AOD effect is more vivid, and user experience can be improved.

Further, a time control may be combined with an AOD pattern. The time control and the AOD pattern may or may not overlap. When the time control overlaps the AOD pattern, the combination manner of the time control and the AOD pattern includes the following steps.

Figure 11:
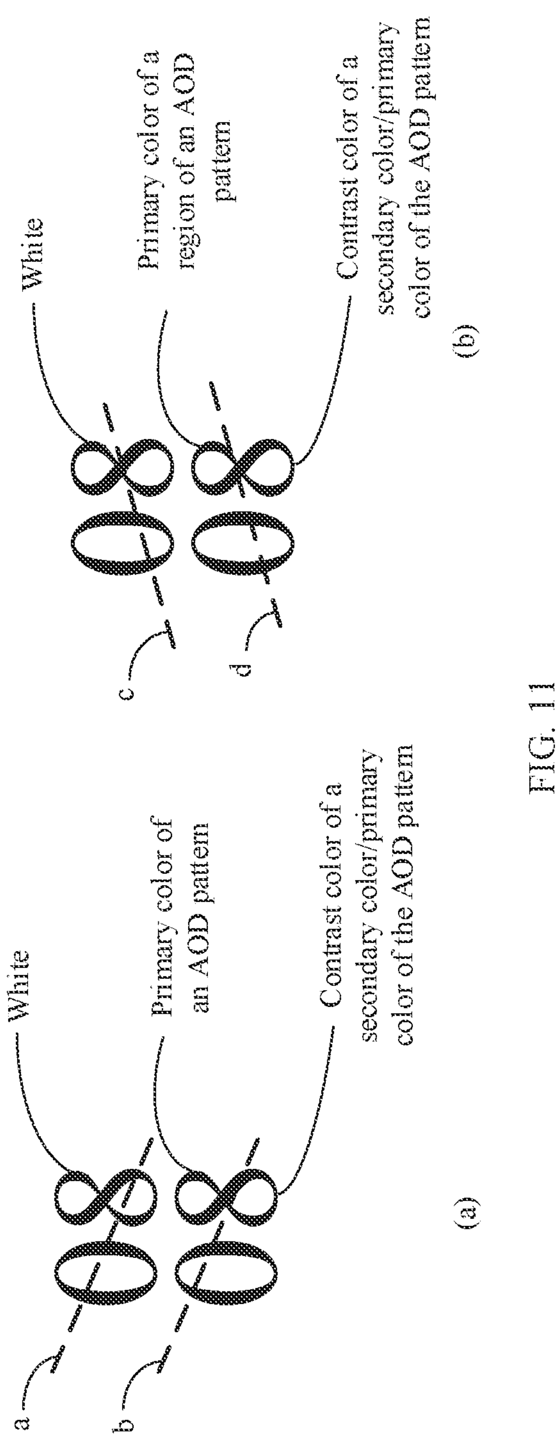
FIG. 11 is a schematic diagram of determining a color of a time control according to an embodiment of this application.

(1) Determine a color of the time control. The color of the time control may be adjusted based on a color selection result of the AOD pattern. For example, as shown in FIG. 11(*a*), the time control (for example, 08 08) may be divided into three parts by using a dashed line a and a dashed line b. A color of an upper part of the dashed line a may be white. A color of a part between the dashed line a and the dashed line b may be a primary color of the AOD pattern. A color of a lower part of the dashed line b may be a secondary color of the AOD pattern. For another example, as shown in FIG. 11(*b*), the time control (for example, 08 08) may be divided into three parts by using a dashed line c and a dashed line d. A color of an upper part of the dashed line c may be white. A color of a part between the dashed line c and the dashed line d may be a primary color of the AOD pattern. A color of a lower part of the dashed line d may be a secondary color of the AOD pattern.

(2) Calculate a combined position of the time control and the AOD pattern. First, determine a mass center, gravity center (a center/a geometric center), or symmetry center of the AOD pattern, and place the time control in an opposite direction of the mass center, the gravity center, or the symmetry center of the AOD pattern, to achieve a visual balance.

Figure 12A:
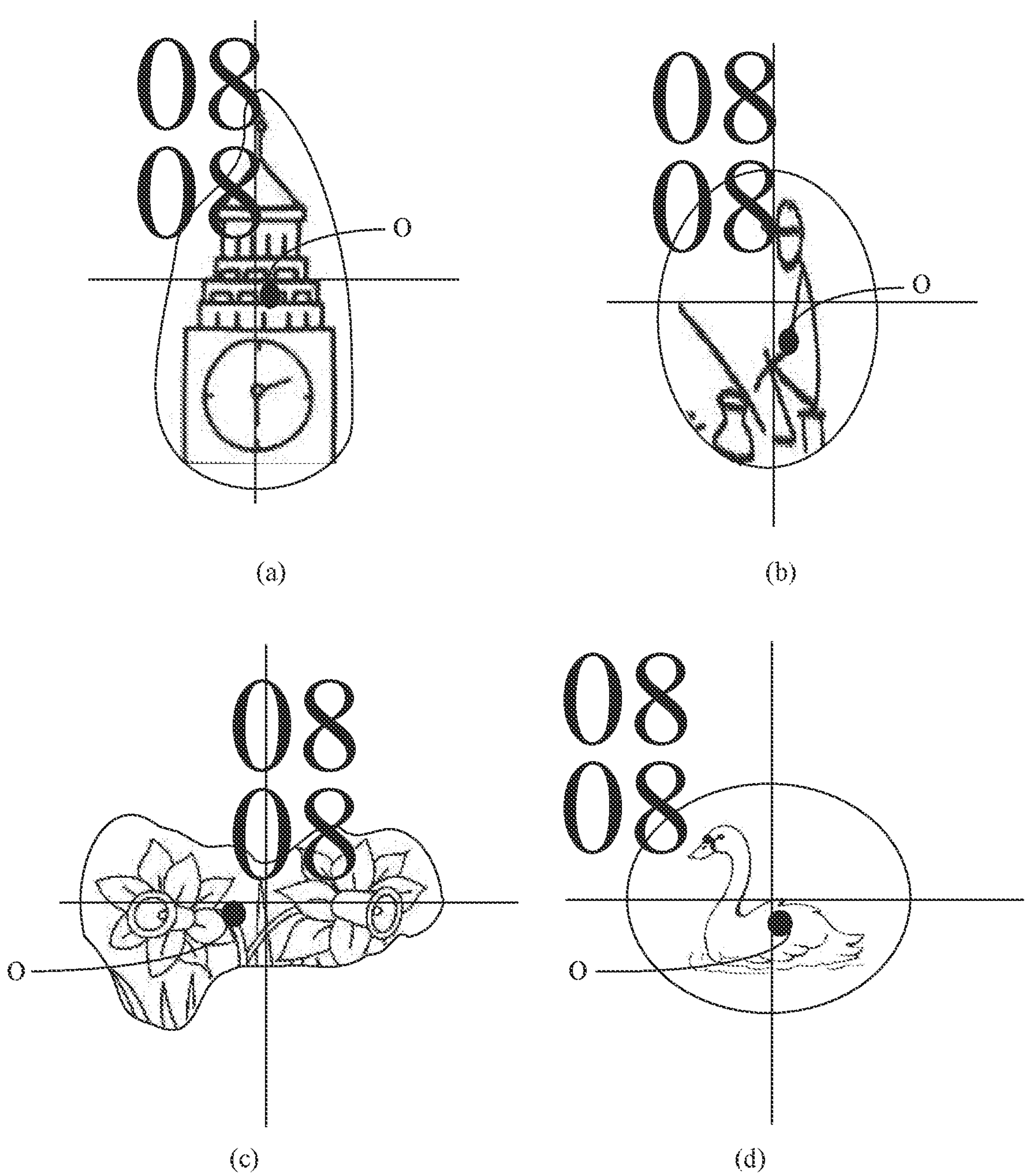
FIG. 12A is a schematic diagram of positions of a time control according to an embodiment of this application.

As shown in FIG. 12A, the time control may be displayed in two rows. Specifically, as shown in (a), (b), and (d) in FIG. 12A, the mass center O of the AOD pattern is located in a lower right region, so the time control may be displayed in an upper left region of the AOD pattern, to achieve a visual balance. As shown in (c) in FIG. 12A, the mass center O of the AOD pattern is located in a lower left region, so the time control may be displayed in an upper right region of the AOD pattern, to achieve a visual balance.

Figure 12B:
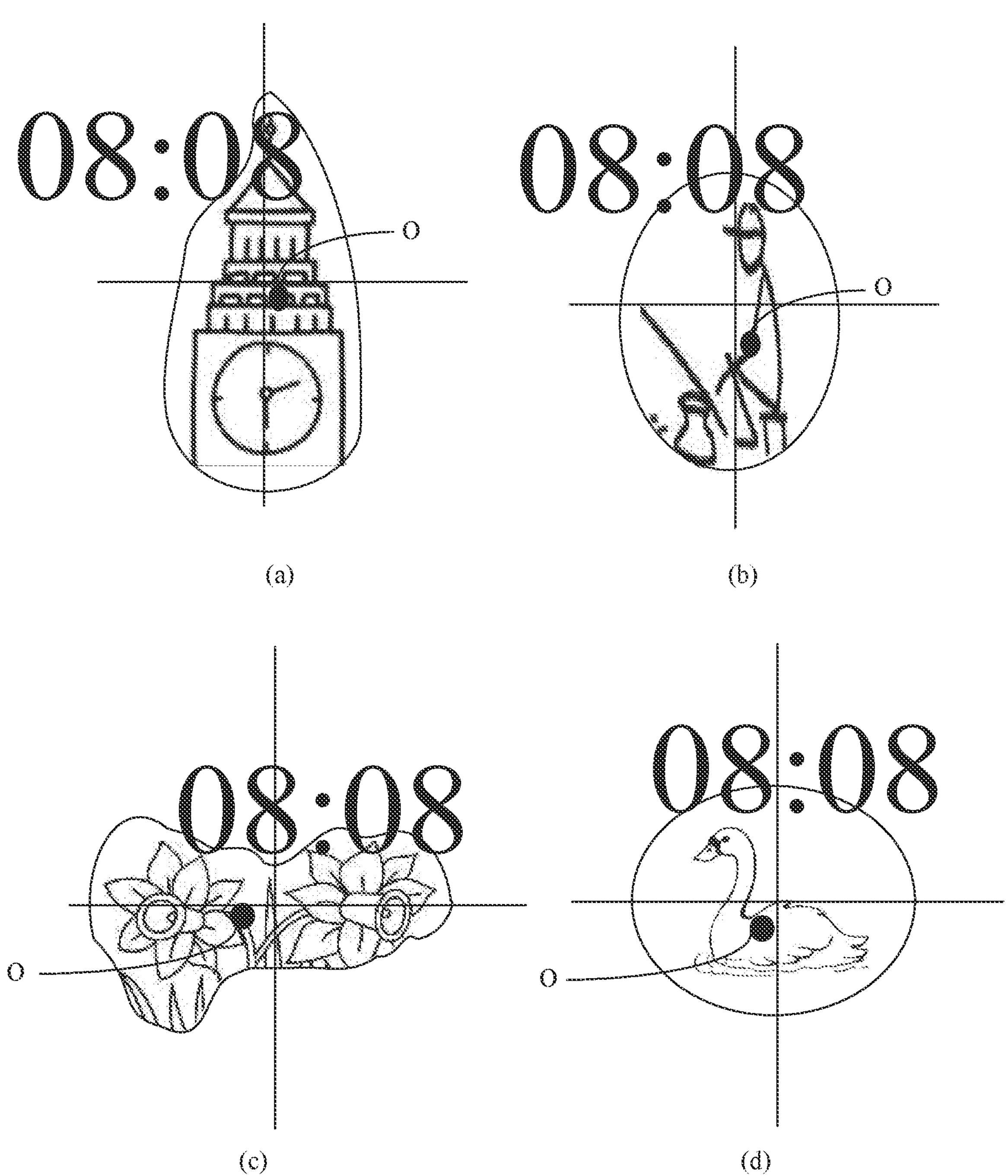
FIG. 12B is another schematic diagram of a position of a time control according to an embodiment of this application.

As shown in FIG. 12B, the time control may be displayed in one row. Specifically, as shown in (a), (b), and (d) in FIG. 12A, the mass center O of the AOD pattern is located in a lower right region, so the time control may be displayed in an upper left region of the AOD pattern, to achieve a visual balance. As shown in (c) in FIG. 12A, the mass center O of the AOD pattern is located in a lower left region, so the time control may be displayed in an upper right region of the AOD pattern, to achieve a visual balance.

(3) Feather an edge. The preset edge feathering value may be set based on an overall style of display content of AOD (including a numeric font style of the time control, a style of the AOD pattern, and the like) of display content of AOD, so that the display content of AOD looks more beautiful.

Figure 13:
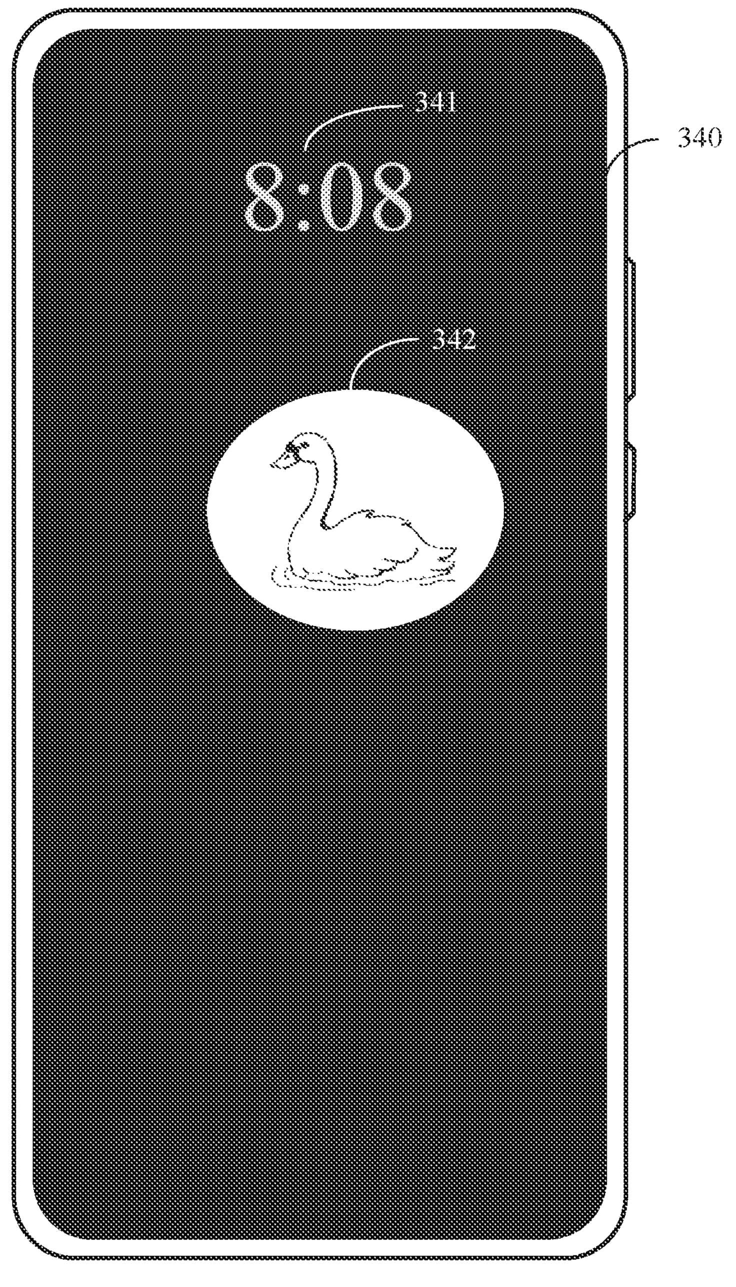
FIG. 13 is another schematic display diagram according to an embodiment of this application.

In addition, when the time control and the AOD pattern do not overlap, the time control and the AOD pattern may be displayed separately. For example, as shown in FIG. 13, a time control 341 may be displayed in a center position above a screen of the mobile phone, and an AOD pattern 342 may be displayed in a middle position of the screen of the mobile phone.

In addition, currently, a mobile phone usually uses an OLED screen, and may control a separate pixel to emit light. When the screen is displayed as black, a black region does not need to emit light. This can greatly reduce power consumption. It may be understood that, in an AOD design, a screen burning problem specific to an OLED screen needs to be avoided, that is, several pixels display a same color for a long time. As a result, this region is aged and a display effect is affected. In order to better prolong a service life of an OLED, display content of AOD may be enabled to periodically jump up and down or jump left and right within a specific range, that is, repeatedly move in a fixed region, so that viewing experience is not affected, and screen burning can be effectively prevented.

Based on the method provided in this embodiment of this application, when the user lights up the mobile phone (enters the unlocking interface or the home screen from the always on interface), the mobile phone may display the AOD pattern returning back to the original position (the position of the AOD pattern in the lock screen wallpaper or the home screen wallpaper) from the middle position, light up the lock screen wallpaper or the home screen wallpaper in the diffused manner, and then display a quick animation of other information on the lock screen interface or the home screen. Such an animation effect formed by the AOD pattern and the wallpaper may provide a better user experience. In addition, based on the method provided in this embodiment of this application, the display content of AOD may be determined based on any home screen wallpaper or lock screen wallpaper set by the user, to meet a personalized requirement of the user, and improve user experience.

Figure 14:
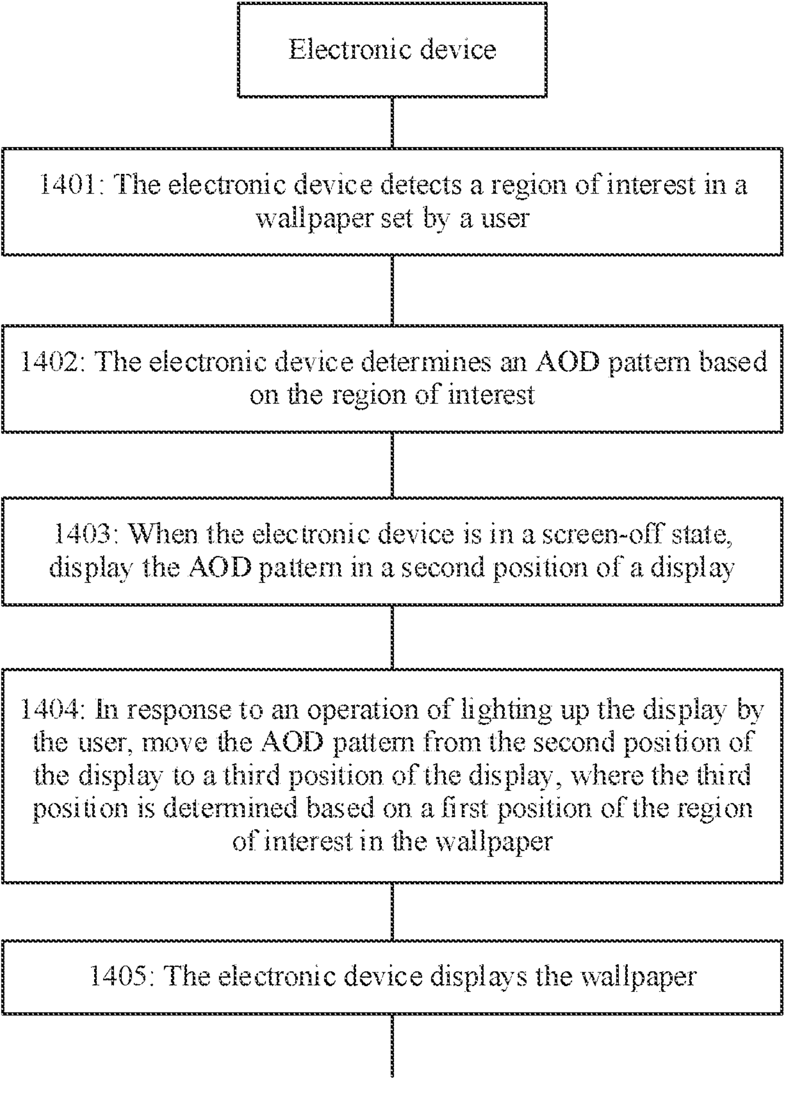
FIG. 14 is a schematic flowchart of another method according to an embodiment of this application.

As shown in FIG. 14, an embodiment of this application provides an always on display method, including the following steps.

1401: An electronic device detects a region of interest in a wallpaper set by a user, where the region of interest is located in a first position in the wallpaper.

The wallpaper set by the user includes a home screen wallpaper or a lock screen wallpaper. A source of the wallpaper set by the user includes at least one of a picture shot by the electronic device, a picture downloaded by the electronic device, or a screenshot of the electronic device. In this way, display content of AOD may be determined based on any home screen wallpaper or lock screen wallpaper set by the user, to meet a personalized requirement of the user, and improve user experience.

Optionally, the user may also set a home screen picture or a lock screen picture, that is, switch different wallpapers according to a preset rule. For example, a picture may be pushed to the user every preset time as the home screen wallpaper or the lock screen wallpaper.

In some embodiments, the electronic device may perform face detection on the wallpaper, where when a face exists in the wallpaper, the region of interest includes a region in which the face is located: or when no face exists in the wallpaper, the electronic device performs saliency detection on the wallpaper, where the region of interest includes a salient region in the wallpaper.

1402: The electronic device determines an AOD pattern based on the region of interest.

If the electronic device detects a face, the electronic device may generate an organic shape, cut out a face region from the wallpaper, and place the face region into the organic shape, to obtain the AOD pattern. If no face is detected, saliency detection may be performed on the wallpaper to obtain a first salient region. If a size of the first salient region meets a first preset condition, cropping is performed on the first salient region, and special-shaped edge fitting is performed on the cropped first salient region, to obtain the AOD pattern. If a size of the first salient region meets a second preset condition, the organic shape is generated, and the first salient region is placed into the organic shape, to obtain the AOD pattern.

Optionally, that cropping is performed on the first salient region includes: Cropping is directly performed on the first salient region to obtain the AOD pattern; or cropping and reducing or enlarging processing are performed on the first salient region to obtain the AOD pattern. In this way, a size of the AOD pattern may be controlled within a reasonable range, and a display effect of the AOD pattern may be beautified, thereby improving viewing experience of the user.

Optionally, that saliency detection is performed on the wallpaper to obtain a first salient region includes: When the wallpaper includes a plurality of salient regions, a salient region selected by the user is used as the first salient region: or the first salient region is determined according to a preset rule. The preset rule includes determining the first salient region based on a saliency level of each of the plurality of salient regions.

Optionally, that special-shaped edge fitting is performed on the cropped first salient region includes: An edge of the cropped first salient region is fit based on a Bezier curve. The Bezier curve is a smooth curve. Fitting the edge of the cropped first salient region based on the Bezier curve can make the edge of the first salient region smoother, so that an edge of the AOD pattern is smoother, the display effect of the AOD pattern is beautified, and viewing experience of the user is improved.

Optionally, that the organic shape is generated if a face is detected includes: The organic shape is determined based on a feature of the face, where the feature of the face includes an orientation of the face. That the organic shape is generated if a size of the first salient region meets a second preset condition includes: The organic shape is determined based on a feature of the first salient region, where the feature of the first salient region includes a direction of a gravity center, a mass center, or a symmetry center of the first salient region. In this way, the AOD pattern including the organic shape can be made more in line with aesthetic composition, and viewing experience can be improved.

Optionally, the organic shape is formed by the Bezier curve. The Bezier curve is a smooth curve, the organic shape is also a soft shape, and the AOD pattern obtained based on the organic shape will also make viewing experience of the user better.

Optionally, that the face region is cut out from the wallpaper and placed into the organic shape includes: A preset distance is between a top of the face and a top of the organic shape, and the face is located at a golden ratio dividing line of the organic shape; or the face placed in a center of the organic shape. In this way, a display region and the organic shape that include the face can be more in line with the aesthetic composition and can improve viewing experience.

Optionally, feathering processing may be performed on the edge of the AOD pattern. In this way, the edge of the AOD pattern may be smoother, and the display effect of the AOD pattern may be beautified, thereby improving viewing experience of the user.

1403: When the electronic device is in a screen-off state, display the AOD pattern in a second position of a display, where the second position is preset.

Optionally, before step 1403, the electronic device may further receive an operation of setting a wallpaper by the user and an operation of determining, by the user, to perform always on display. After the user sets the wallpaper and sets to perform always on display, the electronic device may determine the display content of AOD based on any home screen wallpaper or lock screen wallpaper set by the user, to meet the personalized requirement of the user, and improve user experience.

Optionally, when the electronic device is in the screen-off state, the electronic device further displays at least one type of information of time, an SMS message reminder, a missed call reminder, a message reminder of an application, weather, or a battery level. In this way, display content obtained when a screen is turned off can be richer, more information can be prompted for the user, so that the user does not miss important information, and user experience can be improved.

In some embodiments, if the electronic device is in the screen-off state, the electronic device further displays time. A color of the time is determined based on a color of the AOD pattern, and the time is located in a direction opposite to a mass center, a gravity center, or a symmetry center of the AOD pattern. In this way, a visual balance can be achieved.

Optionally, that the AOD pattern is moved from the second position to a third position includes: The time is moved simultaneously with the AOD pattern. The time gradually disappears in the moving process, or the time disappears after the AOD pattern moves to the third position. Such a design makes a product become diversified, increases interest, makes an AOD effect more vivid, and can improve user experience.

1404: In response to an operation of lighting up the display by the user, move the AOD pattern from the second position of the display to a third position of the display, where the third position is determined based on the first position of the region of interest in the wallpaper.

It should be understood that, when the wallpaper covers the display, the first position may be the same as the third position. When the wallpaper is reduced proportionally for display, the third position may be determined with reference to the first position. For example, if the region of interest is located in a lower left corner of the wallpaper, the third position is a lower left corner of the display.

1405: The electronic device displays the wallpaper.

In some embodiments, the electronic device first displays the wallpaper, and then displays other information corresponding to the wallpaper. When the wallpaper is a lock screen wallpaper, the other information corresponding to the wallpaper includes an application icon and a control on a lock screen interface; or when the wallpaper is a home screen wallpaper, the other information corresponding to the wallpaper includes an application icon and a control on the home screen. Such a quick animation of lighting up the wallpaper and then displaying the other information corresponding to the wallpaper may provide a better user experience.

It should be noted that the electronic device in the embodiment shown in FIG. 14 may be the mobile phone in the foregoing embodiment. For a part that is not described in detail in the embodiment in FIG. 14, refer to the foregoing embodiment. Details are not described herein again.

Based on the method provided in this embodiment of this application, the electronic device detects the region of interest in the wallpaper set by the user, where the region of interest is located in the first position in the wallpaper. The electronic device determines the always on display AOD pattern based on the region of interest. When the electronic device is in the screen-off state, the electronic device displays the AOD pattern in the second position on the display. In this way, the display content of AOD may be determined based on any home screen wallpaper or lock screen wallpaper set by the user, to meet the personalized requirement of the user, and improve user experience. In addition, when the user lights up the display of the electronic device (entering an unlocking interface or the home screen from an always on interface), the electronic device may display the AOD pattern transferring from a preset position (the second position) to the third position (determined based on a position of the region of interest in the lock screen wallpaper or the home screen wallpaper), and then diffuse an animation that lights up the wallpaper. Such an animation effect formed by the AOD pattern and the wallpaper may provide a better user experience.

Figure 15:
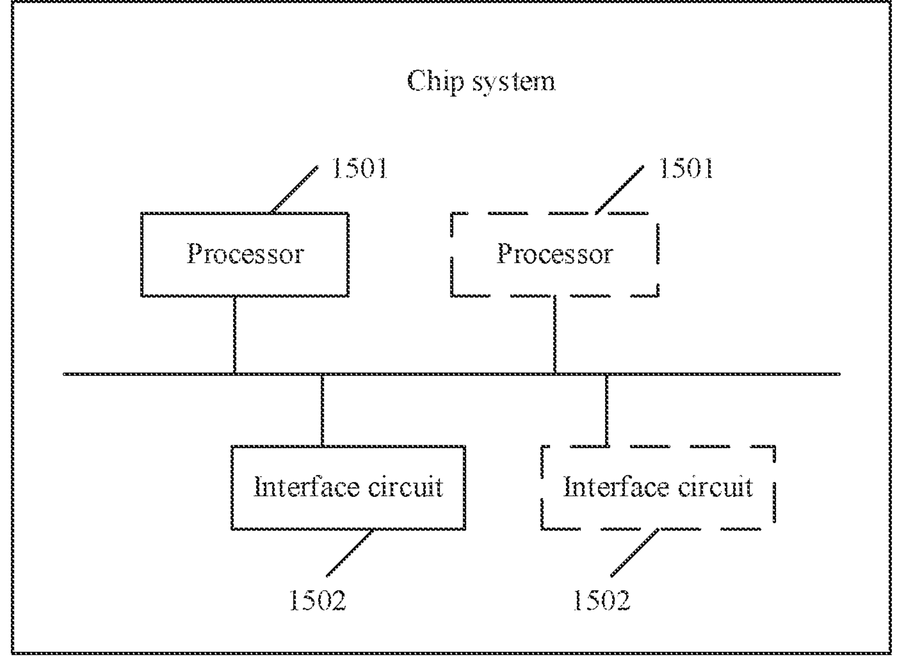
FIG. 15 is a schematic diagram of a structure of a chip according to an embodiment of this application.

An embodiment of this application further provides a chip system. As shown in FIG. 15, the chip system includes at least one processor 1501 and at least one interface circuit 1502. The processor 1501 and the interface circuit 1502 may be interconnected through a line. For example, the interface circuit 1502 may be configured to receive a signal from another apparatus (for example, a memory in an electronic device). For another example, the interface circuit 1502 may be configured to send a signal to another apparatus (for example, the processor 1501).

For example, the interface circuit 1502 may read instructions stored in the memory in the electronic device, and send the instructions to the processor 2101. When the instructions are executed by the processor 2101, the electronic device (for example, the electronic device 200 shown in FIG. 2) may be enabled to perform the steps in the foregoing embodiments.

Certainly, the chip system may further include another discrete device. This is not specifically limited in this embodiment of this application.

An embodiment of this application further provides a computer-readable storage medium. The computer-readable storage medium includes computer instructions. When the computer instructions are run on an electronic device (for example, the electronic device 200 shown in FIG. 2), the electronic device 200 is enabled to perform the functions or steps performed by the electronic device in the foregoing method embodiments.

An embodiment of this application further provides a computer program product. When the computer program product runs on a computer, the computer is enabled to perform the functions or steps performed by the electronic device in the foregoing method embodiments.

An embodiment of this application further provides an always on display processing apparatus. The apparatus may be divided into different logical units or modules based on functions, and the units or modules perform different functions, so that the apparatus performs the functions or steps performed by the electronic device in the foregoing method embodiments.

Some other embodiments of this application provide an electronic device (the electronic device 200 shown in FIG. 2). The electronic device may include a communication module, a memory, and one or more processors. The communication module, the memory, and the processor are coupled. The memory is configured to store computer program code. The computer program code includes computer instructions.

Based on the foregoing descriptions of the implementations, a person skilled in the art may clearly understand that the foregoing functions can be allocated to different function modules for implementation based on a requirement, in other words, an inner structure of an apparatus is divided into different function modules to implement all or a part of the functions described above.

In the several embodiments provided in this application, it should be understood that the disclosed apparatus and method may be implemented in other manners. For example, the described apparatus embodiments are merely examples. For example, division into the modules or units is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium Based on such an understanding, the technical solutions of embodiments of this application essentially, or the part contributing to the conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the method described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by an electronic device, wherein the method comprises:

detecting a region of interest in a wallpaper, wherein the region of interest is located in a first position in the wallpaper, and wherein the region of interest includes a region in which a face is located or is a salient region in the wallpaper;

determining, based on the region of interest and from the wallpaper, an always on display (AOD) pattern, wherein the AOD pattern is an image in the region of interest and is displayed in a screen-off state;

displaying, in the screen-off state, the AOD pattern in a second position of a display, wherein the second position is preset and is different from the first position;

obtaining a first operation of lighting up the display by a user and in the screen-off state;

moving the AOD pattern from the second position to a third position of the display, wherein the third position is the same as the first position or covers the first position; and displaying the wallpaper.

2. The method of claim 1, further comprising:

receiving a second operation of setting the wallpaper by the user; and receiving a third operation by the user to perform AOD.

3. The method of claim 1, wherein the wallpaper comprises a home screen wallpaper or a lock screen wallpaper.

4. The method of claim 3, further comprising displaying other information corresponding to the wallpaper after displaying the wallpaper, wherein the other information comprises:

a first application icon and a first control on a lock screen interface when the wallpaper is the lock screen wallpaper; and a second application icon and a second control on a home screen when the wallpaper is the home screen wallpaper.

5. The method of claim 1, further comprising:

performing saliency detection on the wallpaper to obtain a first salient region; and generating an organic shape and placing the first salient region into the organic shape to obtain the AOD pattern.

6. The method of claim 5, further comprising performing feathering processing on an edge of the AOD pattern.

7. The method of claim 5, further comprising directly cropping the first salient region to obtain the AOD pattern.

8. The method of claim 5, wherein the wallpaper comprises a plurality of salient regions, and wherein the method further comprises:

setting one of the plurality of salient regions by the user as the first salient region; or determining the first salient region according to a preset rule, wherein the preset rule comprises determining the first salient region based on a saliency level of each of the salient regions.

9. The method of claim 5, further comprising generating the organic shape based on a second feature of the first salient region, wherein the second feature comprises a first direction of a gravity center of the first salient region, a second direction of a mass center of the first salient region, or a third direction of a symmetry center of the first salient region.

10. The method of claim 5, further comprising:

when a size of the first salient region meets a preset condition:

generating the organic shape and placing the first salient region into the organic shape to obtain the AOD pattern.

11. The method of claim 5, further comprising performing cropping and reducing or performing enlarging processing on the first salient region to obtain the AOD pattern.

12. The method of claim 1, further comprising displaying at least one type of information, wherein the at least one type of information comprises at least one of a time, a short message service (SMS) message reminder, a missed call reminder, a message reminder of an application, weather, or a battery level when the electronic device is in the screen-off state.

13. The method of claim 12, further comprising displaying, when the electronic device is in the screen-off state, time, wherein a color of the time is based on a color of the AOD pattern, and wherein the time is located in a direction opposite to a mass center of the AOD pattern, a gravity center of the AOD pattern, or a symmetry center of the AOD pattern.

14. The method of claim 1, further comprising:

performing saliency detection on the wallpaper to obtain a first salient region; and when a size of the first salient region meets a preset condition:

cropping the first salient region to obtain a cropped first salient region; and performing special-shaped edge fitting on the cropped first salient region to obtain the AOD pattern.

15. The method of claim 1, further comprising:

generating a first organic shape;

cutting out a face region from the wallpaper; and placing the face region into the first organic shape to obtain the AOD pattern.

16. The method of claim 15, further comprising performing feathering processing on an edge of the AOD pattern.

17. The method of claim 15, further comprising generating the first organic shape based on a first feature of the face, wherein the first feature comprises an orientation of the face.

18. The method of claim 15, further comprising: placing the face at a golden ratio dividing line of the first organic shape, wherein a preset distance between a top of the face and a top of the first organic shape is 20 percent of A, and wherein A represents a height of the first organic shape; or placing the face in a center of the first organic shape.

19. The method of claim 15, further comprising placing the face in a center of the first organic shape.

20. The method of claim 1, wherein the wallpaper comprises an image having a first area, wherein the AOD pattern comprises a portion of the image of the wallpaper and has a second area, and wherein the first area is greater than the second area.

21. An electronic device comprising:

a memory configured to store instructions; and one or more processors coupled to the memory and configured to execute the instructions to cause the electronic device to:

detect a region of interest in a wallpaper, wherein the region of interest is located in a first position in the wallpaper, wherein the region of interest includes a region in which a face is located or is a salient region in the wallpaper;

determine, based on the region of interest and from the wallpaper, an always on display (AOD) pattern, wherein the AOD patter is an image in the region of interest and is displayed in a screen-off state;

display, in the screen-off state, the AOD pattern in a second position of a display, wherein the second position is preset and is different from the first position;

obtain a first operation of lighting up the display by a user and in the screen-off state;

move the AOD pattern from the second position to a third position of the display, wherein the third position is the same as the first position or covers the first position; and display the wallpaper.

22. A computer program product comprising instructions that are stored on a non-transitory computer-readable storage medium and that, when executed by one or more processors, cause an electronic device to:

detect a region of interest in a wallpaper, wherein the region of interest is located in a first position in the wallpaper, wherein the region of interest includes a region in which a face is located or is a salient region in the wallpaper;

determine, based on the region of interest and from the wallpaper, an always on display (AOD) pattern, wherein the AOD pattern is an image in the region of interest and is displayed in a screen-off state;

display, in the screen-off state, the AOD pattern in a second position of a display, wherein the second position is preset and is different from the first position;

obtain a first operation of lighting up the display by a user and in the screen-off state;

move the AOD pattern from the second position to a third position of the display, wherein the third position is the same as the first position or covers the first position; and display the wallpaper.

* * * * *